(12) United States Patent
Chung

(10) Patent No.: US 11,996,551 B2
(45) Date of Patent: May 28, 2024

(54) METHOD FOR THE FABRICATION OF AN ELECTROLESS-METAL-PLATED SULFUR NANOCOMPOSITE, AN ELECTROLESS-METAL-PLATED SULFUR CATHODE WHICH IS MADE FROM THE NANOCOMPOSITE, AND A BATTERY THAT USES THE CATHODE

(71) Applicant: NATIONAL CHENG KUNG UNIVERSITY, Taiwan (TW)

(72) Inventor: Sheng Heng Chung, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 205 days.

(21) Appl. No.: 17/329,356

(22) Filed: May 25, 2021

(65) Prior Publication Data

US 2022/0293914 A1     Sep. 15, 2022

(30) Foreign Application Priority Data

Mar. 12, 2021   (TW) ................................. 110109001

(51) Int. Cl.
| | |
|---|---|
| *C23C 18/18* | (2006.01) |
| *C23C 18/36* | (2006.01) |
| *H01M 4/04* | (2006.01) |
| *H01M 4/36* | (2006.01) |
| *H01M 4/38* | (2006.01) |
| *H01M 4/02* | (2006.01) |

(52) U.S. Cl.
CPC ......... *H01M 4/366* (2013.01); *C23C 18/1889* (2013.01); *C23C 18/36* (2013.01);
(Continued)

(58) Field of Classification Search
CPC ............................ C23C 18/1889; C23C 18/36
See application file for complete search history.

(56) References Cited

U.S. PATENT DOCUMENTS

| | | | | |
|---|---|---|---|---|
| 3,060,059 A | * | 10/1962 | Sickles | ................... C23C 18/36 |
| | | | | 106/1.27 |
| 5,221,328 A | * | 6/1993 | Bishop | ................ C23C 18/1683 |
| | | | | 106/1.23 |

(Continued)

FOREIGN PATENT DOCUMENTS

| | | | | | |
|---|---|---|---|---|---|
| CN | 103035879 A | * | 4/2013 | | |
| CN | 103972580 A | * | 8/2014 | .......... | H01M 10/052 |
| CN | 108063257 A | * | 5/2018 | | |

OTHER PUBLICATIONS

Dickey "Tackling Difficult Mixing Problems" Fluids and Solids Handling, CEP www.aiche.org/cep Aug. 2015 p. 35-42 (Year: 2015).*

(Continued)

*Primary Examiner* — Nathan H Empie
(74) *Attorney, Agent, or Firm* — CANTOR COLBURN LLP

(57) ABSTRACT

A method for the fabrication of an electroless-metal-plated sulfur nanocomposite, an electroless-metal-plated sulfur cathode which is made from the nanocomposite, and a battery that uses the cathode, where the method includes chemically plating a conductive metal nanoshell onto the surface of the insulating sulfur powder to improve the conductivity of the sulfur cathode material, where through enhancing the electrochemical reaction kinetics with metal catalysis capabilities, and performing physical and chemical adsorption of liquid polysulfides with metal activity, the electroless-metal-plated sulfur nanocomposite enables the battery to exhibit high electrochemical utilization and stable cyclability, such that the nanocomposite can achieve a high sulfur content and high metal content, and the cathode demonstrates a high sulfur loading with a low electrolyte-to-sulfur ratio, the lithium-sulfur battery with the cathode exhibiting a high discharge capacity along with high energy (Continued)

density, and maintaining stable and high reversible capacity after 200 cycles within a wide range of cycling rates.

9 Claims, 47 Drawing Sheets

(52) U.S. Cl.
CPC ............. *H01M 4/049* (2013.01); *H01M 4/38* (2013.01); *H01M 2004/021* (2013.01); *H01M 2004/028* (2013.01)

(56) References Cited

U.S. PATENT DOCUMENTS

| | | | |
|---|---|---|---|
| 10,084,182 B2 | 9/2018 | Pan | |
| 10,566,630 B2 | 2/2020 | Li | |
| 10,916,803 B1 | 2/2021 | Henslee | |
| 2015/0228968 A1* | 8/2015 | Xiao | H01M 4/362 252/502 |
| 2018/0138554 A1* | 5/2018 | Mukherjee | H01M 10/054 |

OTHER PUBLICATIONS

Yin-Ju Yena, "Lean-electrolyte Lithium-sulfur Electrochemical Cells with High-loading Carbon Nanotube/nanofiberpolysulfide Cathodes", The Royal Society of Chemistry 2012.

Significance of sensitization process in electroless deposition of Ni on nanosized Al2O3 powders, Ceramics International, 42(3), 4491-4497, Dec. 2015.

Taiwan Intellectual Property Office Search Report for corresponding application 110109001; Filing Date: Mar. 12, 2021.

* cited by examiner

SnCl$_2$ sensitization
PdCl$_2$ activation

NiCl$_2$ electroless-nickel plating

Liquid electrolyte drop-casting

METHOD FOR THE FABRICATION OF AN ELECTROLESS-METAL-PLATED SULFUR NANOCOMPOSITE, AN ELECTROLESS-METAL-PLATED SULFUR CATHODE WHICH IS MADE FROM THE NANOCOMPOSITE, AND A BATTERY THAT USES THE CATHODE

CROSS REFERENCE TO RELATED APPLICATIONS

The present application claims priority to Taiwan Patent Application No. 110109001 filed Mar. 12, 2021 and entitled "A METHOD FOR THE FABRICATION OF AN ELECTROLESS-METAL-PLATED SULFUR NANOCOMPOSITE, AN ELECTROLESS-METAL-PLATED SULFUR CATHODE WHICH IS MADE FROM THE NANOCOMPOSITE, AND A BATTERY THAT USES THE CATHODE," which is hereby incorporated by reference in its entirety.

TECHNICAL FIELD

This disclosure relates to a method for the fabrication of an electroless-metal-plated sulfur nanocomposite, an electroless-metal-plated sulfur cathode which is made from the nanocomposite, and a battery that uses the cathode.

BACKGROUND

For its low cost, natural abundance, and the highest theoretical charge-storage capacity among solid electrodes, sulfur is currently the most promising new material for high charge-storage capacity cathodes in next-generation lithium batteries. Not only does a lithium-sulfur (Li—S) battery have a high theoretical energy density that is several times higher than a lithium-ion battery (up to 2,500 Wh/kg), but its high charge-storage capacity sulfur cathode is also inexpensive and easily accessible, making it the new favorite among academics and the energy industry.

In the field of energy conversion and storage, metallic electrodes with electrocatalytic activity are known to facilitate the reaction kinetics and stability. Metal is therefore applied in sulfur cathodes to improve the chemical properties of batteries. However, the following problems still exist in the development of Li—S battery systems, and solutions have yet to be explored:

Sulfur composite requires addition of conductive carbon and polymer binders in the fabrication of electrodes:

A high charge-storage capacity sulfur cathode is an insulating active substance. Most prior art tackles the problem of low electrode conductivity in sulfur cathodes with the synthesis of sulfur composites. The majority of the research focuses on carbon-sulfur composites, while others focus on polymer sulfur composites. In carbon-sulfur composites, carbon's highly conductive and porous nature enhances the charge-storage capacity and stability of the sulfur cathode, whereas in polymer sulfur composites, polymer's sulfur adsorptivity improves the electrochemical stability of the electrode. However, each sulfur composite still requires additional mixing with conductive carbon and polymer binders in order to form a cathode (With reference to [Patent Literature 1], [Patent Literature 2]). Adding additional conductive carbon enhances the conductivity of the cathode, and adding the inactive binders helps the active substances mix and bond evenly with the conductive carbon. According to [Nonpatent Literature 1] to [Nonpatent Literature 3], the disadvantages that come with adding binders in the fabrication of cathodes include increased cathode resistance, decreased content of active substances, and the necessary use of cancer- and mutation-inducing, reproductively toxic N-Methylpyrrolidone (NMP).

Limitation of Low Sulfur Content in Cathodes:

Increasing the content of active substance (sulfur) in cathodes is the most essential step to realizing a high energy density battery. But due to the highly insulating nature of sulfur and the need of adding conductive carbon and binders (With reference to [Nonpatent Literature 1], [Nonpatent Literature 2]), Li—S batteries are mostly limited to a low sulfur content of around 30 to 60 wt %. Under such circumstances, not only is it difficult to realize the advantageous high energy density of sulfur cathodes, but it also fails to demonstrate the actual electrochemical reaction property of sulfur cathodes, which in turn leads to faulty research findings and delayed commercial application.

Difficulty in the Fabrication of High Sulfur Loading Cathodes:

Due to sulfur's highly insulating nature, when aiming for high energy density, increasing the sulfur loading from a commonly-used low sulfur loading of 2.0 mg/cm$^2$ to a higher loading of over 5 mg/cm$^2$ will result in a high sulfur loading cathode containing a high amount of insulating material, which increases the cathode resistance and has a negative impact on the reaction kinetics. Moreover, high sulfur loading cathodes contain a large amount of polysulfides that participate in the battery reaction, which further compromises the stability of the battery. As a result, most research on batteries stop at high sulfur loading cathodes, leaving a considerable gap between academic research and commercial application.

High Electrolyte-to-Sulfur Ratio:

According to [Nonpatent Literature 1] to [Nonpatent literature 3], during discharge, the sulfur cathode produces liquid polysulfides which is soluble in liquid electrolyte. The liquid polysulfides dissolved in the liquid electrolyte increase the viscosity of the liquid electrolyte and decreases its ionic conductivity; the liquid polysulfides dissolved in the liquid electrolyte are easily lost through the sulfur cathode, resulting in irreversible loss in the charge-storage capacity of the sulfur cathode; the liquid polysulfides dissolved in the liquid electrolyte then diffuses freely in the battery, and diffuses further to the lithium anode and causes corrosion to the lithium anode, resulting in instability of the electrodes and the liquid electrolyte, which in turn leads to unstable Coulombic efficiency and poor cyclability. Prior art uses a large amount of electrolyte (with an electrolyte-to-sulfur ratio of over 20 μL/mg) in order to ensure stable reaction and high Coulombic efficiency of the lithium battery. Moreover, prior art relies on the porous structure formed by the conductive carbon and conductive polymers for sulfur adsoprtion, which results from the addition of conductive carbon and binders. This method requires a considerable amount of electrolyte since the porous structure formed by the conductive carbon and conductive polymers adsorb a large amount of electrolyte, and the conductive carbon and binders also absorb part of the electrolyte. However, the excessive electrolyte makes it difficult to demonstrate the actual electrochemical reaction properties of the sulfur cathode and prevents the realization of the advantageous high energy density, eventually resulting in the delayed launch of Li—S batteries.

Limitations on the Application of Metal-Plated Sulfur Composites in Electrodes:

In principle, metal is the best material for composites as it is highly conductive, adsorbs polysulfides, and catalyzes sulfur. However, since metal has a higher relative weight to sulfur, the addition of metal may decrease the sulfur content in the cathode. Coupled with the deficiency in the current manufacturing process, no effective development on metal-plated sulfur composites has yet been achieved.

BRIEF SUMMARY

The electrochemical performance of Li—S batteries in prior art are hindered by problems including the necessary addition of conductive carbon and polymer binders in the sulfur composite during the fabrication of electrode, the low sulfur content in the cathode, difficulty in fabricating a high sulfur loading cathode, the high electrolyte-to-sulfur ratio, and the limited application of metal-plated sulfur composites in electrodes.

In order to solve such problems, the inventor of the present disclosure, after intensive and repeated research, provides a method for the fabrication of an electroless-metal-plated sulfur nanocomposite, an electroless-metal-plated sulfur cathode which is made from the nanocomposite, and a battery that uses the cathode to complete the present disclosure.

That is, the present disclosure relates to a method for the fabrication of an electroless-metal-plated sulfur nanocomposite, comprising the steps of:
  a. a sensitization step, wherein a sensitization solution is prepared by adding $SnCl_2$ to HCl, sulfur powder is added to the sensitization solution and stirred evenly, and the sensitization solution is filtered to collect a sensitized powder;
  b. an activation step, wherein an activation solution is prepared by adding $PdCl_2$ to HCl, the sensitized powder is added to the activation solution and stirred evenly, and the activation solution is filtered to collect a pre-treated powder;
  c. an acidic chemically plating step, wherein a solution 1 containing metal ions is prepared by dissolving sodium acetate and metallic salt in deionized water; a solution 2 is prepared by dissolving $NaH_2PO_2 \cdot H_2O$ in deionized water; solution 1 and solution 2 are preheated to the same temperature and mixed to form a mixture solution, the pre-treated powder is added to the mixture solution and stirred evenly until the metal ions are reduced to metal atoms and form a resulting product, then the resulting product is filtered, dried and ground to form an electroless-metal-plated sulfur nanocomposite.

The metallic salt is at least a substance selected from the group consisting of $AuCl_3$, AgCl, $CuCl_2$, $SnCl_4$, $NiCl_2$, $CoCl_2$, and $FeCl_3$.

The sensitization solution with the sulfur powder is stirred for 10 to 180 minutes in the sensitization step, preferably 60 minutes; the activation solution with the sensitized powder is stirred for 10 to 180 minutes in the activation step, preferably 60 minutes; the mixture solution with the pre-treated powder is stirred for 10 to 180 minutes in the acidic chemically plating step, preferably 60 minutes.

The same temperature that solutions 1 and 2 are preheated to is 70 to 90° C.

The electroless-metal-plated sulfur nanocomposite has a sulfur content of 60 to 95 wt %.

The electroless-metal-plated sulfur nanocomposite has a metal content of 5 to 40 wt %.

Further, the present disclosure relates to an electroless-metal-plated sulfur cathode fabricated by a drop-casting step, comprising the steps of:
  dissolving the electroless-metal-plated sulfur nanocomposite fabricated by the method above in an electrolyte, and drop-casting it on a current collector to form an electroless-metal-plated sulfur cathode which contains sulfur loading.

The electrolyte has an electrolyte-to-sulfur ratio that is 7 to 20 µL/mg.

The sulfur loading is 2 to 14 $mg/cm^2$ (sulfur weight/surface area of the electrode).

Further, the present disclosure relates to a battery that uses the electroless-metal-plated sulfur cathode of the above.

For the method for the fabrication of an electroless-metal-plated sulfur nanocomposite provided in the present disclosure, the sensitization solution with the sulfur powder is stirred for 10 to 180 minutes in the sensitization step, and the activation solution with the sensitized powder is stirred for 10 to 180 minutes in the activation step. Extended time of sensitization and activation allows for even pre-treatment of the sulfur particle surface, which creates the redox reaction sites and helps form a uniform coating. As a result, the electroless-metal-plated sulfur nanocomposite of the present disclosure can achieve a high metal content of 5 to 40 wt %.

The method for the fabrication of an electroless-metal-plated sulfur nanocomposite provided in the present disclosure adopts an acidic chemically plating process of 10 to 180 minutes (preferably 60 minutes) with a high temperature of 70 to 90° C. This helps to reduce the alloy impurities to below 1 to 1.5 wt %, allowing high metal content and high sulfur content in the present disclosure.

By controlling the concentration and temperature of the metal salt solution, the electroless-metal-plated sulfur nanocomposite of the present disclosure can reach a high metal content.

The electroless-metal-plated sulfur nanocomposite of the present disclosure can effectively improve the insulation of the sulfur cathode and significantly increase the active substance content (sulfur content) of the cathode to 60 to 95 wt %, achieving high sulfur content. This way, not only can high capacity and outstanding energy density be achieved, but the cycle stability of the battery is also increased, granting commercial prospects for batteries that uses the cathode.

The electroless-metal-plated sulfur nanocomposite of the present disclosure achieves high metal content. The conductive metal shell enhances the conductivity of the sulfur cathode and improves its reaction capability, increasing its electrochemical reactivity. Moreover, the nanocomposite shows strong adsorption for polysulfides and electrochemical catalytic capability, which effectively reduce the amount of electrolyte required and achieve a high sulfur loading cathode that exhibits excellent electrochemical utilization and electrochemical reversibility. The nanocomposite also allows the battery to perform stable and long-term cycles at different rates.

The electroless-metal-plated sulfur nanocomposite of the present disclosure does not require additional conductive carbon or binders, nor does it require additional process steps such as ball milling, coating, or dry pressing. It can be mixed directly with electrolyte to form a slurry, thus ensuring an even mix of the electrolyte and the electroless-metal-plated sulfur nanocomposite and allowing the electrolyte to sufficiently wet the electroless-metal-plated sulfur nanocomposite. As a result, the slurry can be directly drop-cast onto a current collector to form a cathode that exhibits good electronic conductivity due to the metal coating, good ionic conductivity due to electrolyte wetting, and good dispersibility of the electroless-metal-plated sulfur nanocomposite. Therefore, the cathode with high weight percentage of active substances (high sulfur content) can simultaneously increase the metal content of the electroless-metal-plated sulfur nanocomposite and demonstrate excellent performance. A battery that uses the cathode exhibits high conductivity, high capacity, high energy density, and cycle stability.

The cathode of the present disclosure is made with a drop-casting process and does not require additional conductive carbon and binders, which overcomes the problem of some electrolyte being absorbed by excess substance. Hence, it can prevent excessive use of the electrolyte, realize a lean-electrolyte condition in the battery, and further achieve high capacity, high energy density, and excellent battery stability.

Due to the high metal content (5 to 40 wt %) and high sulfur content (60 to 95 wt %) of the cathode that utilizes the electroless-metal-plated sulfur nanocomposite of the present disclosure and the lean-electrolyte condition of the battery, a stable cycle life of 200 cycles can be achieved at low C/20 (long-term), average C/10, and high C/5 to C/2 (high power) rates, as well as high capacity and high energy density.

By using the electroless-metal-plated sulfur nanocomposite with a plated metal shell, the electroless-metal-plated sulfur cathode of the present disclosure displays increased cathode conductivity, which helps deal with the slow reaction caused by the lean-electrolyte condition and the poor reactivity of $Li_2S$, and achieves high reaction kinetics. Thus, effectively lowering the electrolyte-to-sulfur ratio to a great extent allows the sulfur cathode to exhibit its actual electrochemical reaction properties, and also allows batteries the advantage of high energy density and high cycle stability.

The battery of the present disclosure displays high areal capacity (7 to 14 mA·h/cm$^2$) and high energy density (13 to 28 mW·h/cm$^2$). It also achieves long-term cyclability for 200 cycles at a wide range of cycling rates (C/20 to C/2), demonstrating potential in technological development and commercial value.

DETAILED DESCRIPTION

Figure 1A:
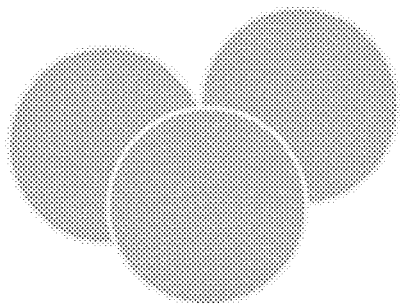
FIG. 1A shows the process of fabricating the electroless-nickel-plated sulfur nanocomposite and the drop-casting process.
Figure 1A:
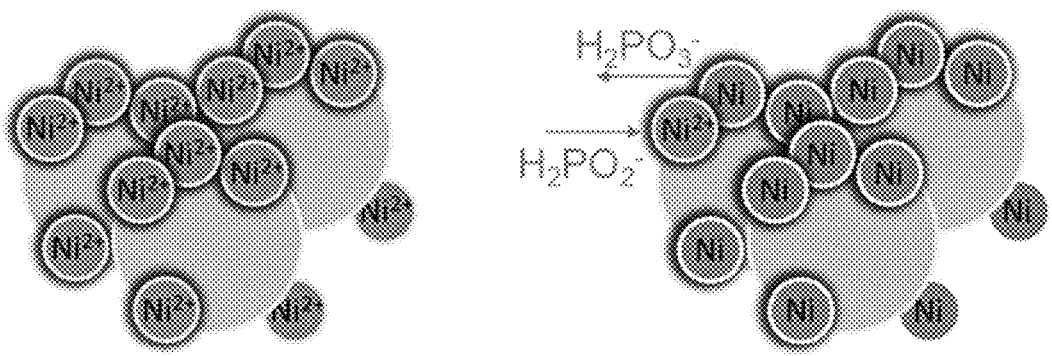
Figure 1A:
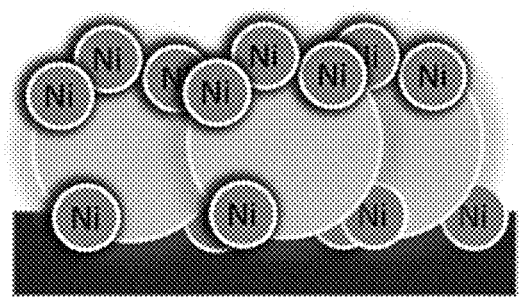

The following examples are given to describe the method for the fabrication of an electroless-metal-plated sulfur nanocomposite, an electroless-metal-plated sulfur cathode made from the nanocomposite, and a battery that uses the cathode of the present disclosure. It should be noted that the following examples are only given for illustrative purposes and are not intended to limit the scope of the present disclosure.

Example 1

Preparing the Electroless-Nickel-Plated Sulfur Nanocomposite:

The preparation of the electroless-nickel-plated sulfur nanocomposite begins with the sensitization of the materials. The sensitization solution is prepared as follows: dilute 4 ml HCl in 100 ml deionized water, and when evenly mixed, add 1 g $SnCl_2$ and stir with a magnet. Next, add commercial pure sulfur powder to the sensitization solution and stir evenly for 1 hour until the sulfur particles adsorb the easily-oxidized Sn' ions. Then the sensitization solution is filtered to collect the sensitized powder, and the sensitized powder is then added to an activation solution.

The activation solution is prepared as follows: dilute 0.25 ml HCl in 100 ml deionized water, and when evenly mixed, add 0.025 g $PdCl_2$ and mix evenly. Add the sensitization powder obtained earlier to the activation solution and mix evenly for 1 hour and rinse the surface of powder with deionized water, so that a highly active network is formed on the sulfur particle surface to obtain the pre-treated powder.

Subsequently, the acidic chemically plating process comprises the following steps: prepare a Watts bath plating solution by dissolving 5 g sodium acetate (NaAc) and 3 g $NiCl_2$ in 50 ml deionized water, and separately, dissolve 1 g $NaH_2PO_2 \cdot H_2O$ in 50 ml deionized water. Preheat the two solutions to 80° C., combine, add the activated pre-treated powder, and stir evenly with a glass rod for 1 hour, allowing the activated sulfur surface to adsorb the $Ni^{2+}$ ions in the solution. With the help of $NaH_2PO_2 \cdot H_2O$ as the reducing agent and a high temperature, the $Ni^{2+}$ ions disproportionate and reduce to Ni atoms. The reaction rate of nickel salts and reducing agents depend largely on the concentration of the reducing agent and temperature. The higher the concentration of the reducing agent, the stronger the reducing capability and faster the reaction. Upon completion of the reaction, rinse the surface 3 times with deionized water, filter, and collect the composite powder. Dry the composite powder in a 50° C. convection oven and grind to form the electroless-nickel-plated sulfur nanocomposite. The nanocomposite has a sulfur content of 74 wt %.

Preparing the Electroless-Nickel-Plated Sulfur Cathode

The electroless-nickel-plated sulfur cathode is formed with a drop-casting process, wherein the electroless-nickel-plated sulfur nanocomposite is dissolved in a suitable amount of electrolyte and drop-cast on a current collector, with the electrolyte-to-sulfur ratio (E/S) being 7 Ml/mg. The electrolyte is prepared by mixing 1.85 M Lithium bis (trifluoromethanesulfonyl)imide (LiTFSI), 0.2 M $LiNO_3$ and a Dimethoxyethane/Dioxolane (DME/DOL) solution with a volume ratio of 55:40, i.e., dissolving 50.5 mg LiTFSI and 1.3 mg $LiNO_3$ in 55 ml DME and 40 ml DOL.

Preparing the Battery

A battery is assembled in the order of the aforementioned cathode, a separator, and a lithium anode. Each component is sealed into a CR2032 button cell battery in a glove box in an argon environment, wherein the cathode has a sulfur loading of 14 mg/cm$^2$.

Example 2

Preparing the Electroless-Nickel-Plated Sulfur Nanocomposite

The preparation of the electroless-nickel-plated sulfur nanocomposite begins with the sensitization of the materials. The sensitization solution is prepared as follows: dilute 0.4 ml HCl in 10 ml deionized water, and when evenly mixed, add 0.1 g $SnCl_2$ and stir with a magnet. Next, add commercial pure sulfur powder to the sensitization solution and stir evenly for 1 hour until the sulfur particles adsorb the easily-oxidized Sn' ions. Then the sensitization solution is filtered to collect the sensitized powder, and the sensitized powder is then added to an activation solution.

The activation solution is prepared as follows: dilute 0.025 ml HCl in 10 ml deionized water, and when evenly mixed, add 0.0025 g $PdCl_2$ and mix evenly. Add the sensitization powder obtained earlier to the activation solution and mix evenly for 1 hour and rinse the surface of powder with deionized water, so that a highly active network is formed on the sulfur particle surface to obtain the pre-treated powder.

Subsequently, the acidic chemically plating process comprises the following steps: prepare 0.1 M $NiCl_2$ plating solution (a Watts bath) by dissolving sodium acetate (NaAc) and $NiCl_2$ in 5 ml deionized water, and separately, dissolve $NaH_2PO_2 \cdot H_2O$ in 5 ml deionized water, wherein the weight of the $NaH_2PO_2 \cdot H_2O$ and $NiCl_2$ powder are determined based on an ion ratio $Ni^{2+}:H_2PO_2^{2-}$ of 0.5. Preheat the two solutions to 70° C., combine, and add the activated pre-treated powder, and stir evenly with a glass rod for 1 hour, allowing the activated sulfur surface to adsorb the $Ni^{2+}$ ions in the solution. With the help of $NaH_2PO_2 \cdot H_2O$ as the reducing agent and a high temperature, the $Ni^{2+}$ ions disproportionate and reduce to Ni atoms. The reaction rate of nickel salts and reducing agents depend largely on the concentration of the reducing agent and temperature. The higher the concentration of the reducing agent, the stronger the reducing capability and faster the reaction. Upon completion of the reaction, rinse the surface 3 times with deionized water, filter, and collect the composite powder. Dry the composite powder in a 50° C. convection oven and grind to form the electroless-nickel-plated sulfur nanocomposite. The nanocomposite has a sulfur content of 95 wt %.

Preparing the Electroless-Nickel-Plated Sulfur Cathode

The electroless-nickel-plated sulfur cathode is formed with a drop-casting process, wherein the electroless-nickel-plated sulfur nanocomposite is dissolved in a suitable amount of electrolyte and drop-cast on a current collector, with the electrolyte-to-sulfur ratio being 20 Ml/mg. The electrolyte is prepared by mixing 1.85 M LiTFSI, 0.2 M $LiNO_3$ and a DME/DOL solution with a volume ratio of 55:40, i.e., dissolving 50.5 mg LiTFSI and 1.3 mg $LiNO_3$ in 55 ml DME and 40 ml DOL.

Preparing the Battery

A battery is assembled in the order of the aforementioned cathode, a separator, and a lithium anode. Each component is sealed into a CR2032 button cell battery in a glove box in an argon environment, wherein the cathode has a sulfur loading of 2 mg/cm².

Example 3

Except for adjusting the concentration of the $NiCl_2$ plating solution to 0.25M in the preparing the eletroless-nickel-plated sulfur nanocomposite step, the electroless-nickel-plated sulfur nanocomposite, the electroless-nickel-plated sulfur cathode and the battery are prepared as in Example 2.

Example 4

Except for adjusting the preheated temperature of the two solutions to 80° C. and adjusting the sulfur content to 85 wt % in the preparing the eletroless-nickel-plated sulfur nanocomposite step, the electroless-nickel-plated sulfur nanocomposite, the electroless-nickel-plated sulfur cathode and the battery are prepared as in Example 2.

Example 5

Except for adjusting the $NiCl_2$ plating solution to 0.25M, adjusting the preheated temperature of the two solutions to 80° C., and adjusting the sulfur content to 75 wt % in the preparing the eletroless-nickel-plated sulfur nanocomposite step, the electroless-nickel-plated sulfur nanocomposite, the electroless-nickel-plated sulfur cathode and the battery are prepared as in Example 2.

Example 6

Except for adjusting the preheated temperature of the two solutions to 90° C., and adjusting the sulfur content to 75 wt % in the preparing the eletroless-nickel-plated sulfur nanocomposite step, the electroless-nickel-plated sulfur nanocomposite, the electroless-nickel-plated sulfur cathode and the battery are prepared as in Example 2.

Example 7

Except for adjusting the $NiCl_2$ plating solution to 0.25M, adjusting the preheated temperature of the two solutions to 90° C., and adjusting the sulfur content to 60 wt % in the preparing the eletroless-nickel-plated sulfur nanocomposite step, the electroless-nickel-plated sulfur nanocomposite, the electroless-nickel-plated sulfur cathode and the battery are prepared as in Example 2.

Examples 8 to 13

In Examples 8 to 13, except for adjusting the sulfur loading of Examples 2 to 7 to 6 mg/cm² in the preparing the battery step, the electroless-nickel-plated sulfur nanocomposite, the electroless-nickel-plated sulfur cathode and the battery are prepared as in Example 2 to 7.

Comparative Examples 1 to 6

Preparing the Pure Sulfur Cathode

Mix 75 mg of pure sulfur powder with 25 mg of SuperP conductive carbon black, and set the mixed powder in a convection oven at 50° C. to form a 75 wt % pure sulfur powder with 25 wt % conductive carbon. The 75 wt % pure sulfur cathode is formed with a drop-casting process, wherein the 75 wt % sulfur powder is dissolved in a suitable amount of electrolyte and drop-cast on a current collector, with the electrolyte-to-sulfur ratio being 7 Ml/mg. Repeat the above process to form the 75 wt % pure sulfur cathode in Comparative Examples 1 to 6.

Preparing the Battery

A battery is assembled in the order of the aforementioned 75 wt % pure sulfur cathode, a separator, electrolyte and a lithium anode. Each component is sealed into a CR2032 button cell battery in a glove box in an argon environment.

The electrolyte is prepared by mixing 1.85 M LiTFSI, 0.2 M LiNO$_3$ and a DME/DOL solution with a volume ratio of 55:40, i.e., dissolving 50.5 mg LiTFSI and 1.3 mg LiNO$_3$ in 55 ml DME and 40 ml DOL.

Further description and analysis on the electroless-nickel-plated sulfur nanocomposite, the electroless-nickel-plated sulfur cathode and the battery in Example 1 are given as follows:

The Electroless-Nickel-Plated Sulfur Nanocomposite:

FIG. 1A shows the method of synthesizing the electroless-nickel-plated sulfur nanocomposite, wherein sulfur powder (sulfur particles) serves as the raw substrate for the nickel-plating process. To improve coating homogeneity, SnCl$_2$ and PbCl$_2$ are used as a sensitizer and activator respectively to generate catalytic active sites on the sulfur particles. The sensitization process makes the sulfur surface adsorb the easily-oxidized Sn' ions. During the subsequent activation process, the Sn' ions are oxidized and generate an activated layer on the sulfur surface as the crystalline core, which accelerates the reduction of nickel ions and promotes uniform coating of nickel. Electroless-nickel plating is an autocatalysis reaction involving the reduction of nickel ions from a nickel salt on the surface of a reducing agent, as follows: $H_2PO_2^- + Ni^{2+} + H_2O \rightleftharpoons H_2PO_3^- + Ni^0 + 2H^+$.

The stirring time in the sensitization and activation process in Example 1 lasts for 1 hour each. This timeframe allows for even pre-treatment of the sulfur particles on the self-redox reaction sites and helps form a uniform coating. As a result, the electroless-nickel-plated sulfur nanocomposite contains high nickel content.

The electroless-nickel plating is conducted using a nickel salt and a strong reducing agent, which deposits metallic nickel ions on the sulfur surface. The resulting electroless-nickel-plated sulfur nanocomposite changes in color from yellow to yellowish-grey after deposition, and becomes magnetic. The change of its physical properties shows that the electroless-nickel-plated sulfur nanocomposite is formed with the formation of the nickel-coating layer on the sulfur-based nanocomposite.

Figure 1B:
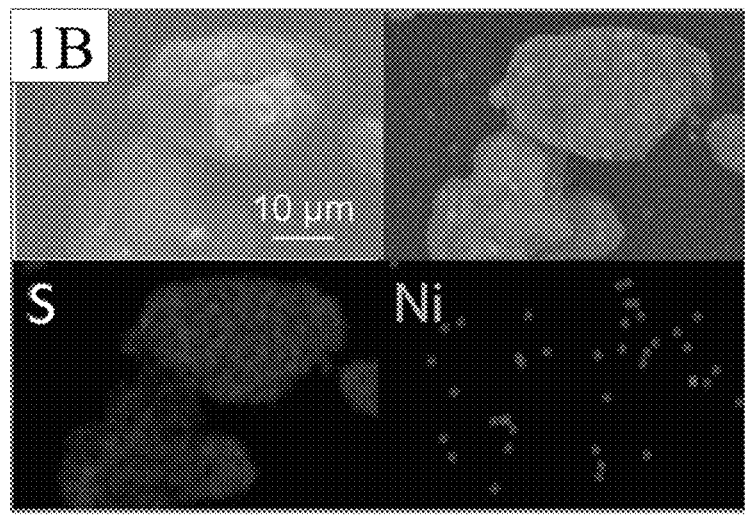
FIG. 1B shows the microstructural and elemental analysis (SEM) of sulfur powder and FIG. 1C shows the microstructural and elemental analysis (SEM) of the electroless-nickel-plated sulfur nanocomposite.
Figure 1C:
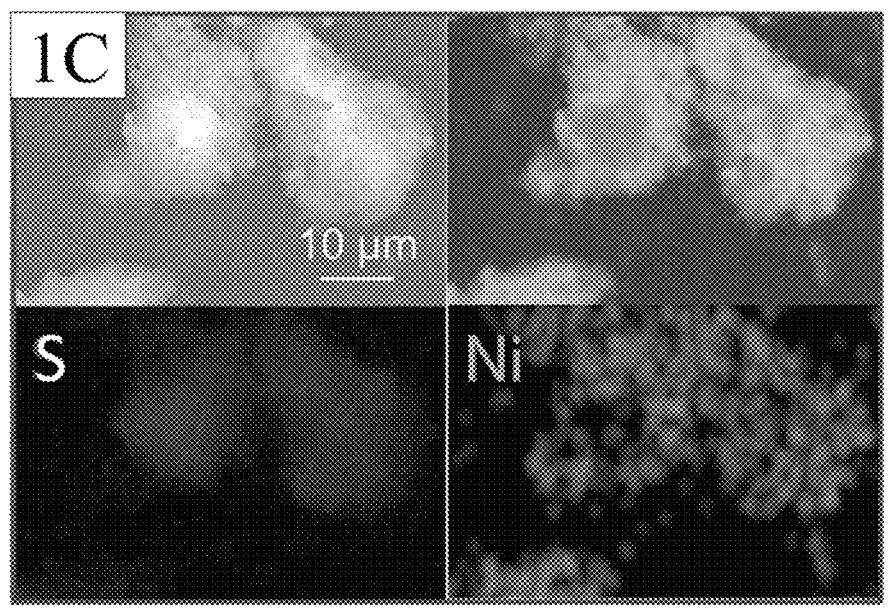

The microstructure and elemental composition of the pure sulfur powder and electroless-nickel-plated sulfur nanocomposite are compared by scanning electron microscopy (SEM). As shown in FIG. 1B and FIG. 1C, the pure sulfur powder shows a rough surface and a particle size of 10 to 20 µm. Meanwhile, the electroless-nickel-plated sulfur nanocomposite features a thin layer of nickel uniformly coated on the sulfur particles, which maintains almost the same particle sizes as the pure sulfur powder. Further elemental analysis indicates that the chemical composition of the electroless-nickel-plated sulfur nanocomposite is 74 wt % sulfur, 24 wt % nickel, and 2 wt % phosphorus (impurities).

Figure 1D:
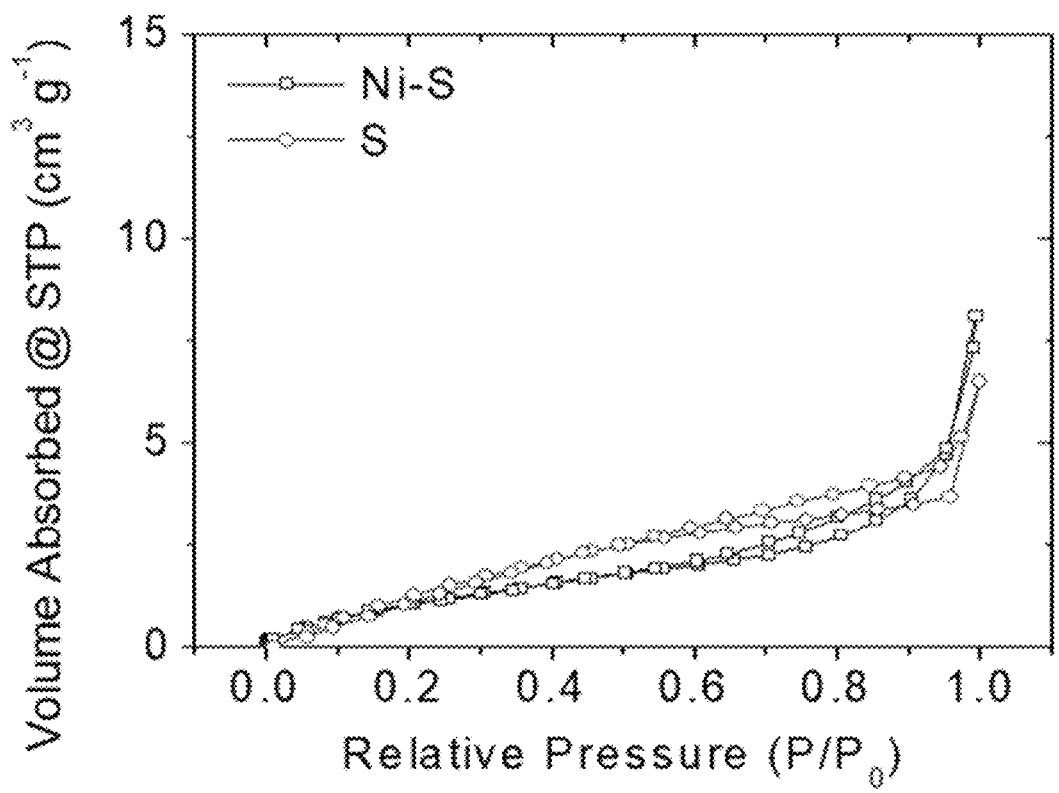
FIG. 1D shows the nitrogen adsorption-desorption isotherms of the electroless-nickel-plated sulfur nanocomposite and the sulfur powder.
Figure 1E:
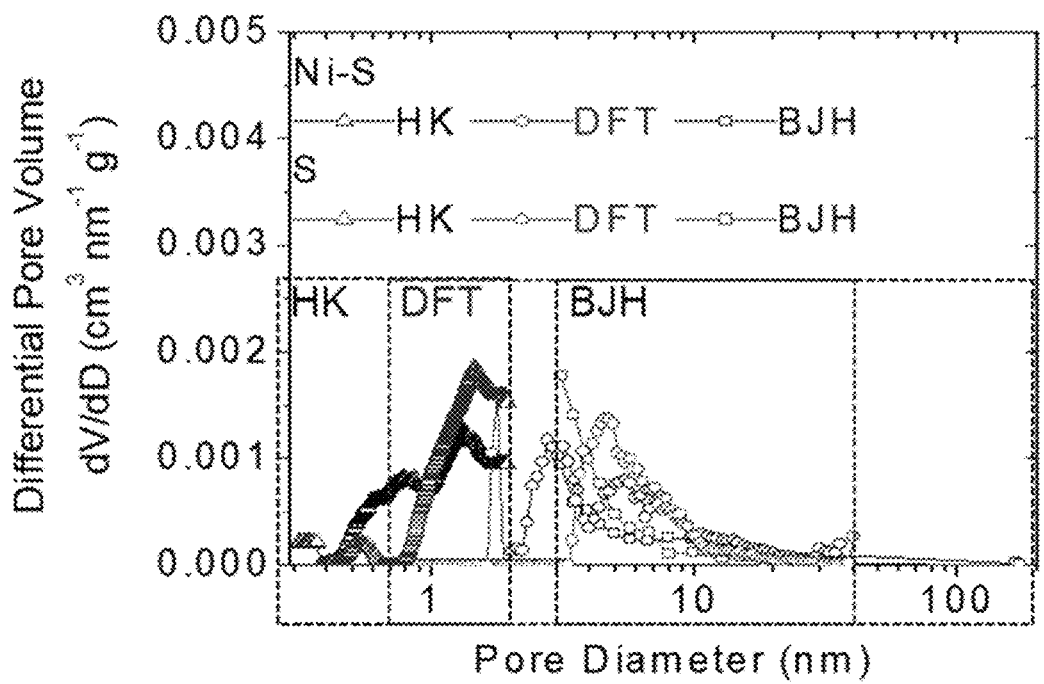
FIG. 1E shows a porosity analysis of the electroless-nickel-plated sulfur nanocomposite and the sulfur powder.
Figure 2A:
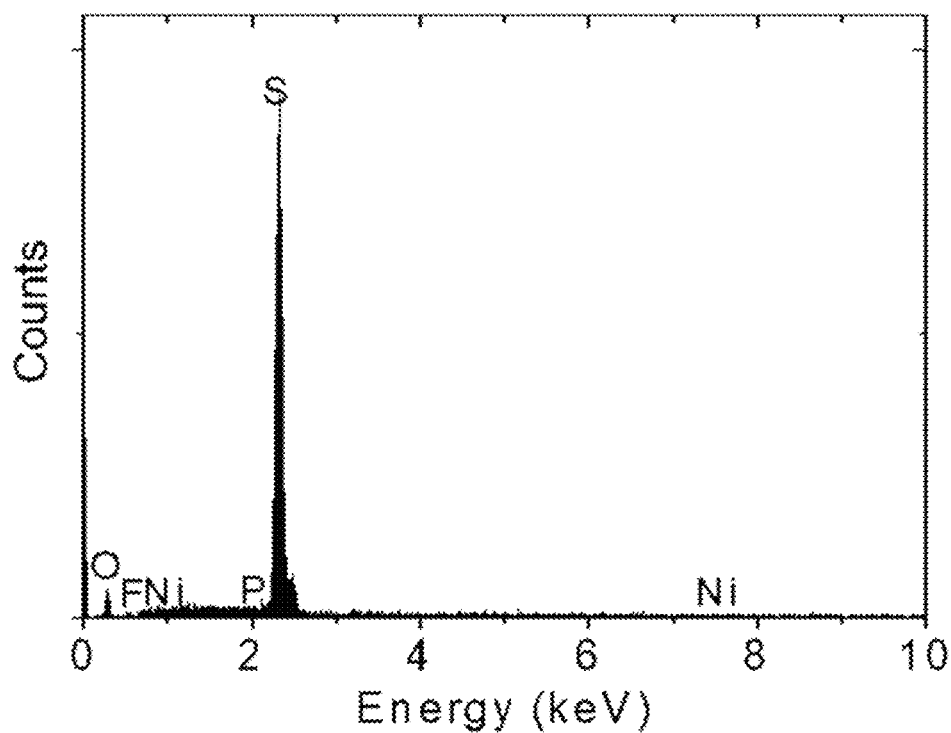
FIG. 2A shows the energy-dispersive X-ray spectra of the sulfur powder and FIG. 2B shows the energy-dispersive X-ray spectra of the electroless-nickel-plated sulfur nanocomposite.
Figure 2B:
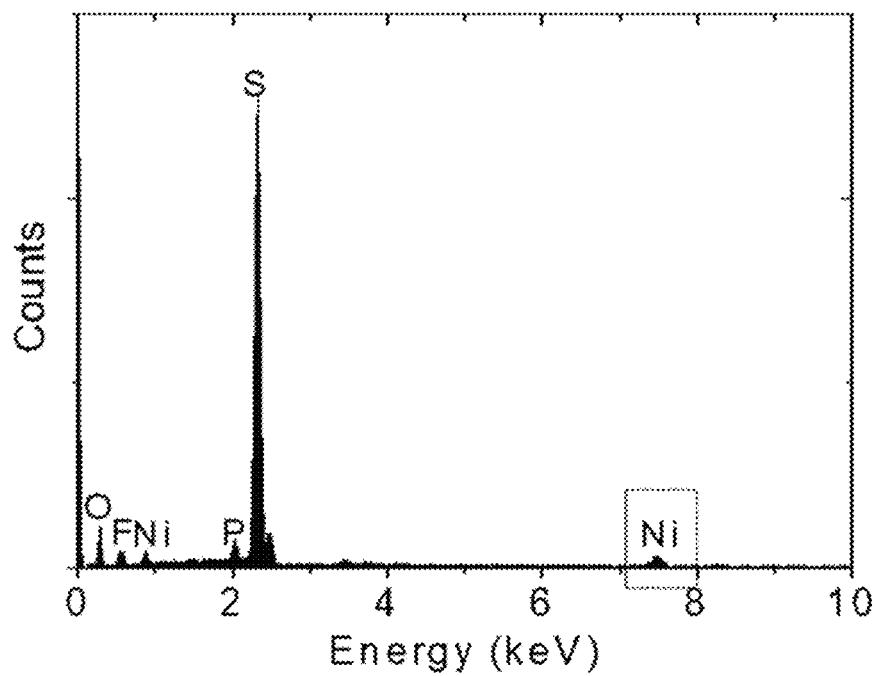
Figure 3:
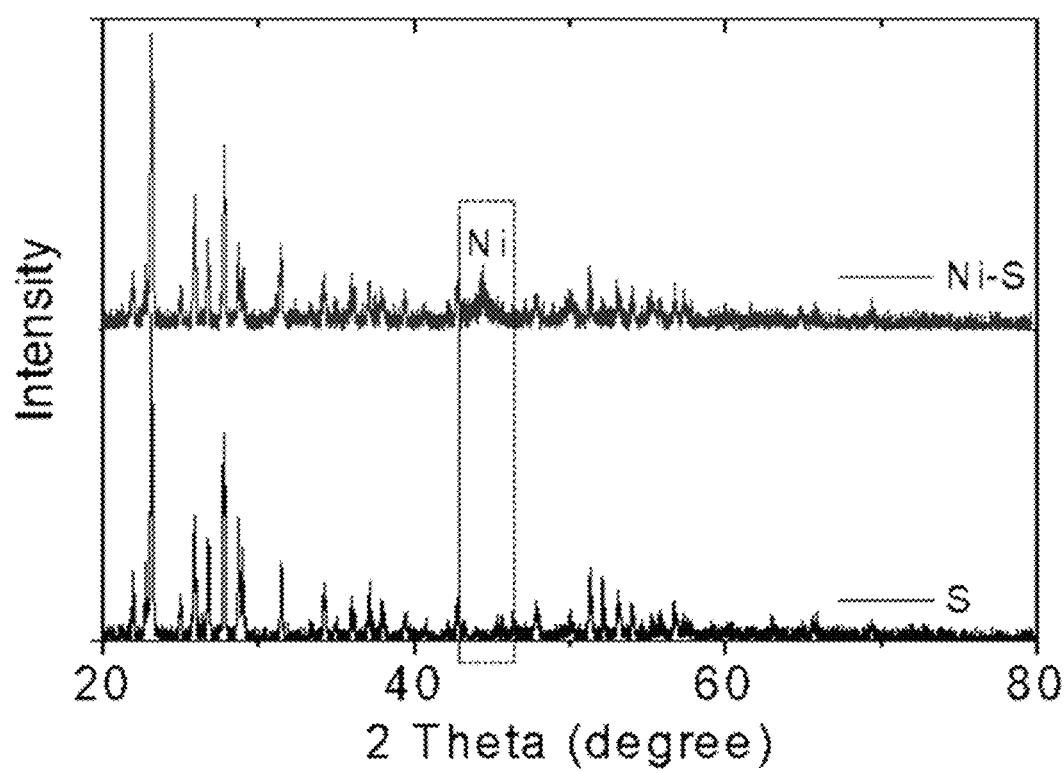
FIG. 3 shows the X-ray diffraction spectra of the sulfur powder and electroless-nickel-plated sulfur nanocomposite.
Figure 4A:
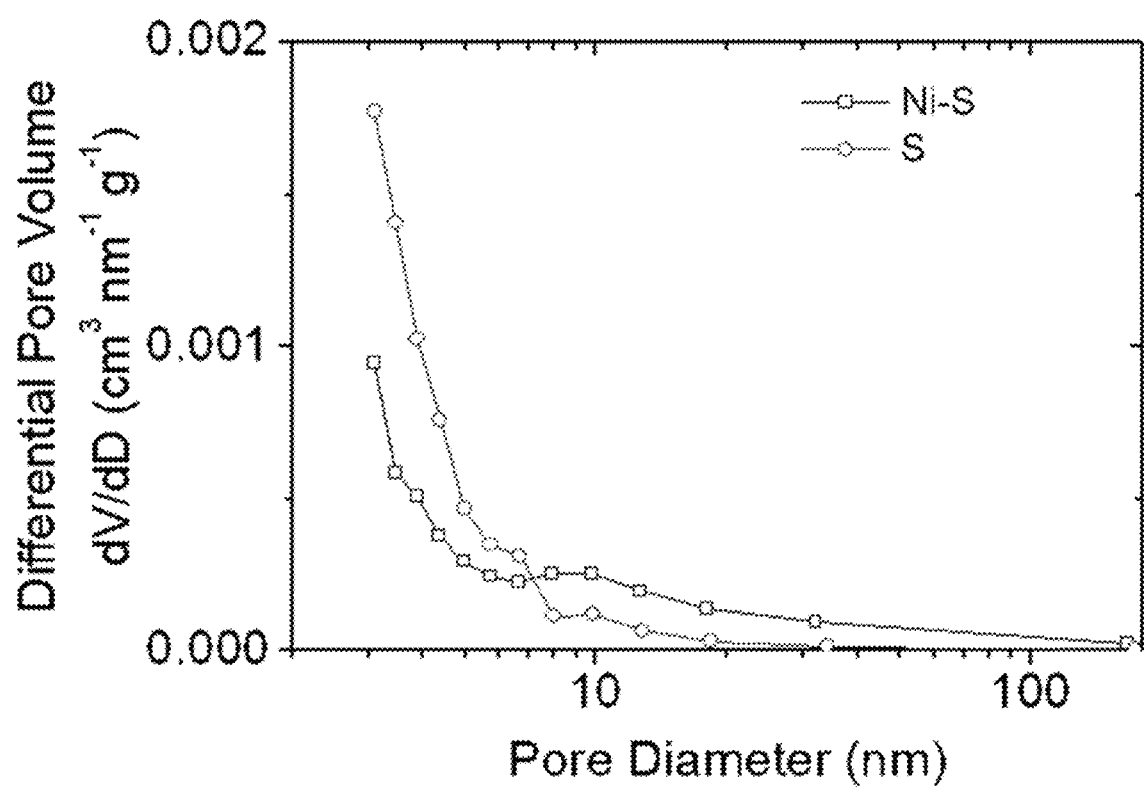
FIG. 4A shows the pore-size distribution analysis of the electroless-nickel-plated sulfur nanocomposite and sulfur powder conducted with the Barrett-Joyner-Halenda method.
Figure 4B:
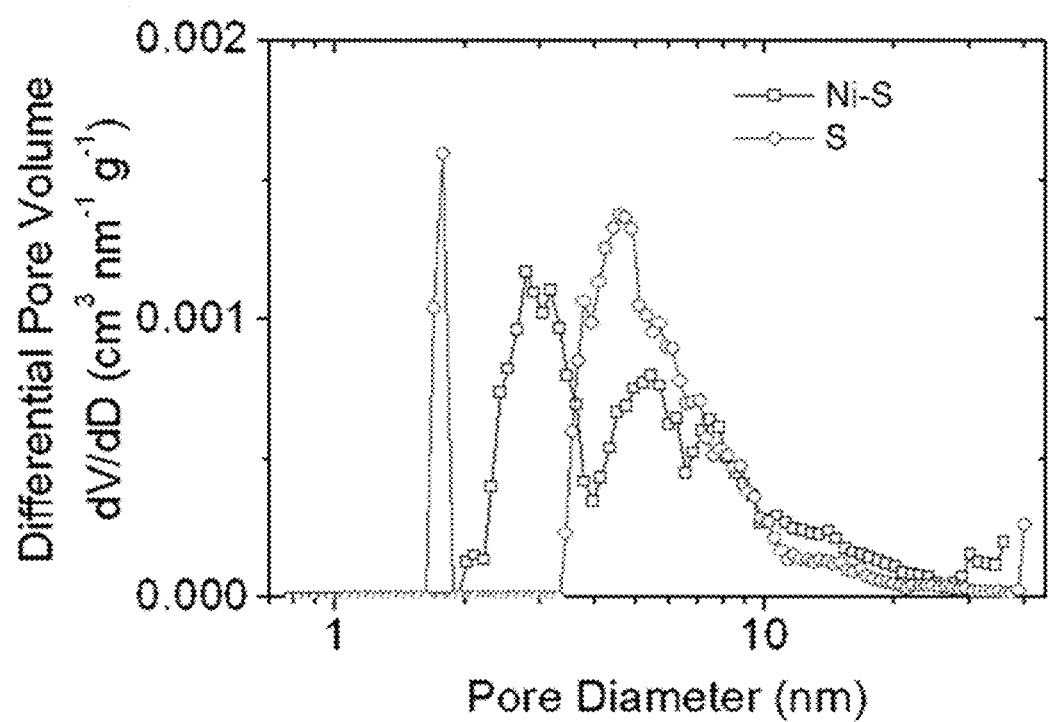
FIG. 4B shows the pore-size distribution analysis of the electroless-nickel-plated sulfur nanocomposite and sulfur powder conducted with the density functional theory method.
Figure 4C:
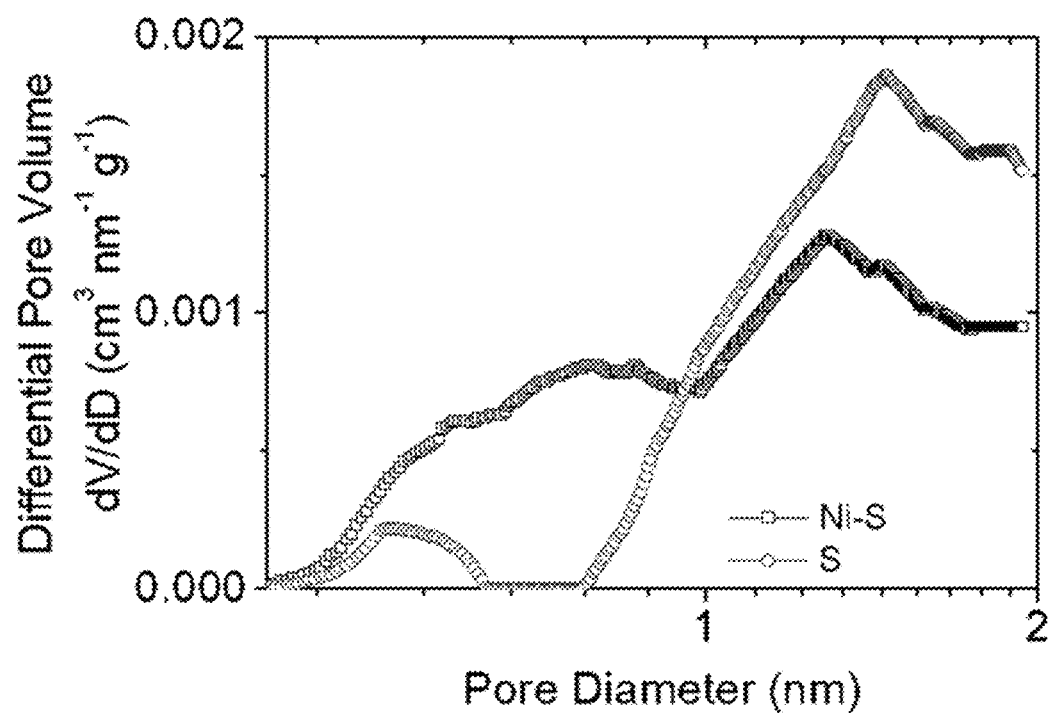
FIG. 4C shows the pore-size distribution analysis of the electroless-nickel-plated sulfur nanocomposite and sulfur powder conducted with the Horvath-Kawazoe method.

FIG. 2A, FIG. 2B and FIG. 3 are the energy dispersive spectroscopy (EDS) and X-ray diffraction (XRD) spectra of the pure sulfur powder and the electroless-nickel-plated sulfur nanocomposite, respectively. These figures also confirm the existence of the nickel coating. Four point resistivity measurement system is used for measurement, and the results show that the conductivity of the electroless-nickel-plated sulfur nanocomposite increases from purely insulating to 0.03 S/cm, and its surface area and pore size distribution are shown in FIG. 1D and FIG. 1E. The nitrogen adsorption-desorption isotherms indicate that the material features a similar surface adsorption-desorption behavior before and after the electroless-nickel-plating process. The pore-size analysis in FIG. 4A, FIG. 4B, and FIG. 4C show that the material has a low surface area (less than 10 m$^2$/g) and a total pore volume of 0.01 cm$^3$/g both before and after the electroless-nickel-plating process, suggesting that both powders are non-nanoporous materials (Surface area less than 10 m$^2$/g is defined as non-nanoporous material). The detailed physiochemical properties of the materials are summarized below in Table 1. Such properties indicate that the electroless-nickel-plating process only adds a nickel nano-shell layer (nickel coating) onto the sulfur particles with no obvious changes in the composition or structure of the sulfur substrate.

TABLE 1

| Sample | Surface area (m$^2$/g) | Pore volume (cm$^3$/g) | Microporosity Surface area (m$^2$/g) | Microporosity Pore volume (cm$^3$/g) | Particle size (µm) | Electrical conductivity |
| --- | --- | --- | --- | --- | --- | --- |
| Electroless-nickel-plated sulfur nanocomposite | 4.82 | 0.01 | 0 | 0 | 10 to 20 | $3 \times 10^{-2}$ |
| Pure sulfur powder | 8.56 | 0.01 | 0 | 0 | 10 to 20 | $10^{-30}$ |

Since metallic nickel has a high conductivity of over 0.1 S/cm, the present disclosure applies nickel in the sulfur cathode to improve the chemical properties of Li—S batteries, including decreasing cathode resistance, increasing polysulfide retention, and facilitating the redox reaction of the solid active materials. To form the cathode, the electroless-nickel-plated sulfur nanocomposite is dispersed in liquid electrolyte, and drop-cast onto a current collector, as shown in FIG. 1A. The electroless-nickel-plated sulfur nanocomposite of the present disclosure does not require additional conductive carbon or binders, nor does it require additional process steps such as ball milling, coating, or dry pressing. It can be mixed directly with electrolyte to form a slurry, thus ensuring an even mix of the electrolyte and the electroless-nickel-plated sulfur nanocomposite and allowing the electrolyte to sufficiently wet the electroless-nickel-plated sulfur nanocomposite. As a result, the slurry can be directly drop-cast onto the current collector and form a cathode, which exhibits good electronic conductivity due to the metallic nickel coating, good ionic conductivity due to electrolyte wetting, and good dispersibility of the electroless-nickel-plated sulfur nanocomposite. Thus, the cathode can then demonstrate its great performance with high weight percentage of active substances (high sulfur content) while simultaneously increasing the nickel content of the electroless-nickel-plated sulfur nanocomposite so that the battery that uses the cathode exhibits high capacity, high energy density, and cycle stability.

Figure 1F:
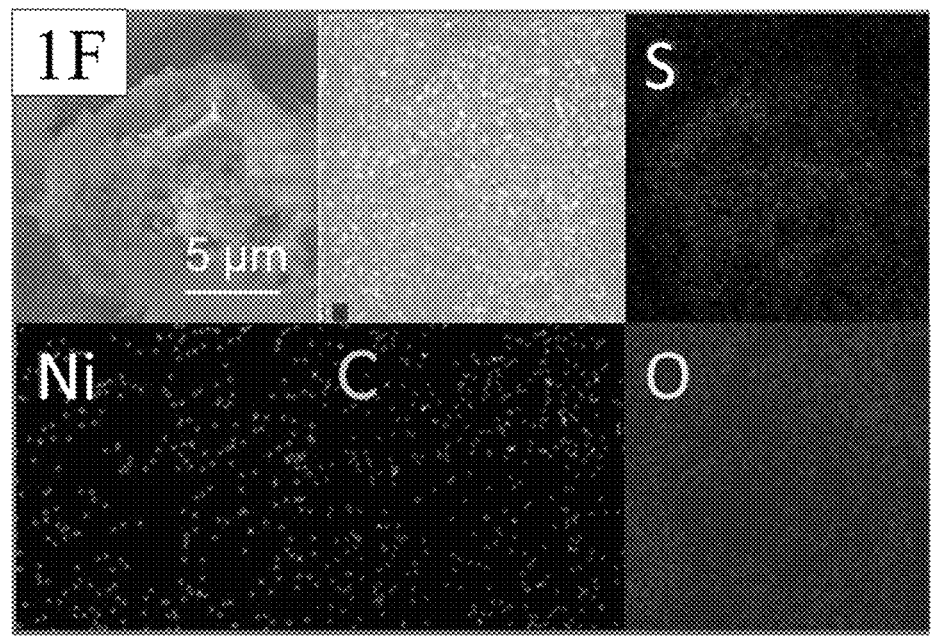
FIG. 1F shows the microstructural and elemental analysis (SEM) of the electroless-nickel-plated sulfur cathode before cycling for 200 cycles.
Figure 1G:
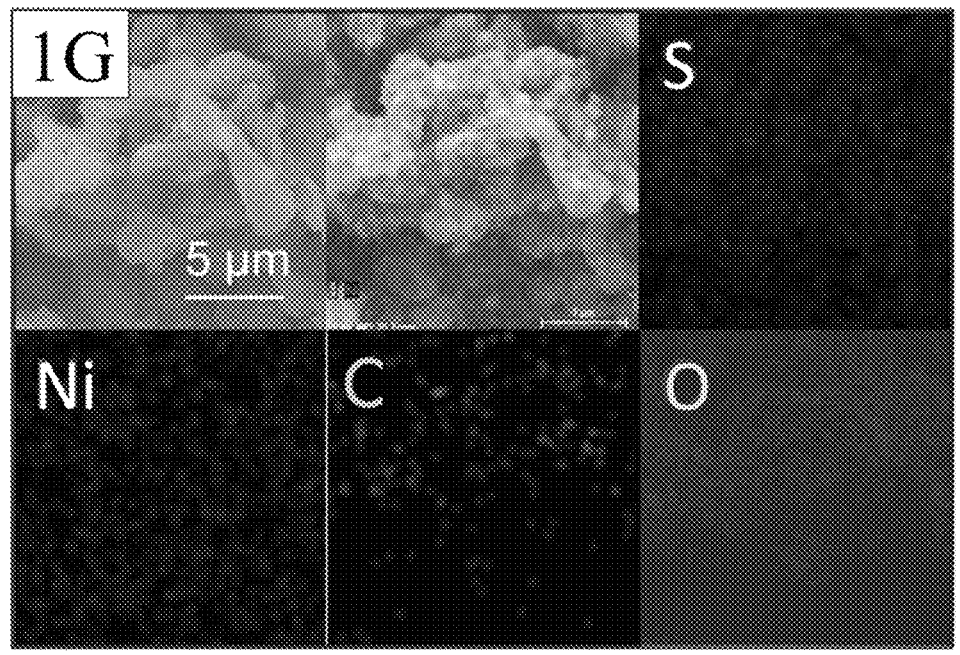
FIG. 1G shows the microstructural and elemental analysis (SEM) of the electroless-nickel-plated sulfur cathode after cycling for 200 cycles.

As shown in FIG. 1F and FIG. 1G, the elemental analysis shows that the electroless-nickel-plated sulfur cathode has an apparent nickel coating tightly attached on the sulfur particles. According to Table 1, the nickel coating improves the conductivity of the electroless-nickel-plated sulfur nanocomposite and forms a long-range electron transfer network, thus decreasing the cathode impedance. Moreover, the conductive network can be uniformly applied to each sulfur particle in order to trap and electrocatalyze the polysulfide species during cycling. Thus, as shown in FIG. 1G, even though the cycled electroless-nickel-plated sulfur cathode is directly exposed to the liquid electrolyte, the solid sulfur-based active material still exhibits strong elemental sulfur signals in the cathode, proving the enhanced polysulfide retention and limited active-material loss. The surface of the cycled electroless-nickel-plated sulfur nanocomposite has muddy deposition, resulting from the stabilized sulfur species converted from the trapped polysulfides. The muddy deposits mainly concentrate at the electrocatalytic nickel spots and form small particles rather than huge clusters, suggesting they remain high electrochemical activity.

Figure 5A:
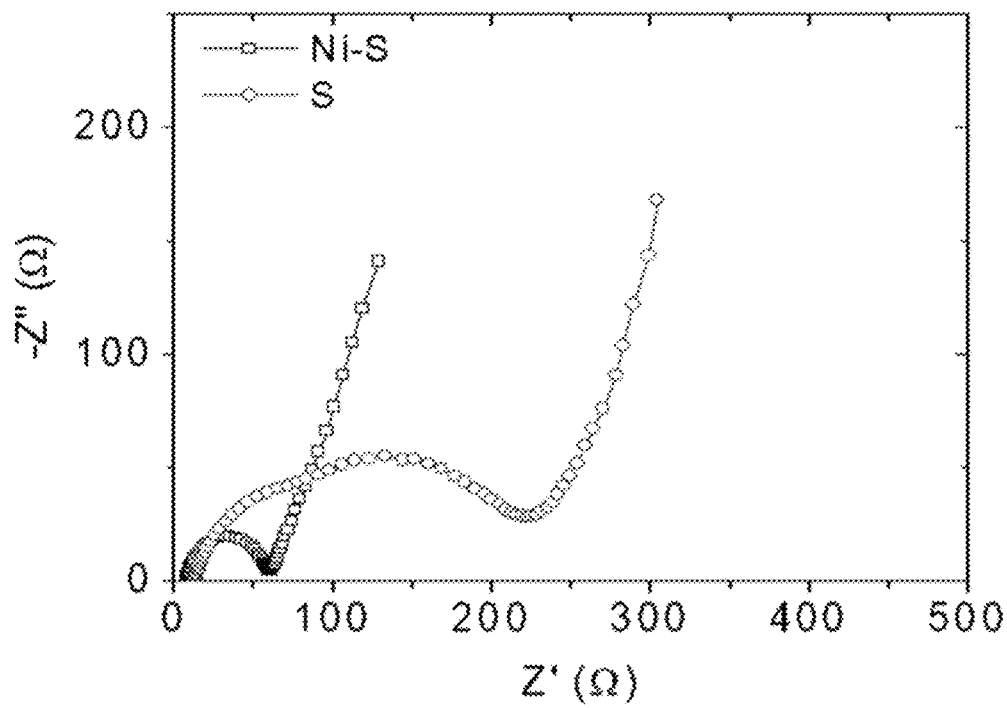
FIG. 5A shows the Nyquist plot and FIG. 5B shows the Bode plot of the electroless-nickel-plated sulfur nanocomposite and sulfur powder.
Figure 5B:
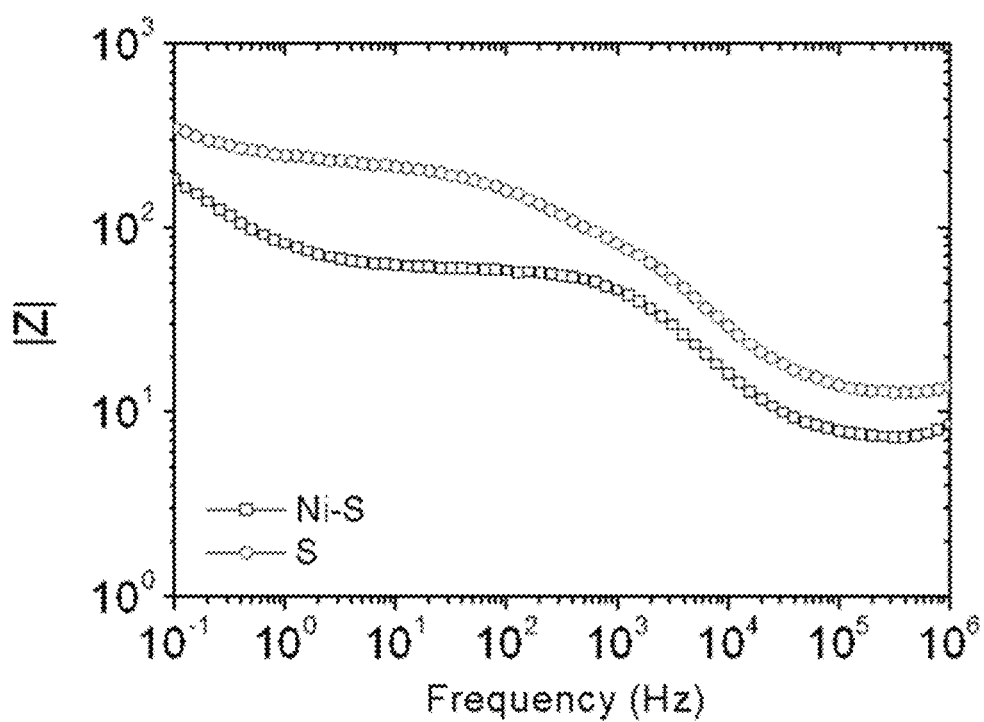
Figure 5C:
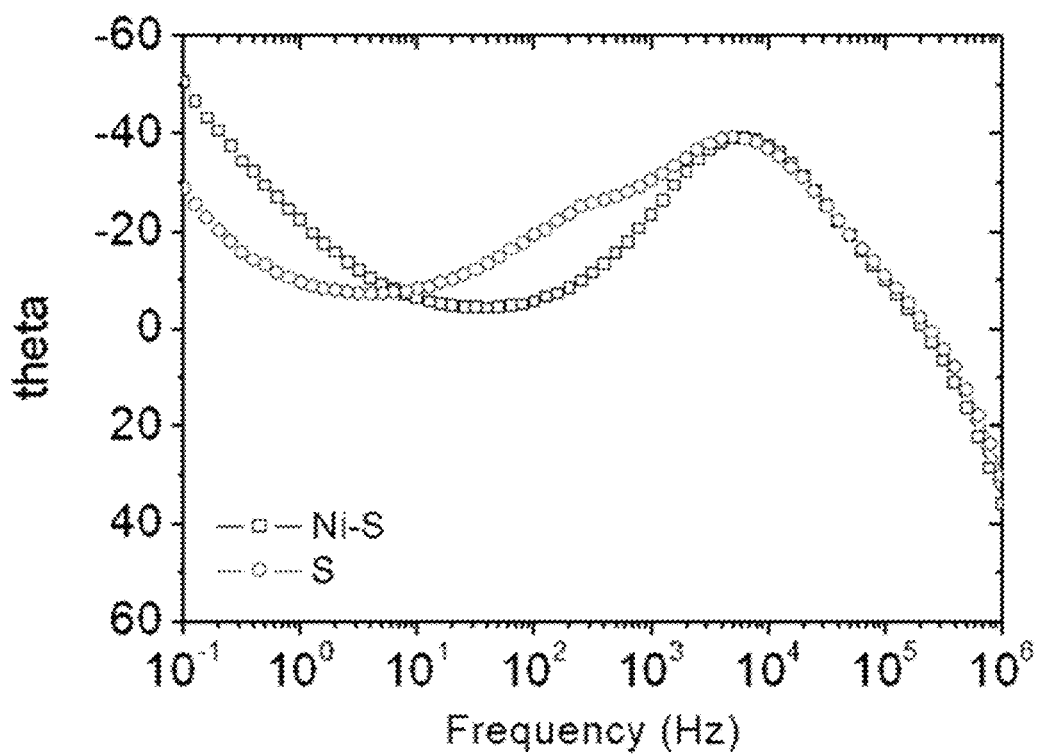
FIG. 5C shows the Bode plot of the electroless-nickel-plated sulfur nanocomposite and sulfur powder.

Electrochemical Characteristics of the Electroless-Nickel-Plated Sulfur Cathode and Battery:

FIGS. 5A, 5B, 5C, 5D, 5E, 5F, 5G, 5H, and 5I show the electrochemical characterization of the electroless-nickel-plated sulfur cathode and battery. The battery resistance and reaction kinetics of the battery is analyzed by electrochemical impedance spectroscopy (EIS), as shown in FIGS. 5A, 5B, and 5C. The Nyquist plots of the electroless-nickel-plated sulfur cathode and the reference sulfur cathode demonstrate a low bulk resistance of 7 and 13 Ohm, respectively, at the real part of the impedance. The semicircles arising from the charge-transfer impedance indicate that the conductive nickel coating decreases the charge-transfer resistance from 210 to 52 Ohm, which would benefit the reaction capability of the electroless-nickel-plated sulfur cathode, allowing it to attain high electrochemical utilization and rate capability. The inclined line at the low-frequency region denotes the Warburg impedance, which presents a lower diffusion impedance in the electroless-nickel-plated sulfur cathode. The main enhancement of the electroless-nickel-plated sulfur nanocomposite in reducing the charge-transfer and diffusion impedances is reaffirmed by the Bode plots.

Figure 5D:
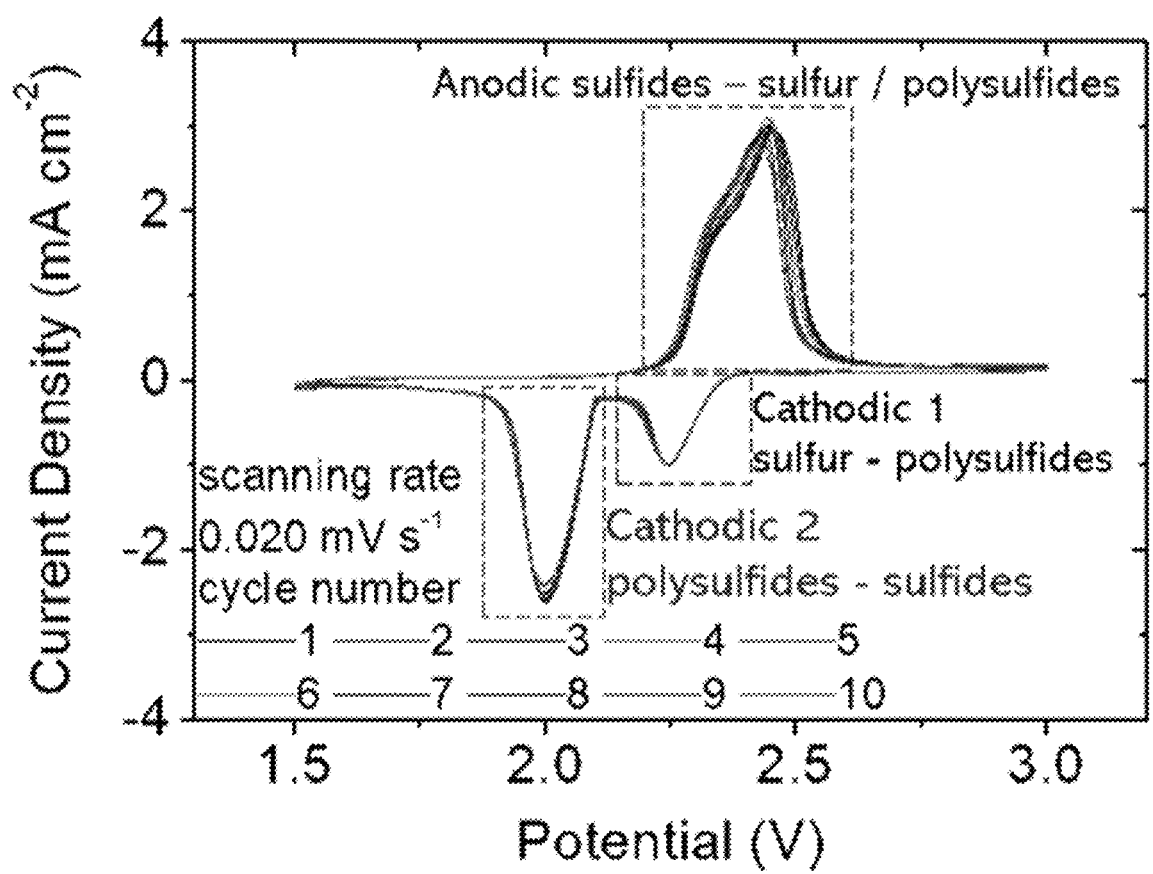
FIG. 5D shows CV curves of electroless-nickel-plated sulfur cathode at the scan rates of 0.020 for 10 CV scannings.
Figure 5E:
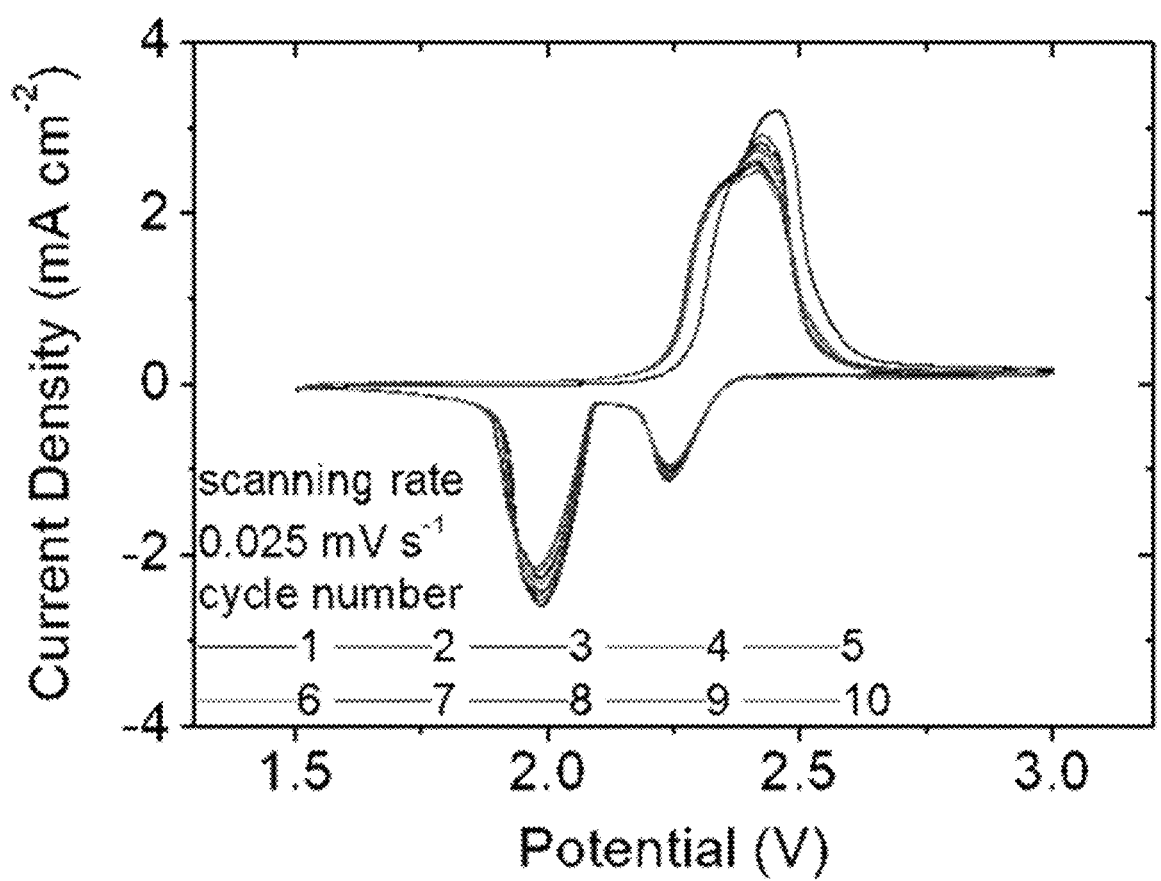
FIG. 5E shows CV curves of electroless-nickel-plated sulfur cathode at the scan rates of 0.025 for 10 CV scannings.
Figure 5F:
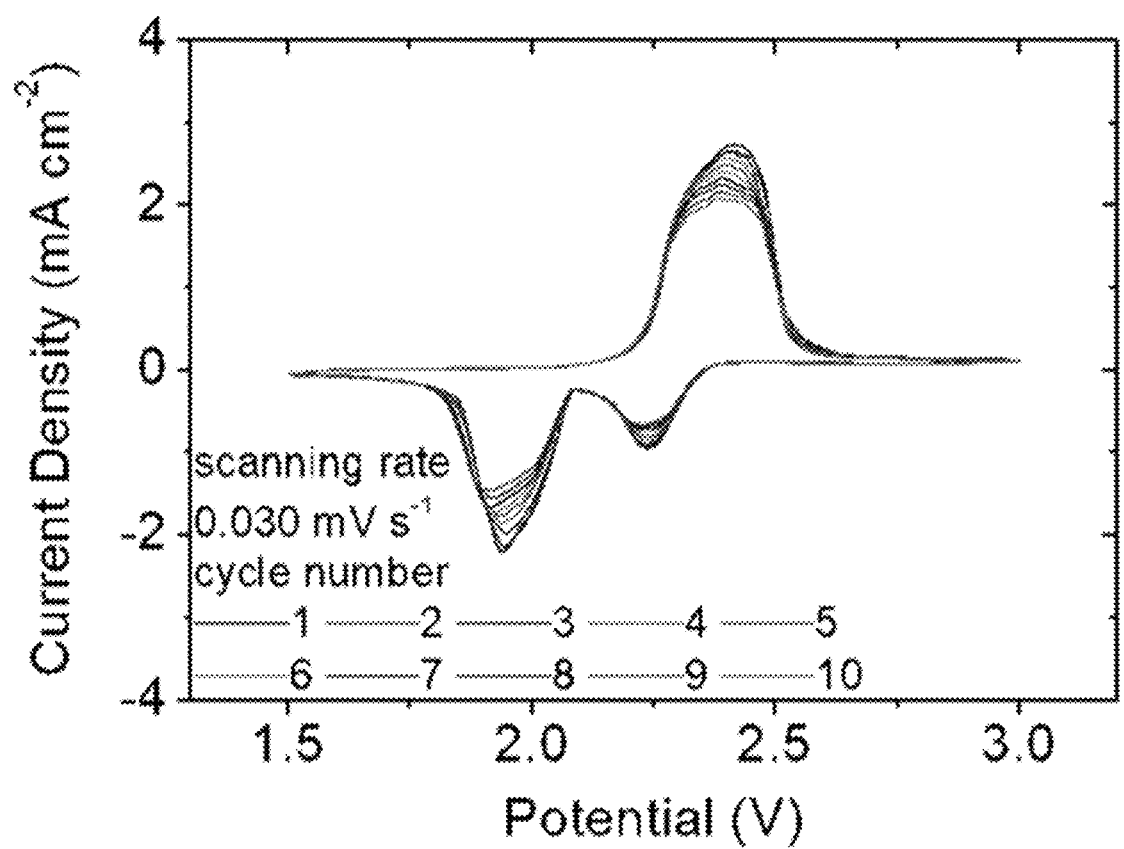
FIG. 5F shows CV curves of electroless-nickel-plated sulfur cathode at the scan rates of 0.030 for 10 CV scannings.
Figure 5G:
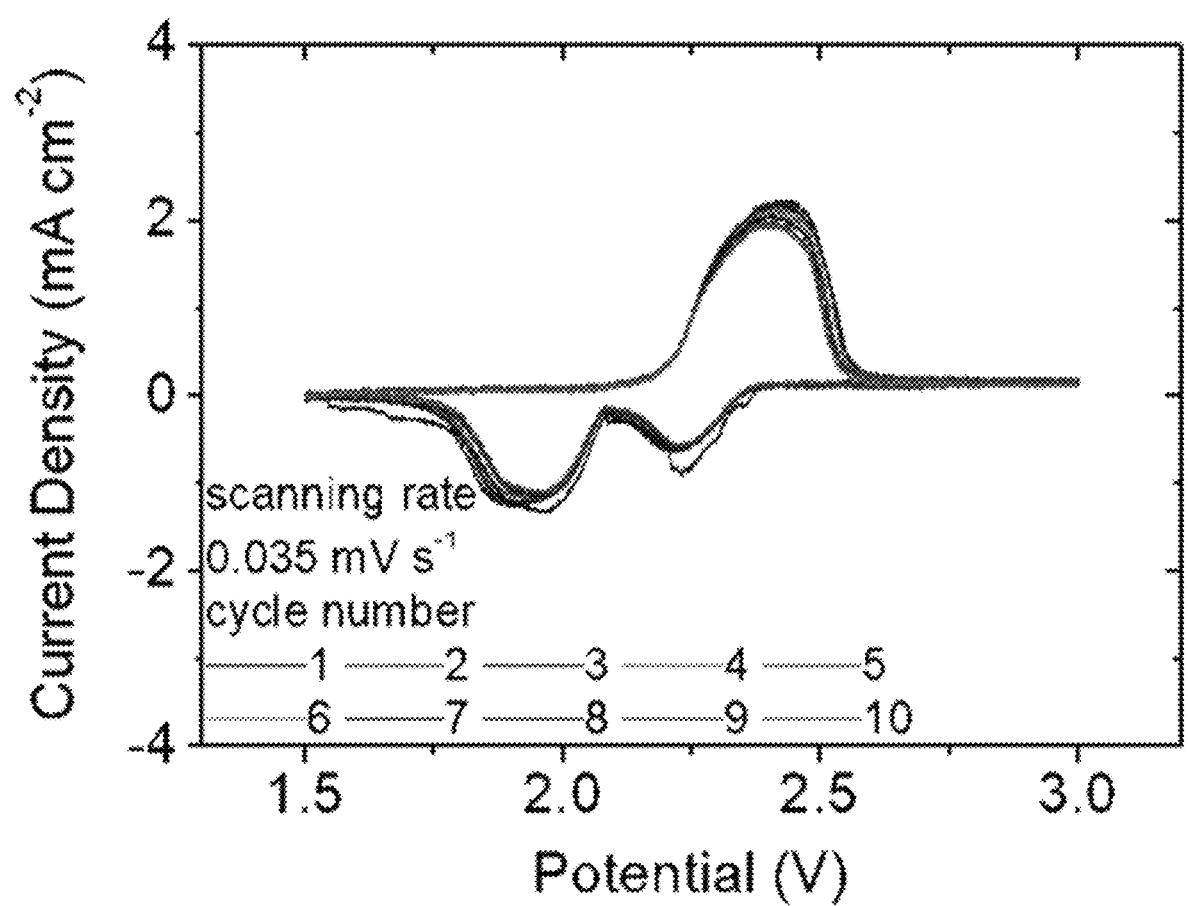
FIG. 5G shows CV curves of electroless-nickel-plated sulfur cathode at the scan rates of 0.035 for 10 CV scannings.
Figure 5H:
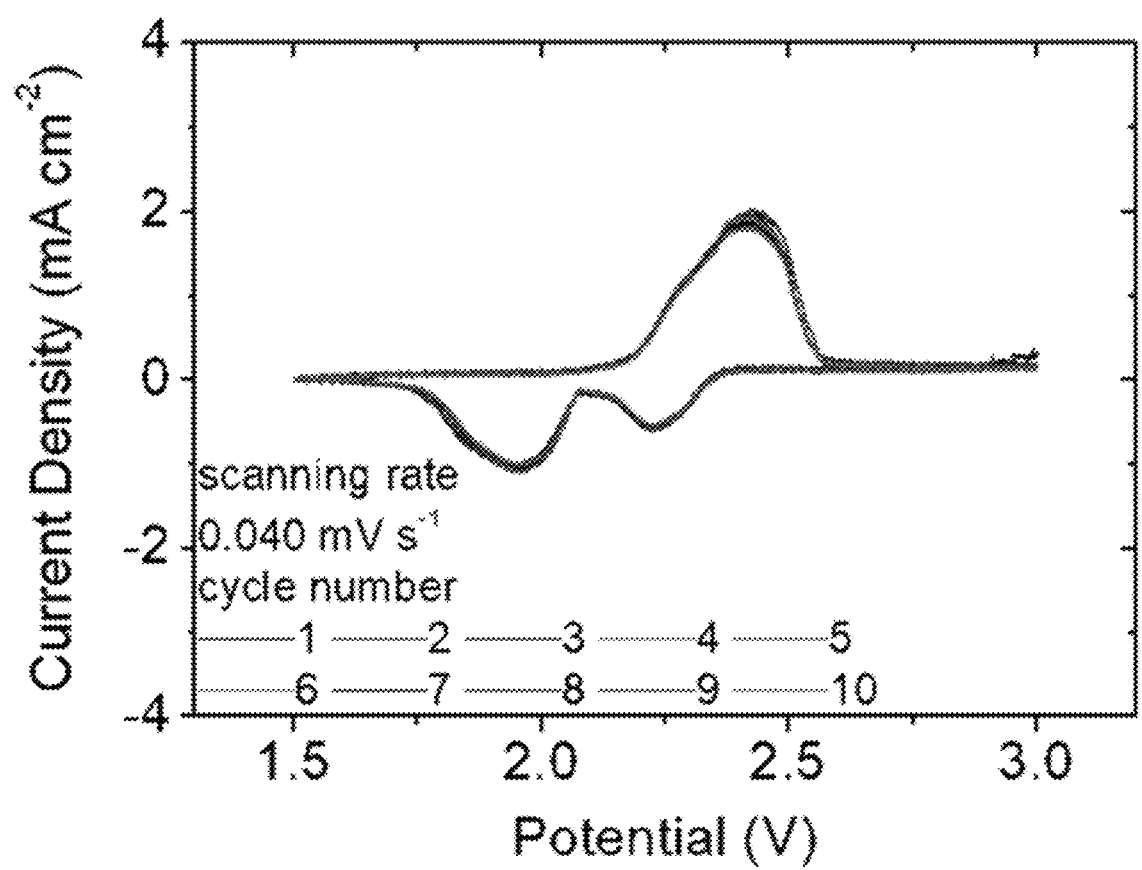
FIG. 5H shows CV curves of electroless-nickel-plated sulfur cathode at the scan rates of 0.040 mV/s for 10 CV scannings.
Figure 5I:
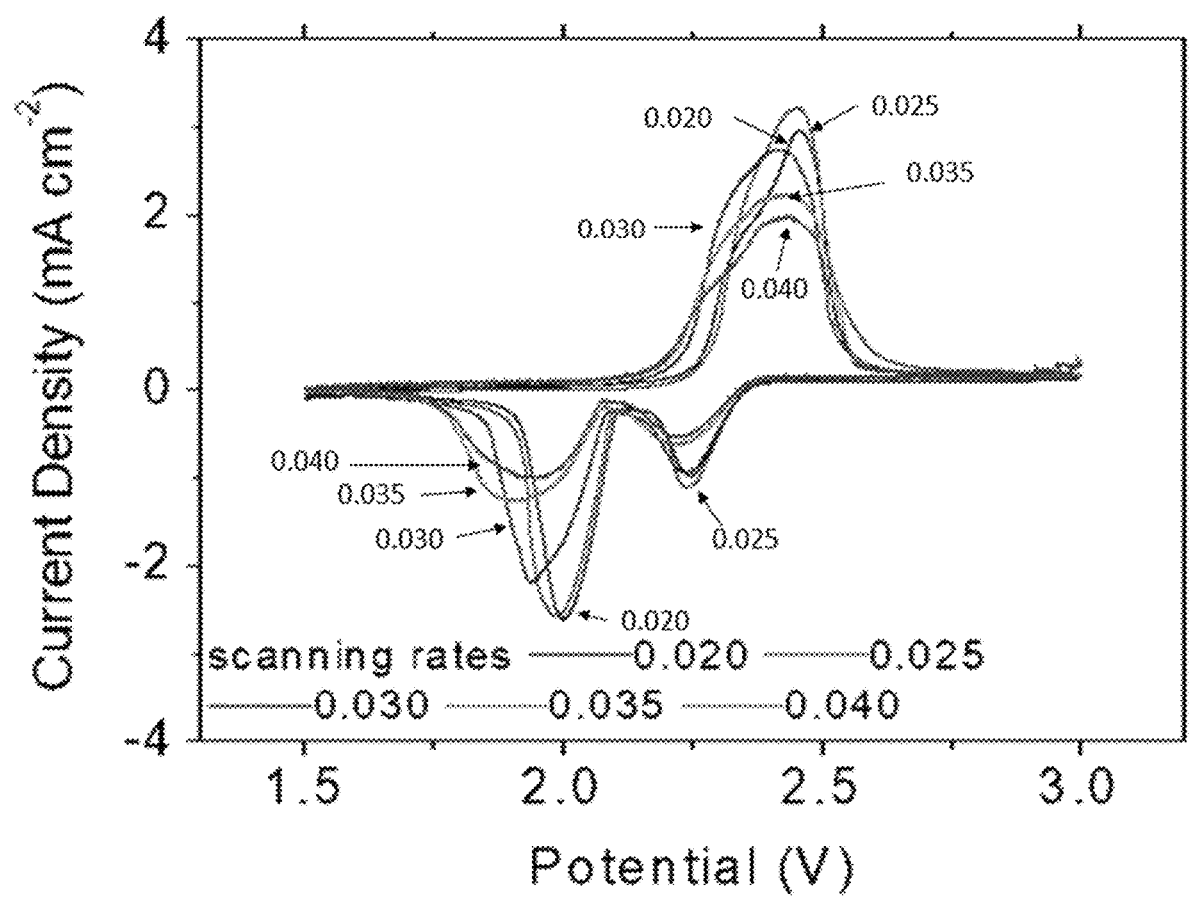
FIG. 5I shows rate-dependent CV curves.

The redox reaction of the electroless-nickel-plated sulfur cathode is analyzed by cyclic voltammetry (CV), as shown in FIGS. 5D, 5E, 5F, 5G, and 5H. In FIG. 5D, the reversible CV scanning curves at 0.020 mV/s depict the stable redox reactions between sulfur and lithium sulfide during the lithiation/delithiation processes. From 3.0 to 1.5 V of the CV scanning, the two-step reduction reaction of sulfur involves two distinguishable cathodic peaks (cathodic 1 peak and cathodic 2 peak). The cathodic 1 and cathodic 2 peaks represent the reduction reaction of solid-state sulfur to liquid-state polysulfides and to solid-state sulfides, respectively. From 1.5 to 3.0 V, the two-step oxidation reaction displays a broad anodic peak, corresponding to the oxidation reaction from sulfides to polysulfides and sulfur. The CV curves display no obvious changes in potential and current density during the successive 10 scans, demonstrating the constant low polarization and reversible electrochemical reactions, respectively. In addition, as shown in FIGS. 5D, 5E, 5F, 5G, and 5H 5H, as the scanning rate increases from 0.020 to 0.040 mV/s, the cathodic and anodic reactions only show a slight increase of the polarization, display no obvious changes in potential and current density during the successive 10 scans, and generally exhibit the same superior electrochemical reversibility and stability, demonstrating excellent rate capability. As shown in FIG. 5I, the rate-dependent CV scans based on the second CV curves from 0.020 to 0.040 mV/s are collected for calculating the lithium-ion diffusion coefficient by the relationship of the peak current and the CV scanning rate.

Figure 6:
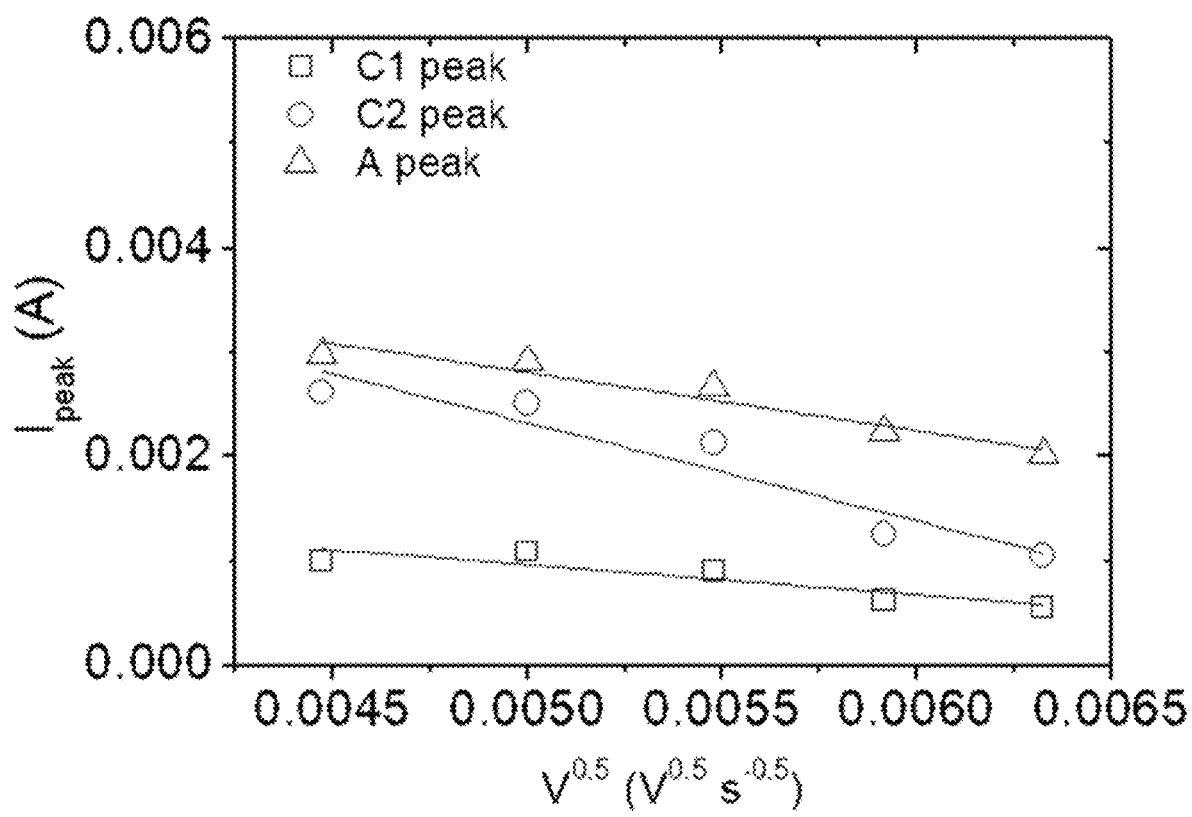
FIG. 6 shows a graph of the lithium-ion diffusion coefficient of the electroless-nickel-plated sulfur cathode.

As shown in FIG. 6, the calculated lithium-ion diffusion coefficients of the cathodic 1, cathodic 2, and anodic peaks are $4.16\times10^{-8}$, $4.44\times10^{-7}$, and $1.57\times10^{-7}$ cm$^2$/s, respectively. The high diffusion coefficients demonstrate the smooth lithium-ion diffusion in the electroless-nickel-plated sulfur cathode and its high electrochemical utilization. According to the EIS and CV analyses, the smooth electron and ion transports within the electroless-nickel-plated sulfur nanocomposite should ensure its capability as a high-performance cathode that can host and normally cycle a high weight of sulfur in a lean-electrolyte battery.

Figure 7A:
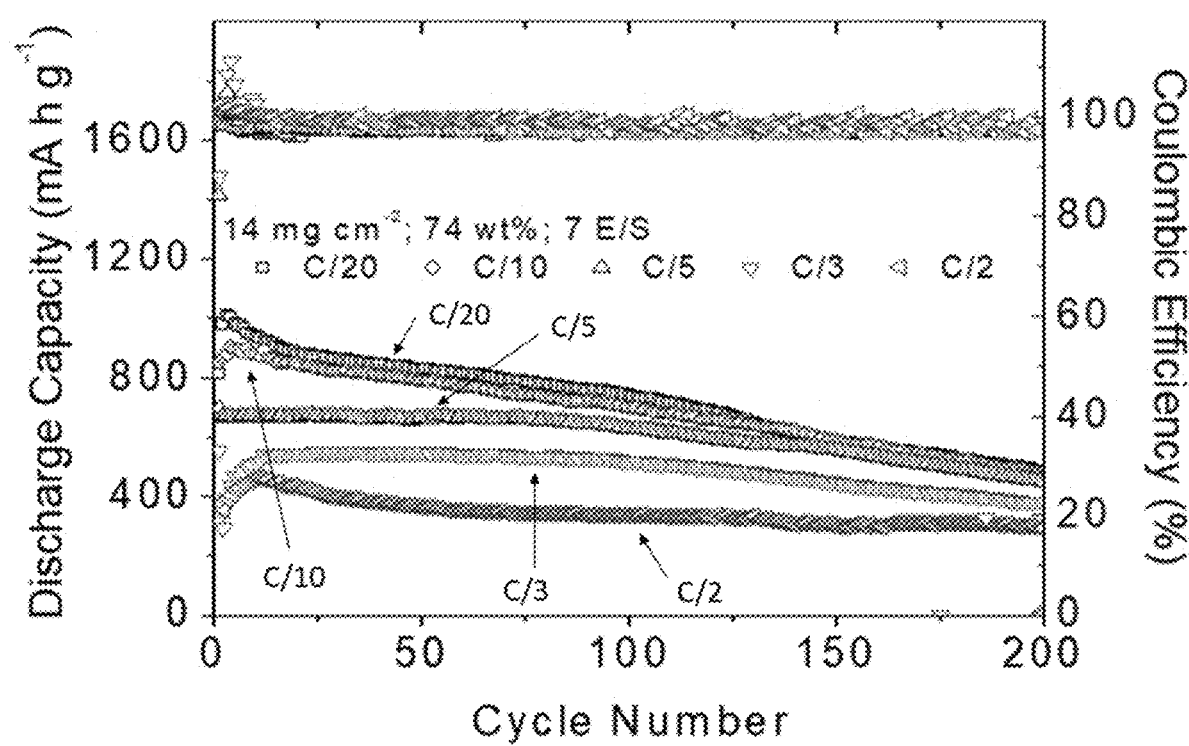
FIG. 7A shows the cyclability of the battery that uses the electroless-nickel-plated sulfur cathode at C/20, C/10, C/5, C/3, C/2 rates for 200 cycles.
Figure 7B:
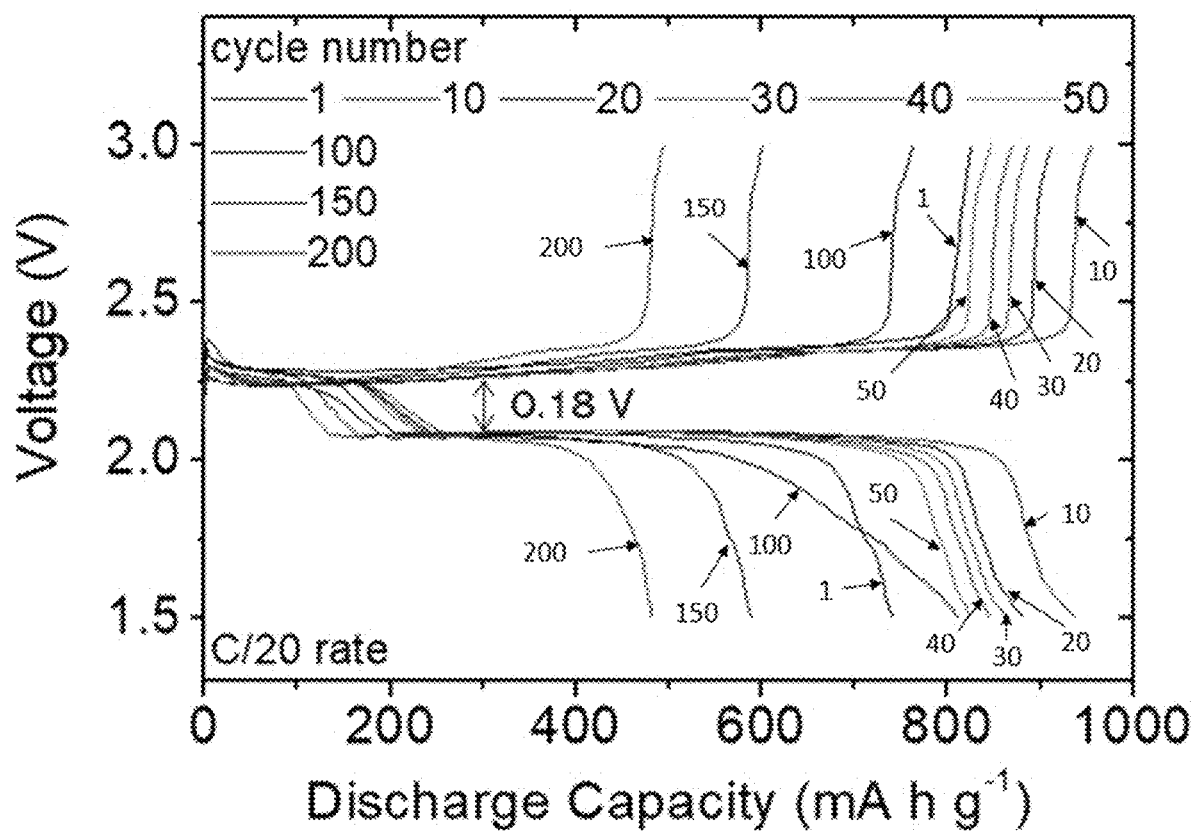
FIG. 7B shows the voltage profiles at C/20 rates for 200 cycles.
Figure 7C:
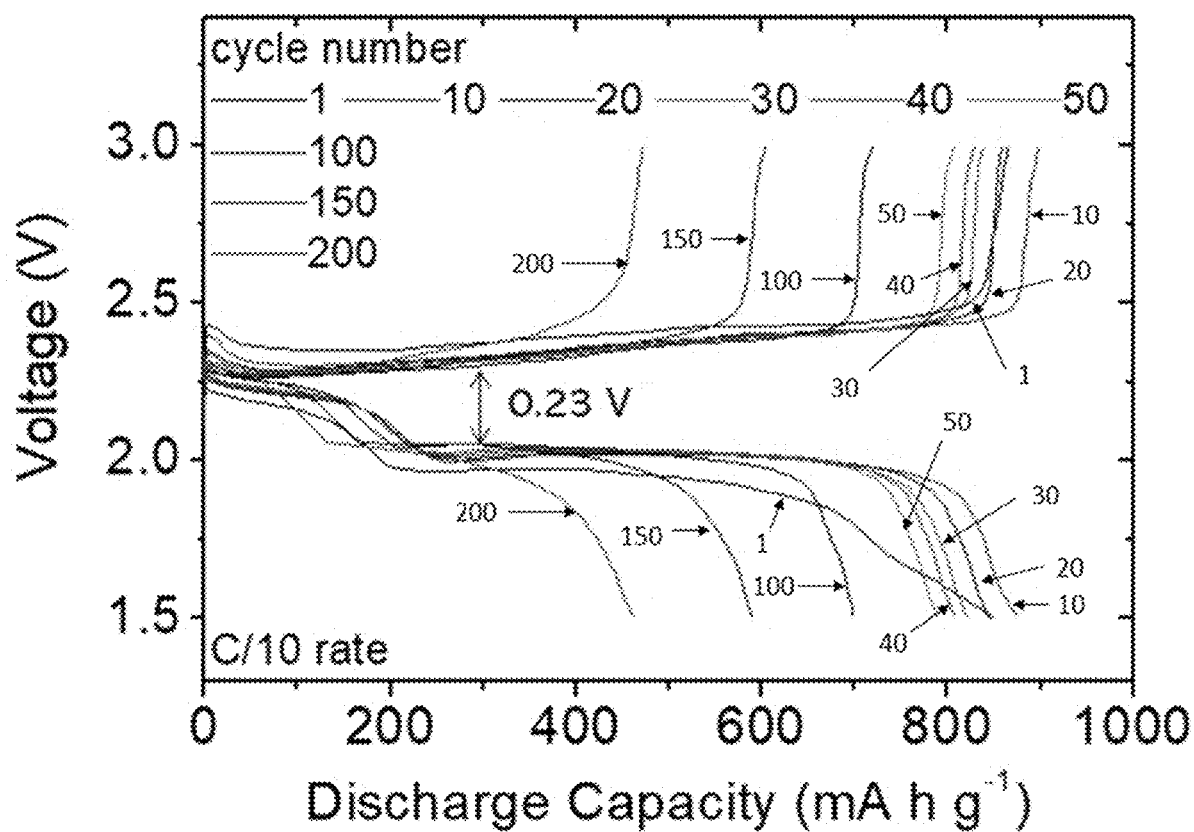
FIG. 7C shows the voltage profiles at C/10 rates for 200 cycles.
Figure 7D:
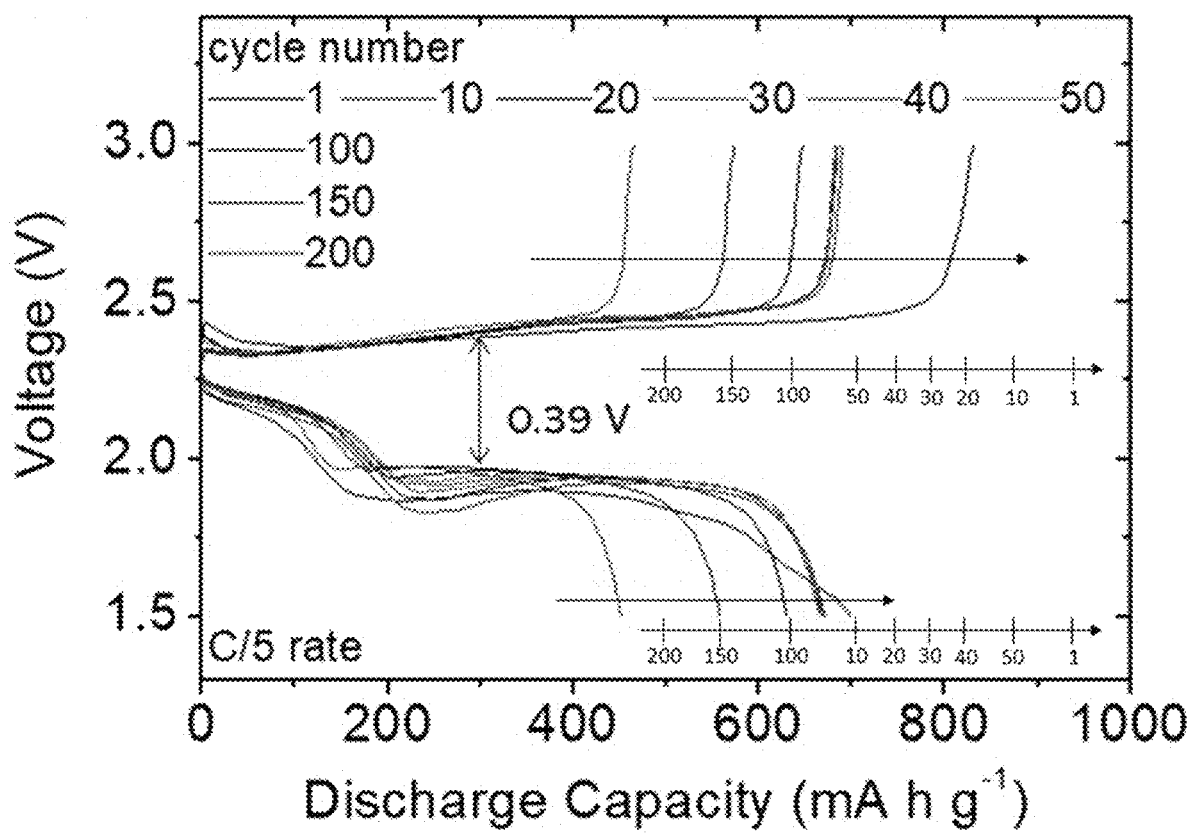
FIG. 7D shows the voltage profiles at C/5 rates for 200 cycles.
Figure 7E:
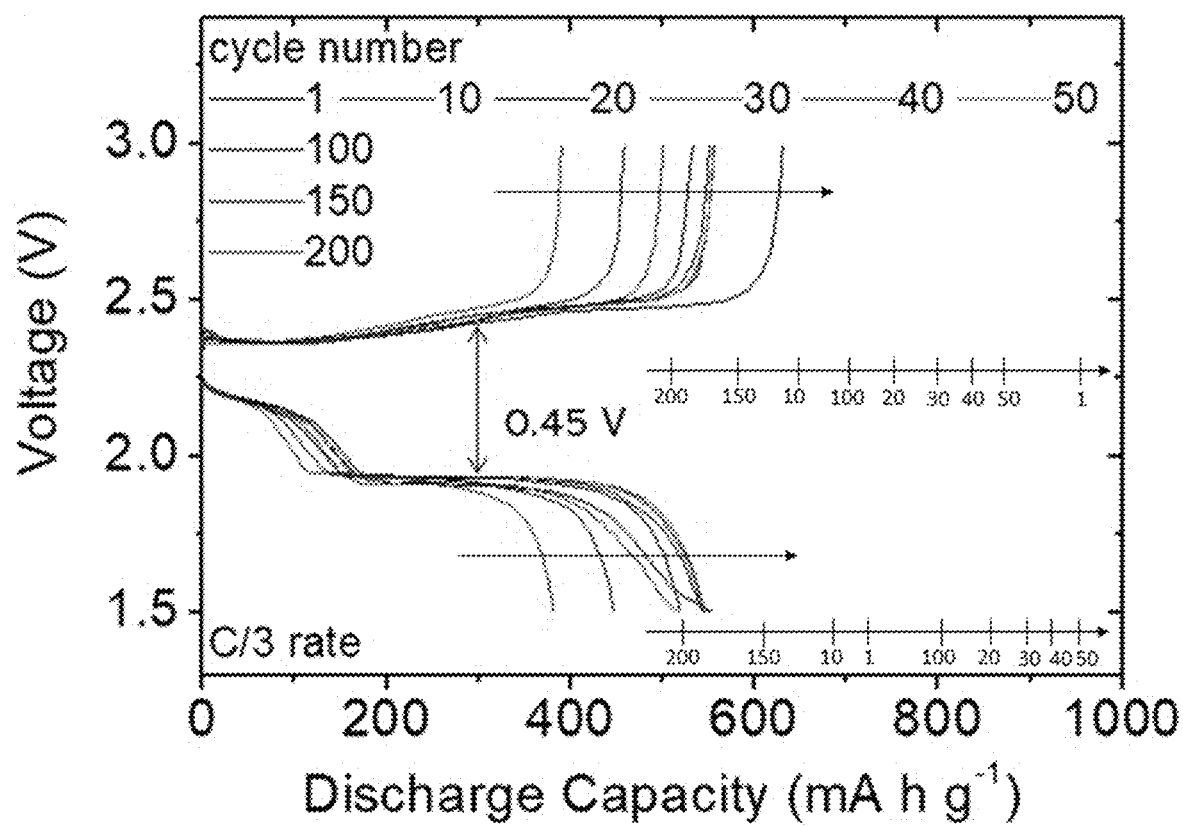
FIG. 7E shows the voltage profiles at C/3 rates for 200 cycles.
Figure 7F:
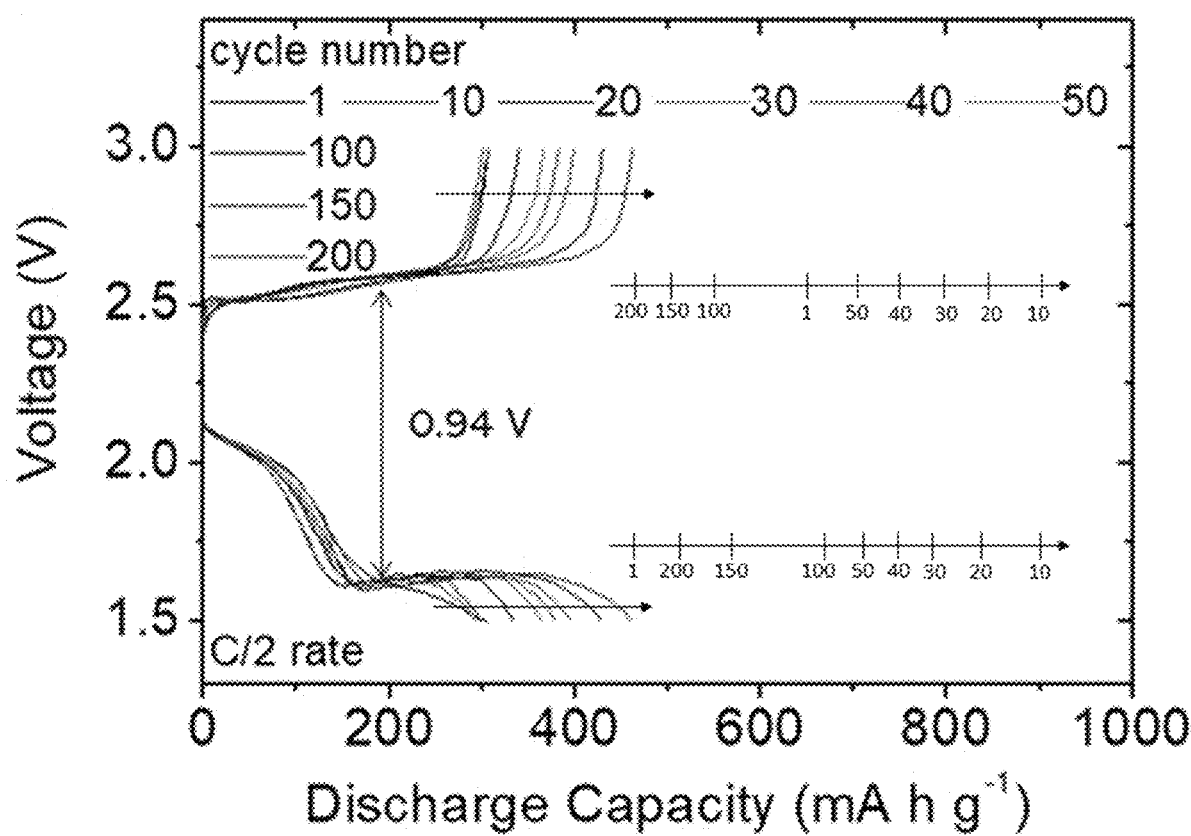
FIG. 7F shows the voltage profiles at C/2 rates for 200 cycles.

The Performance of the Battery which Uses the Electroless-Nickel-Plated Sulfur Cathode:

FIGS. 7A, 7B, 7C, 7D, 7E, and 7F show the long-term rate cyclability and discharge/charge voltage profiles of the Li—S battery of Example 1. As shown in FIG. 7A, the battery attains high areal capacities of 1,008, 901, 674, 550, and 460 mA·h/g at broad cycling rates of C/20, C/10, C/5, C/3, and C/2, respectively. After 200 cycles, the reversible capacity of the battery exhibits good capacity retention rates (50 to 70%) and capacity-fade rates as low as 0.05% per cycle. The Coulombic efficiency remains high at over 98 to 99%.

At the different cycling rates of C/20, C/10, C/5, C/3, and C/2, the battery can reach a long-term cyclability of 200 cycles, and retain capacities of 48%, 51%, 67%, 70%, and 64%. Calculation of the ratio between the discharge capacities after 100 cycles and the second cycle shows the retention rates of 76%, 81%, 94%, 94%, and 95%. The details are summarized in Table 2 below.

TABLE 2

| Cycling rates | gravimetric capacity (mA · h/g) | Areal capacity (mA · h/cm$^2$) | Energy density (mW · h/cm$^2$) | Capacity at second cycle (mA · h/g) | Capacity at 100$^{th}$ cycle (mA · h/g) | Capacity at 200$^{th}$ cycle (mA · h/g) |
|---|---|---|---|---|---|---|
| C/20 | 1008 | 14 | 28 | 980 | 742 | 482 |
| C/10 | 901 | 13 | 25 | 867 | 700 | 461 |
| C/5 | 674 | 9 | 19 | 668 | 630 | 451 |
| C/3 | 550 | 8 | 15 | 555 | 519 | 382 |
| C/2 | 460 | 7 | 13 | 351 | 335 | 293 |

*For practicality, areal capacity must reach 2 to 4 mA · h/cm$^2$ or above, energy density must reach 10 mW · h/cm$^2$.

The above confirms the excellent rate capability, high electrochemical stability and efficiency of the electroless-nickel-plated sulfur nanocomposite.

Figure 8:
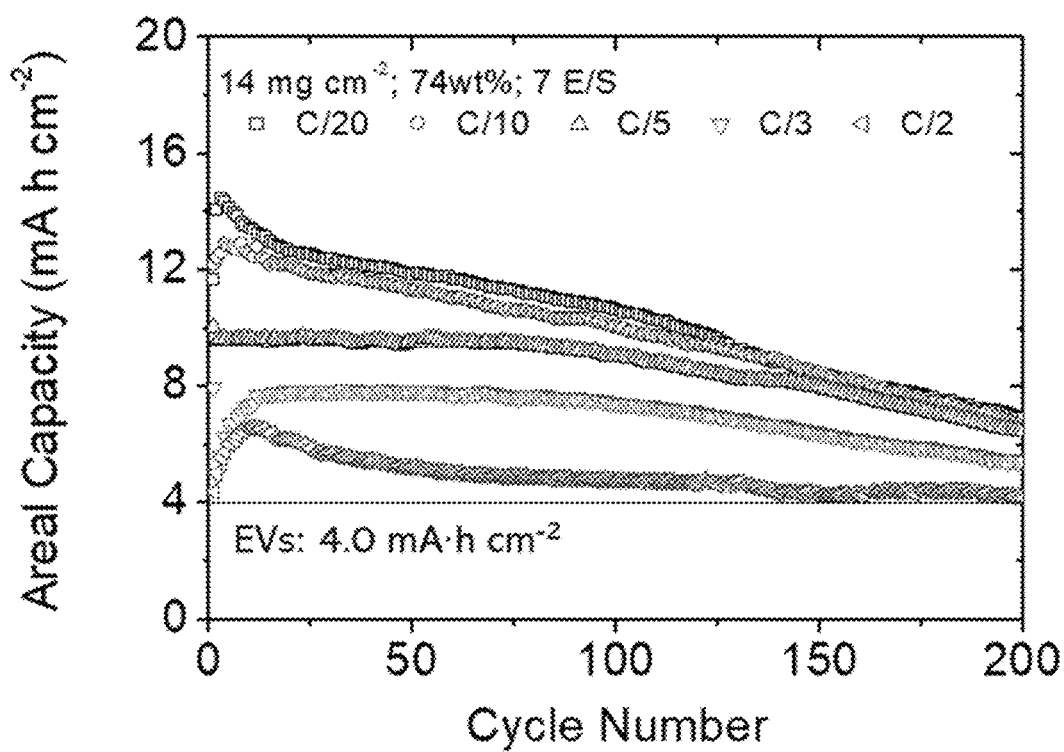
FIG. 8 shows the areal capacity of the electroless-nickel-plated sulfur cathode at the cycling rates of C/20, C/10, C/5, C/3, C/2 (the 4.0 mA·h/cm$^2$ shown in the graph is the areal capacity required in an electric vehicle battery).

As shown in FIG. 8, the battery that utilizes the electroless-nickel-plated sulfur cathode demonstrates high areal capacities of 14 to 7 mA·h/cm$^2$ at various cycling rates from C/20 (slow) to C/2 (fast), and the corresponding energy density values approach 28 to 13 mW·h/cm$^2$. In contrast, the cathodes of commercial lithium-ion battery have the capacity of 2 to 4 mA·h/cm$^2$ and the energy density of 10 to 14 mW·h/cm$^2$.

Figure 9:
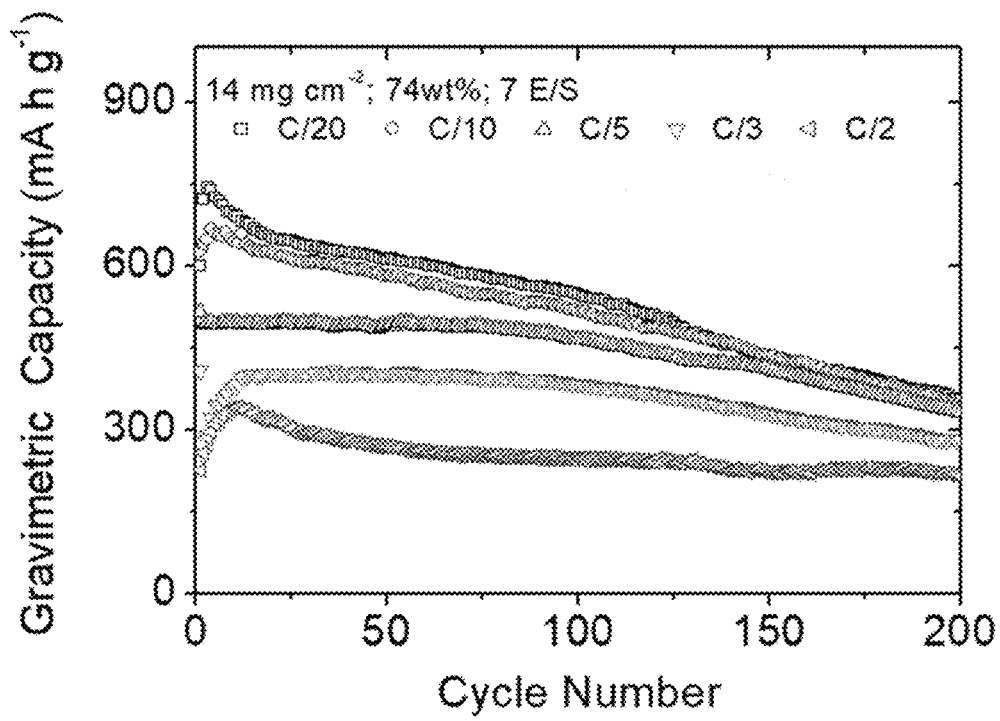
FIG. 9 shows the gravimetric capacity of the electroless-nickel-plated sulfur cathode at the cycling rates of C/20, C/10, C/5, C/3, C/2.

Moreover, due to its high sulfur content, the gravimetric capacity of the cathode may reach as high as 744 mA·h/g, calculated based on the total mass of the cathode, as shown in FIG. 9. The excellent electrochemical characteristics and promising performance show that the electroless-nickel-plated sulfur battery can function as a high-performance cathode system simultaneously possessing excellent electrochemical characteristics: high utilization, retention, and reaction kinetics, outstanding practical cathode property, and increased weight and content of the active material at a lean-electrolyte condition.

Figure 10A:
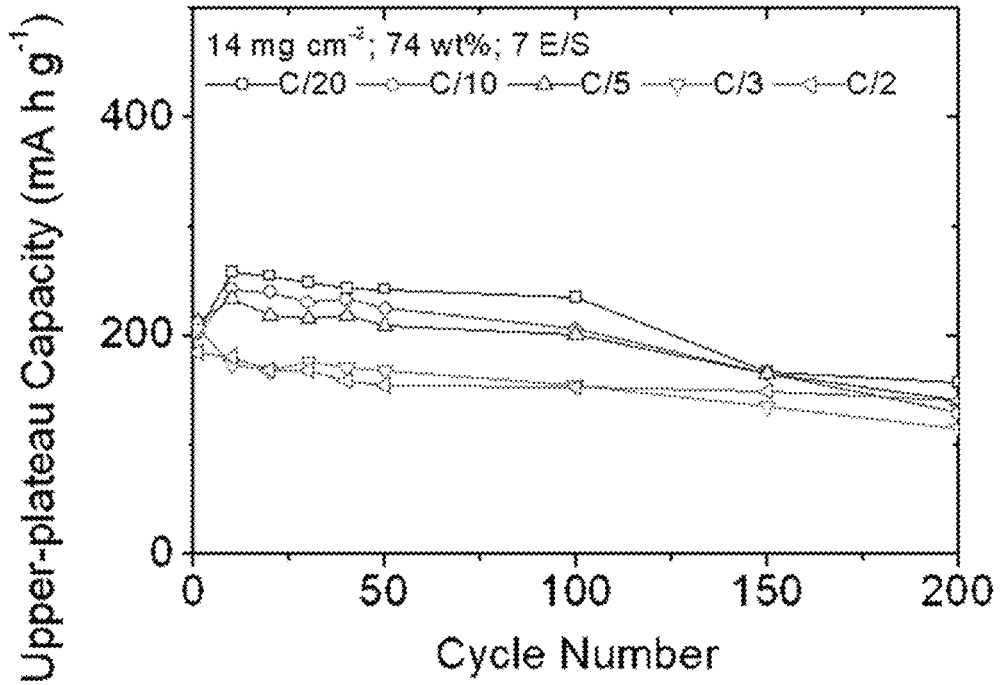
FIG. 10A shows the upper-plateaus discharge capacity of the electroless-nickel-plated sulfur cathode at the cycling rates of C/20, C/10, C/5, C/3, C/2.
Figure 10B:
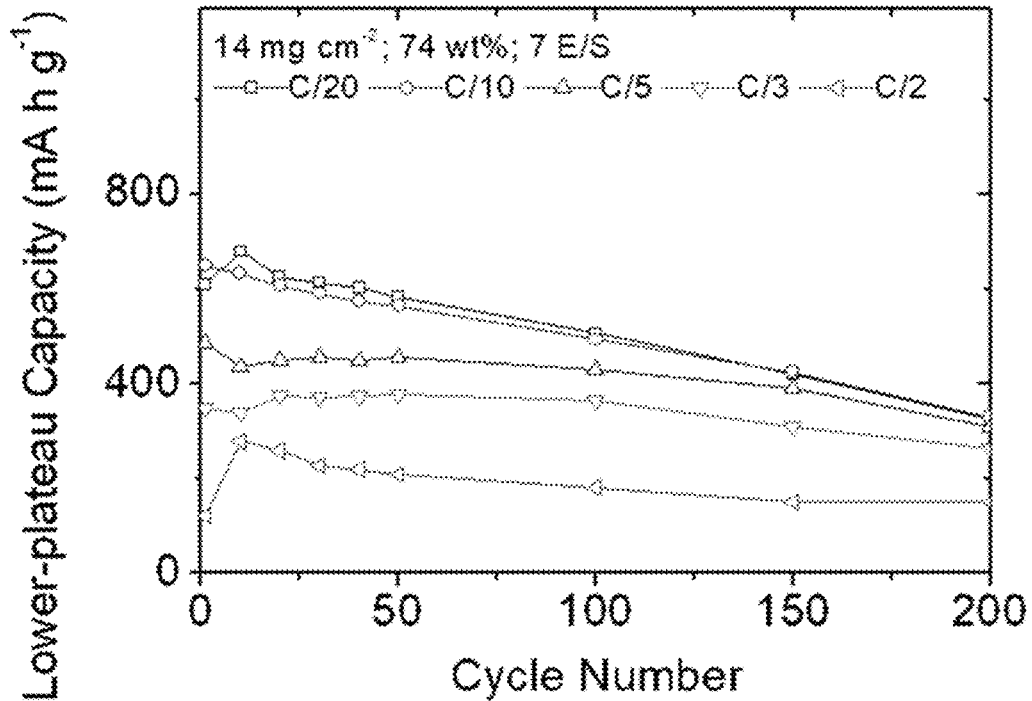
FIG. 10B shows the lower plateaus discharge capacity of the electroless-nickel-plated sulfur cathode at the cycling rates of C/20, C/10, C/5, C/3, C/2.

FIGS. 7B, 7C, 7D, 7E, and 7F are the discharge and charge voltage profiles of the electroless-nickel-plated sulfur cathode at various cycling rates which explores its redox-conversion capability and stability. As shown in FIGS. 5A, 5B, 5C, 5D, 5E, 5F, 5G, 5H and 5I, the charge/discharge curves nearly overlap and correlate with the anodic/cathodic peaks in the CV curves, confirming the typical lithium-sulfur redox conversions. Neither irreversible capacity loss nor additional decomposition reactions of the metal plating layer are observed. From 3.0 to 1.5 V, the overlapping upper and lower discharge plateaus at different cycling rates demonstrate the superior discharge reversibility and cyclability of the electroless-nickel-plated sulfur cathode. As shown in FIG. 10A and FIG. 10B, the stable discharge capacities of both upper and lower discharge plateaus of the electroless-nickel-plated sulfur cathode indicate the complete conversion reaction, which agrees with the discharge curves in FIGS. 7B, 7C, 7D, 7E, and 7F. As shown in FIG. 10A, the discharge capacities of the upper plateaus show similar trends at various rates due to the fast conversion reaction from sulfur to highly active polysulfides. The electrochemically active polysulfides anchor on the nickel coating and become catholytes, limiting the loss of the active material and enhancing the redox conversion. Meanwhile, the capacities of the lower plateaus at various rates display the challenge of high-loading cathodes in pursuit of a high discharge rate. The sluggish liquid-to-solid conversion from highly active polysulfides to insulating sulfides has a more comprehensive reduction reaction at a slow rate than at a fast rate. As shown in FIG. 10B, although the discharge capacity of the lower plateau is influenced by the cycling rates, the electroless-nickel-plated sulfur cathode still has good cyclability for 200 cycles from slow to fast rates due to the high polysulfide-trapping and activation capabilities of the conductive nickel coating. As shown in FIGS. 7A, 7B, 7C, 7D, 7E, and 7F, from 1.5 to 3.0 V, the overlapping charge plateaus indicate the successful oxidation of the high amount of sulfide generated at the discharge reaction. As the battery voltage approaches 3.0 V, the almost vertical voltage increase suggests that batteries employing the electroless-nickel-plated sulfur cathodes can be completely charged, demonstrating the high conductivity and electrocatalytic behavior of the nickel coating in promoting the oxidation reaction.

Figure 11:
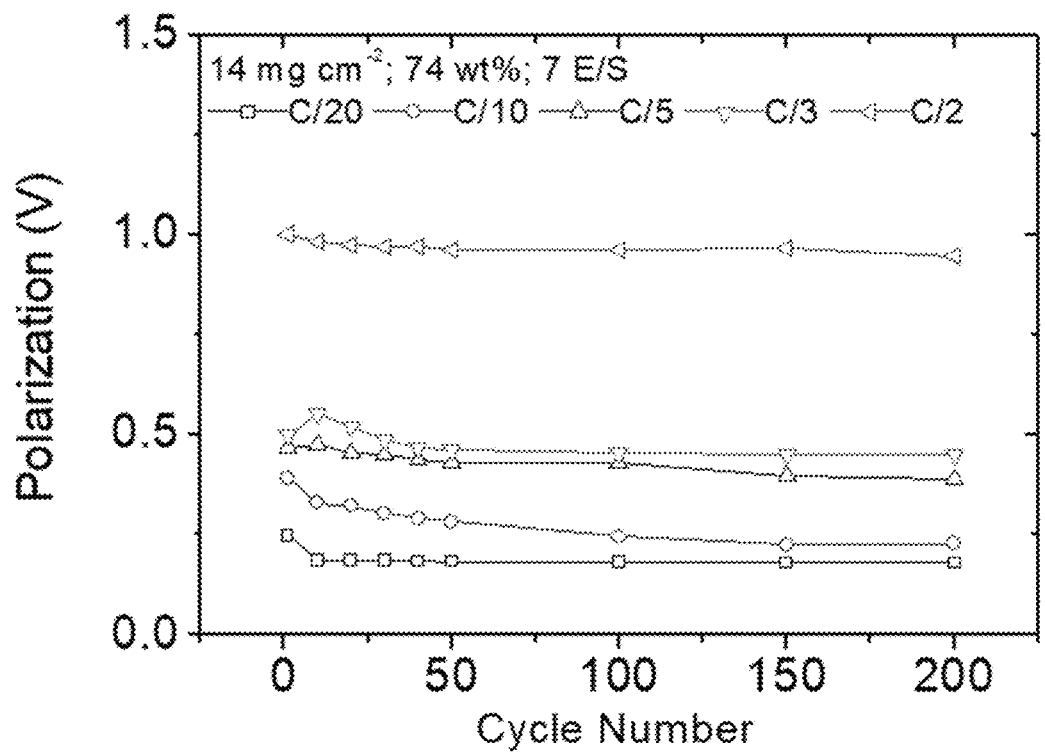
FIG. 11 shows the polarization analysis of the electroless-nickel-plated sulfur cathode at the cycling rates of C/20, C/10, C/5, C/3, C/2.

Subsequently, data are collected from the discharge and charge plateaus of the electroless-nickel-plated sulfur cathode to study the polarization issue intrinsically encountered in high sulfur loading cathodes with a low electrolyte-to-sulfur ratio. As shown in FIG. 11, the electroless-nickel-plated sulfur cathode keeps a low polarization from C/20 to C/3 rates, with no increase in the polarization after 200 cycles. However, at the C/2 rate, the polarization increases due to the sluggish liquid-to-solid reduction of the lower discharge plateau, thus no apparent impact on the electrochemical reaction is found.

Figure 12:
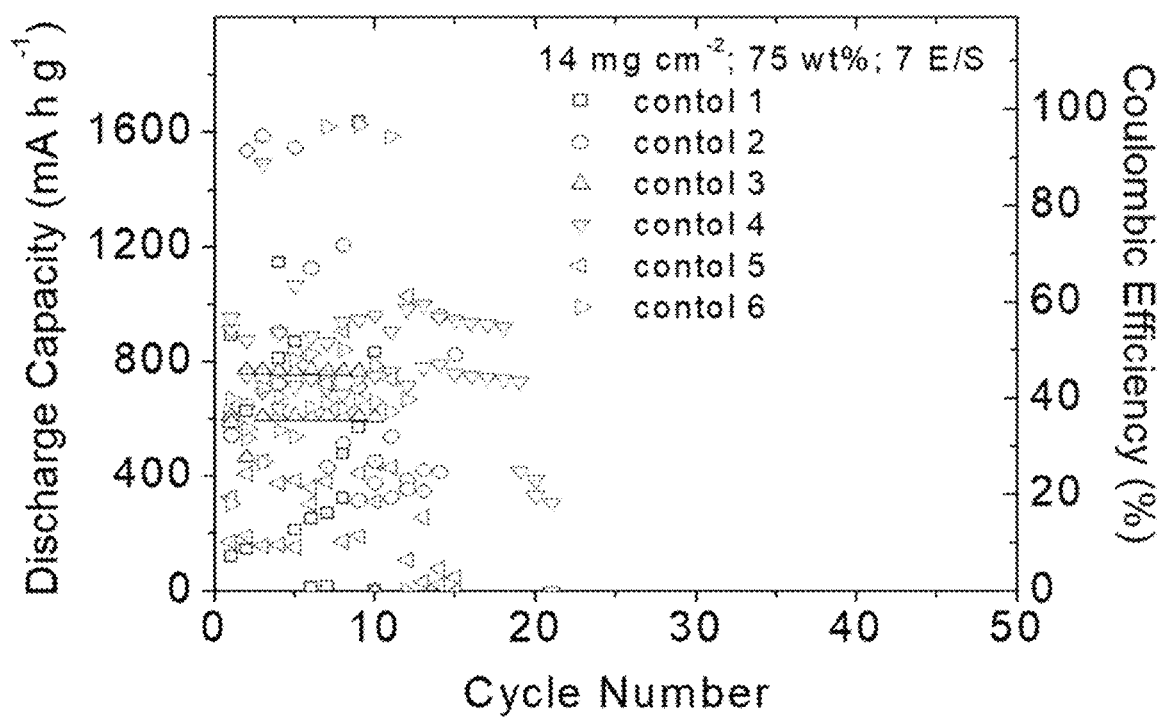
FIG. 12 shows the electrochemical characteristics of the pure sulfur cathode at the cycling rate of C/20.
Figure 13A:
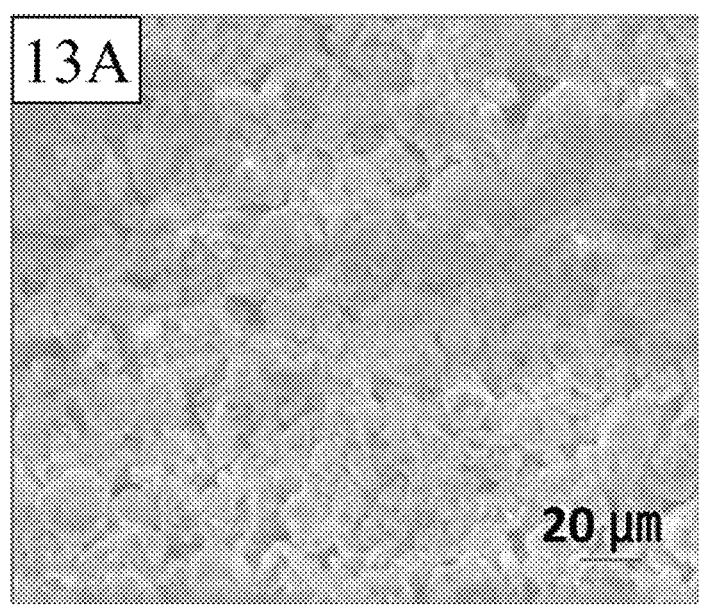
FIGS. 13A, 13B, 13C, and 13D show the morphological, microstructural and elemental analysis of the electroless-nickel-plated sulfur cathode before cycling (FIG. 13A to FIG. 13B are at low magnification, FIG. 13C to FIG. 13D are at high magnification).
Figure 13B:
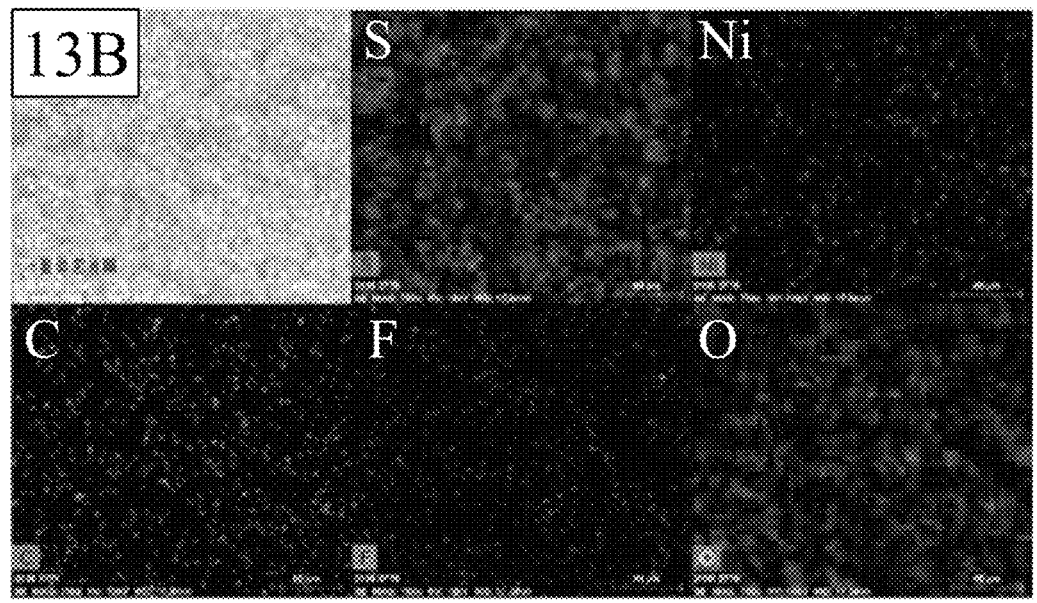
Figure 13C:
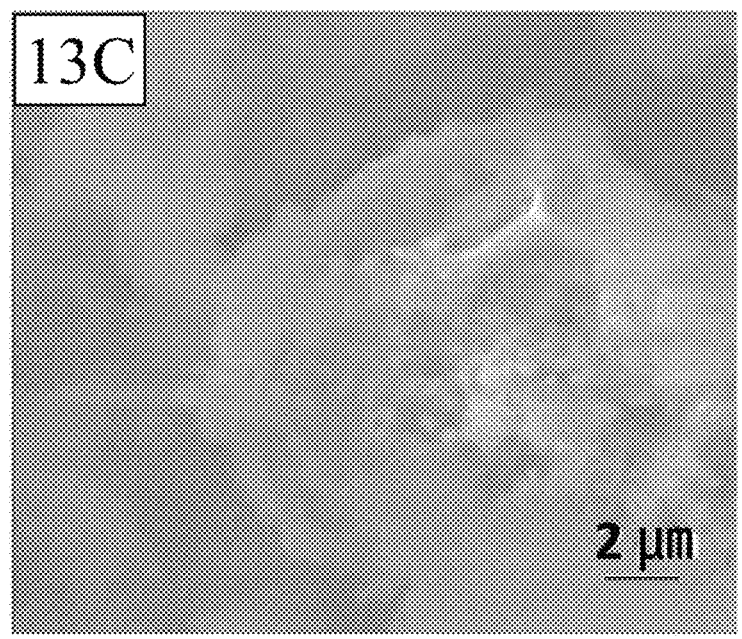
Figure 13D:
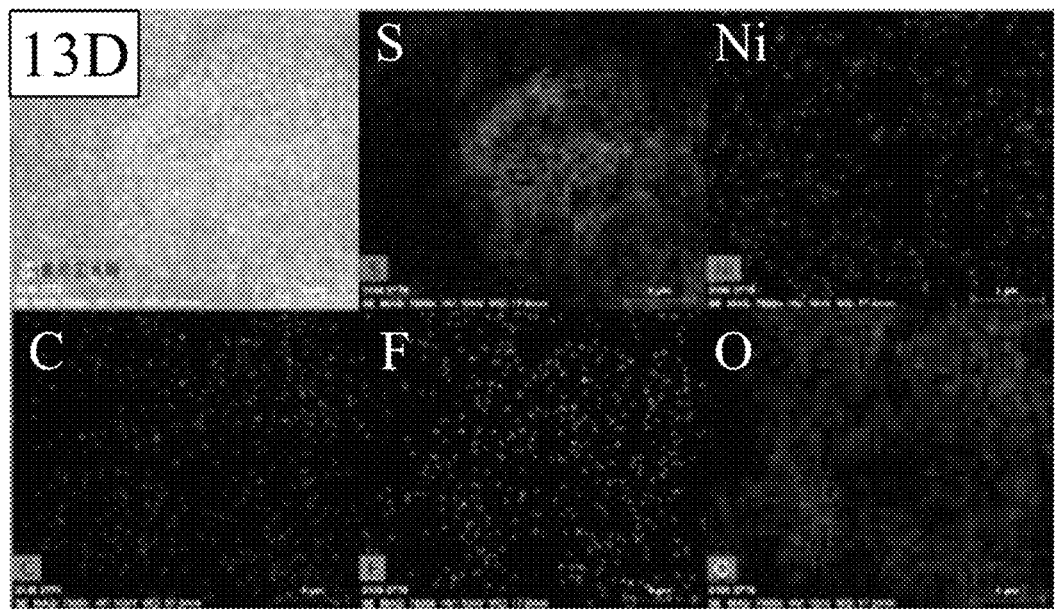
Figure 14A:
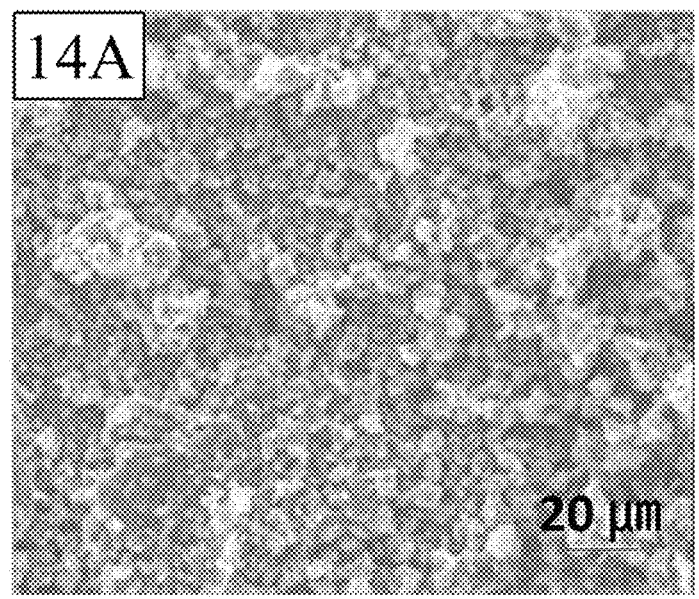
FIGS. 14A, 14B, 14C, and 14D show the morphological, microstructural and elemental analysis of the electroless-nickel-plated sulfur cathode after 200 cycles at the cycling rate of C/20 (FIG. 14A to FIG. 14B are at low magnification, FIG. 14C to FIG. 14D are at high magnification).
Figure 14B:
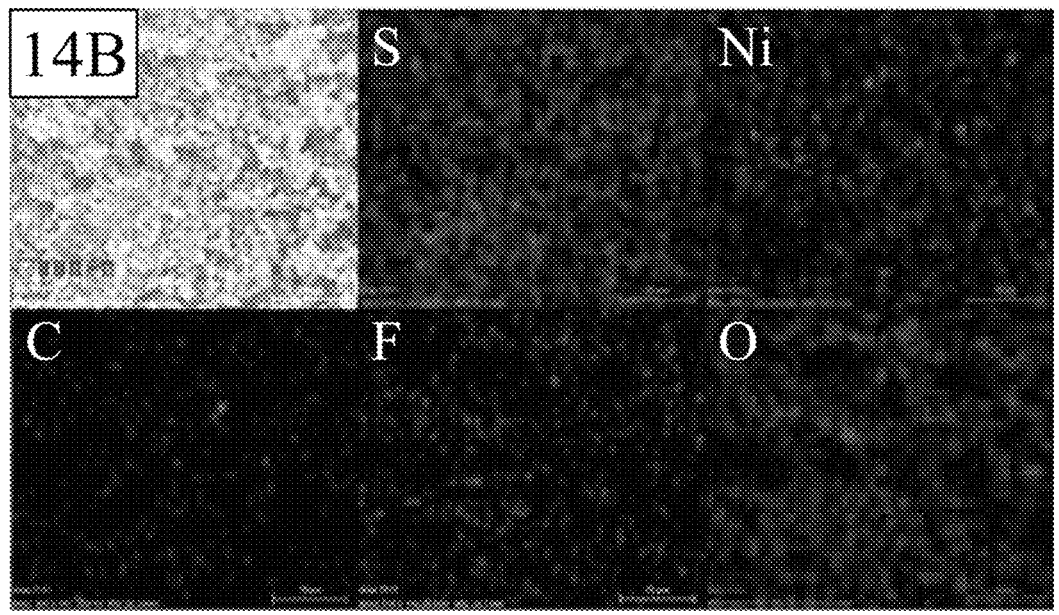
Figure 14C:
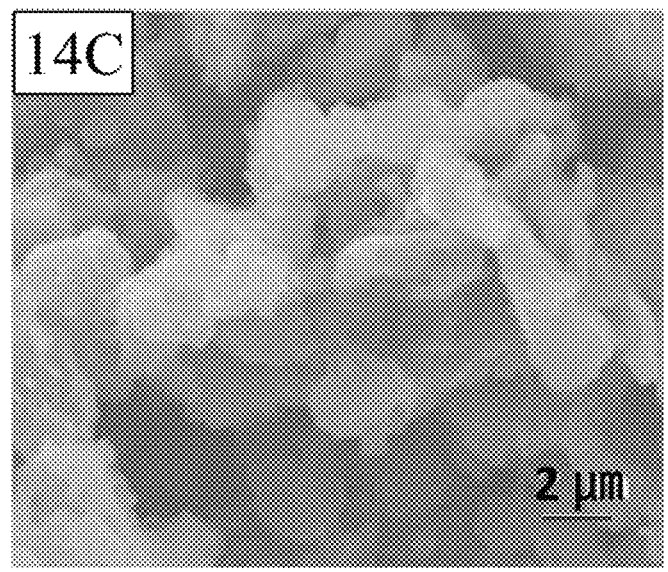
Figure 14D:
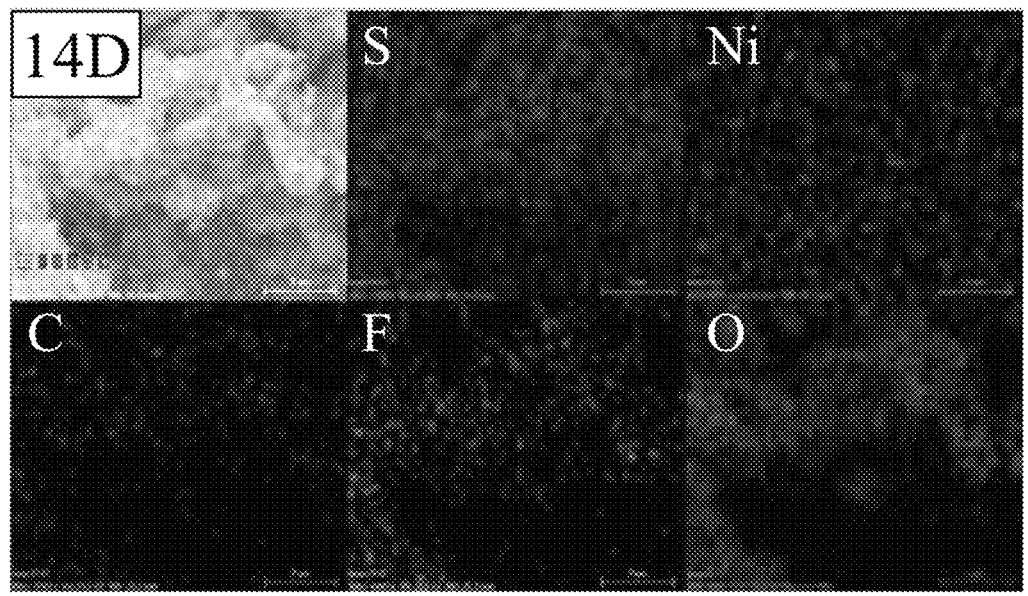
Figure 15A:
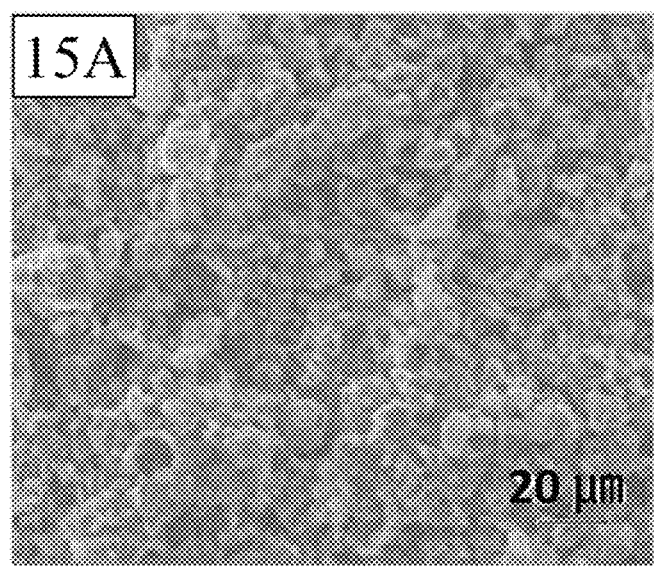
FIGS. 15A, 15B, 15C, and 15D show the morphological, microstructural and elemental analysis of the electroless-nickel-plated sulfur cathode after 200 cycles at the cycling rate of C/10 (FIG. 15A to FIG. 15B are at low magnification, FIG. 15C to FIG. 15D are at high magnification).
Figure 15B:
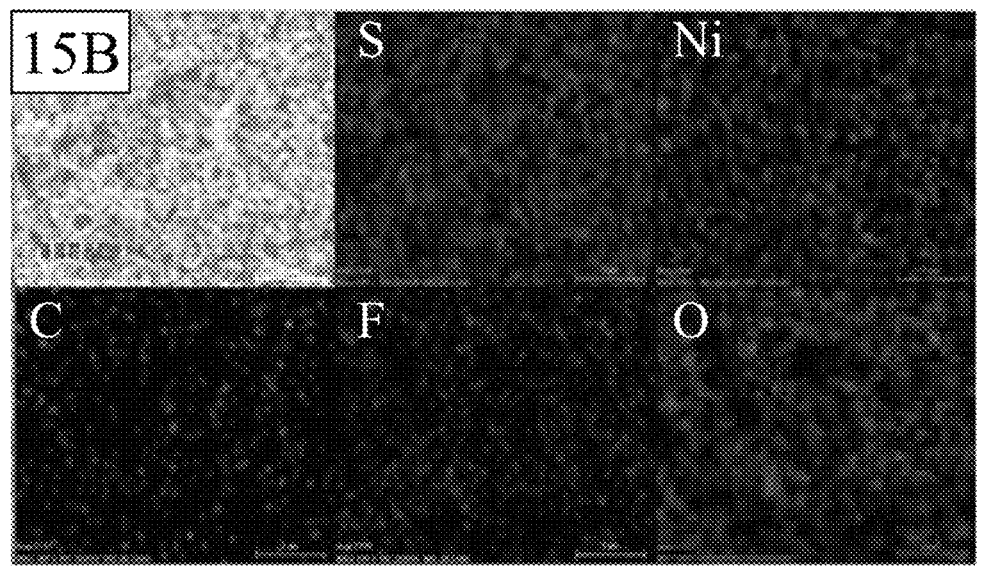
Figure 15C:
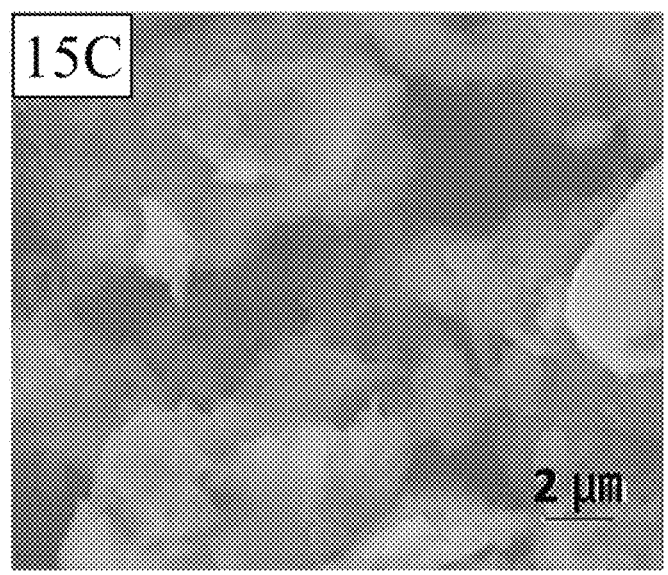
Figure 15D:
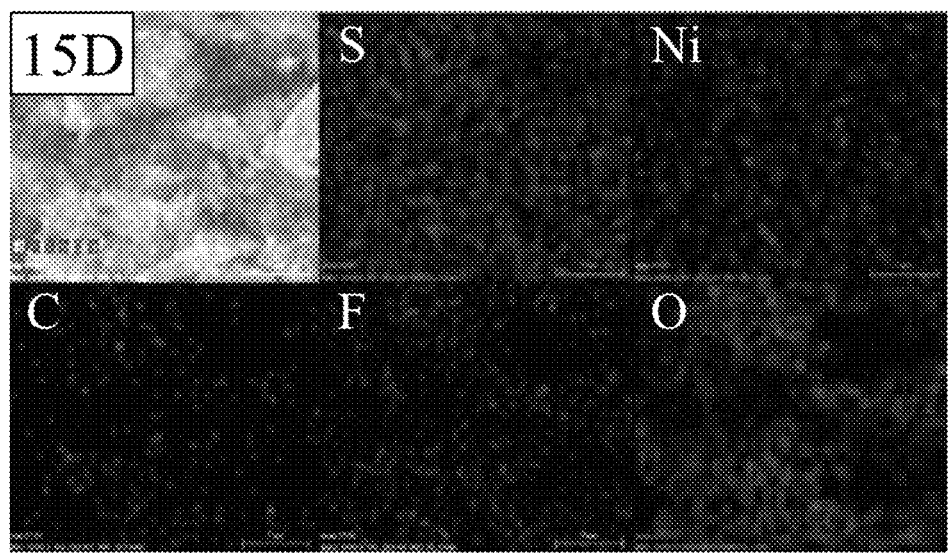
Figure 16A:
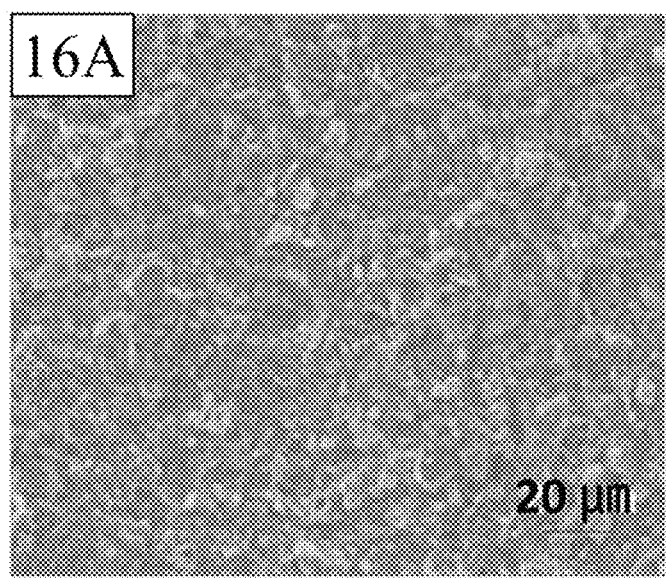
FIGS. 16A, 16B, 16C, and 16D show the morphological, microstructural and elemental analysis of the electroless-nickel-plated sulfur cathode after 200 cycles at the cycling rate of C/5 (FIG. 16A to FIG. 16B are at low magnification, FIG. 16C to FIG. 16D are at high magnification).
Figure 16B:
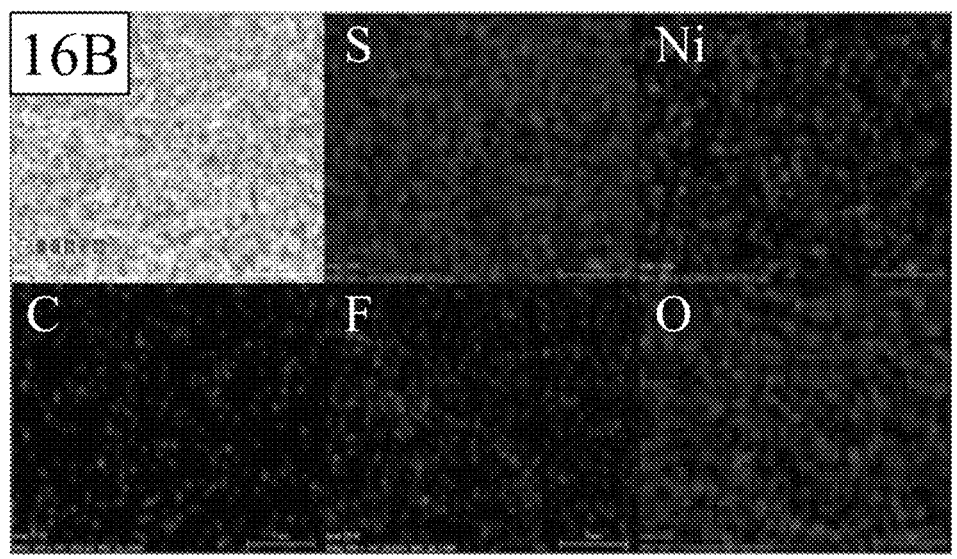
Figure 16C:
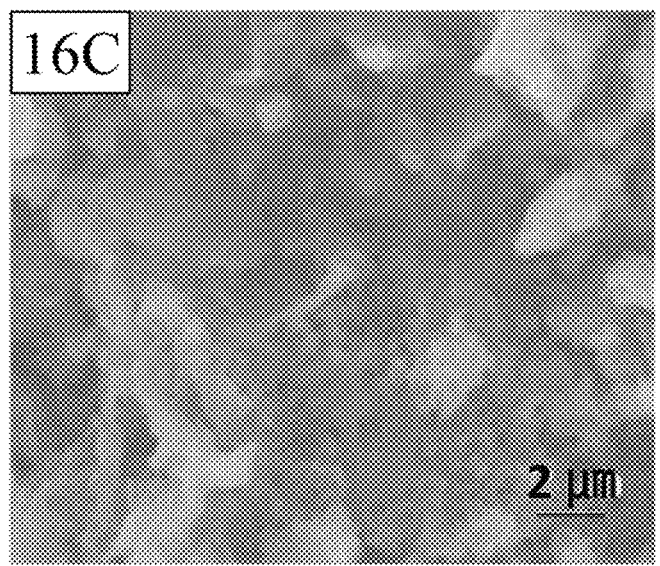
Figure 16D:
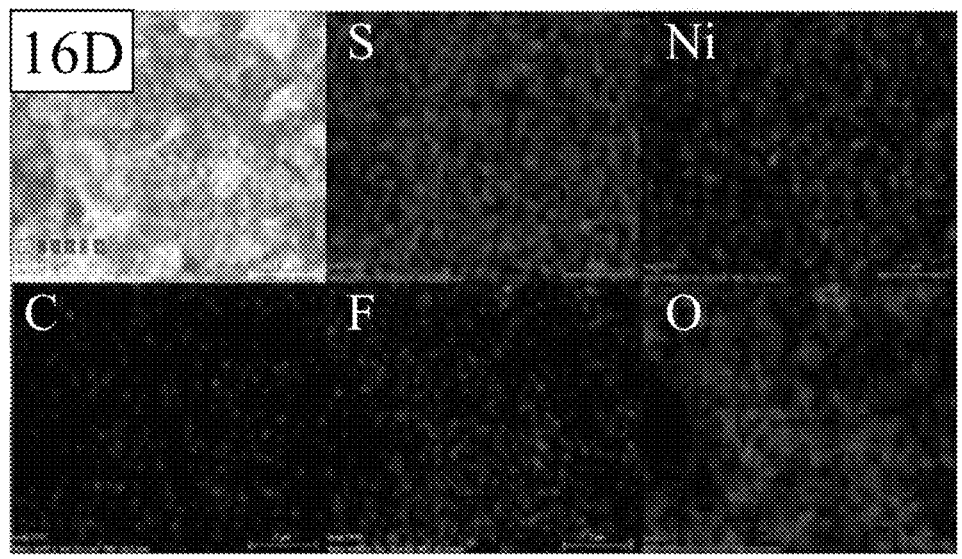
Figure 17A:
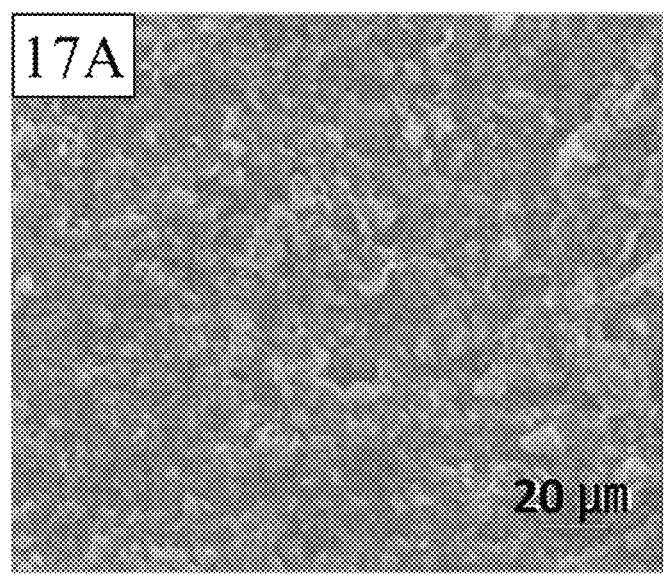
FIGS. 17A, 17B, 17C, and 17D show the morphological, microstructural and elemental analysis of the electroless-nickel-plated sulfur cathode after 200 cycles at the cycling rate of C/3 (FIG. 17A to FIG. 17B are at low morphological, FIG. 17C to FIG. 17D are at high magnification).
Figure 17B:
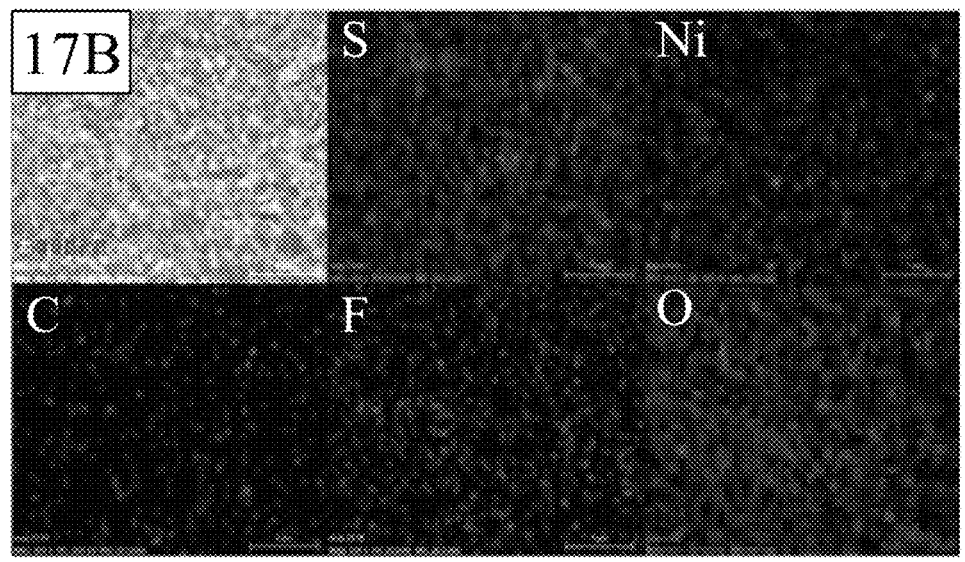
Figure 17C:
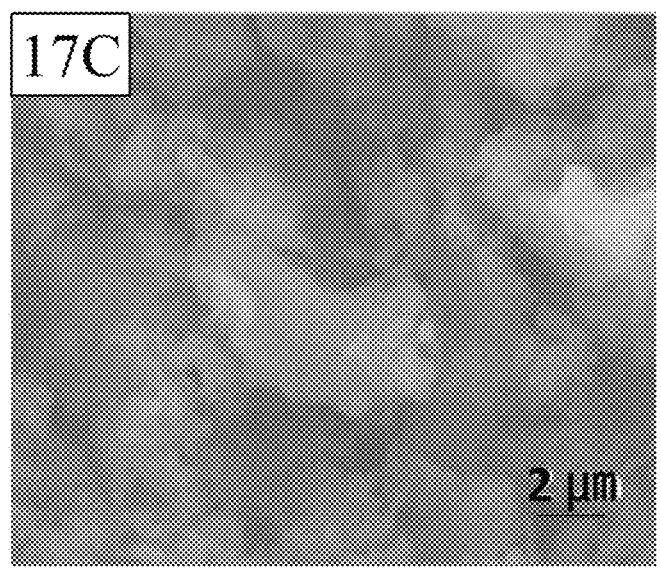
Figure 17D:
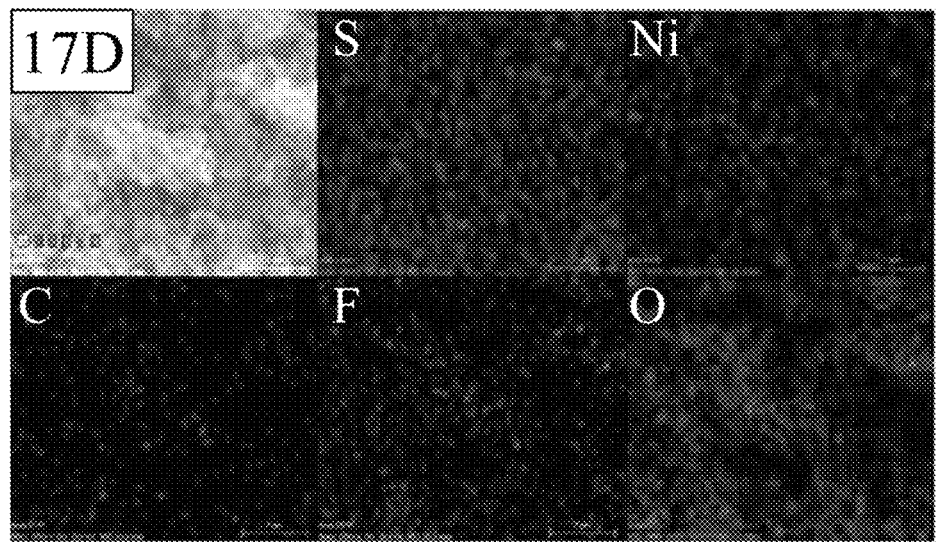
Figure 18A:
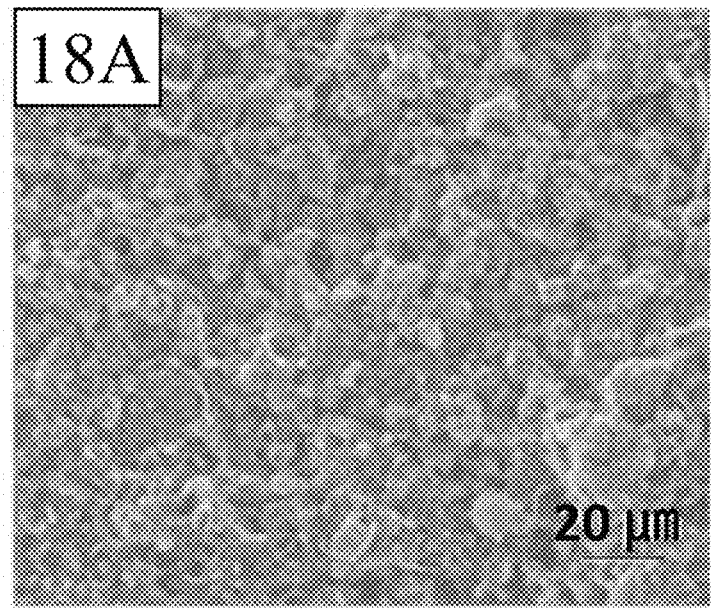
FIGS. 18A, 18B, 18C, and 18D show the form, microstructural and elemental analysis of the electroless-nickel-plated sulfur cathode after 200 cycles at the cycling rate of C/2 (FIG. 18A to FIG. 18B are at low magnification, FIG. 18C to FIG. 18D are at high magnification).
Figure 18B:
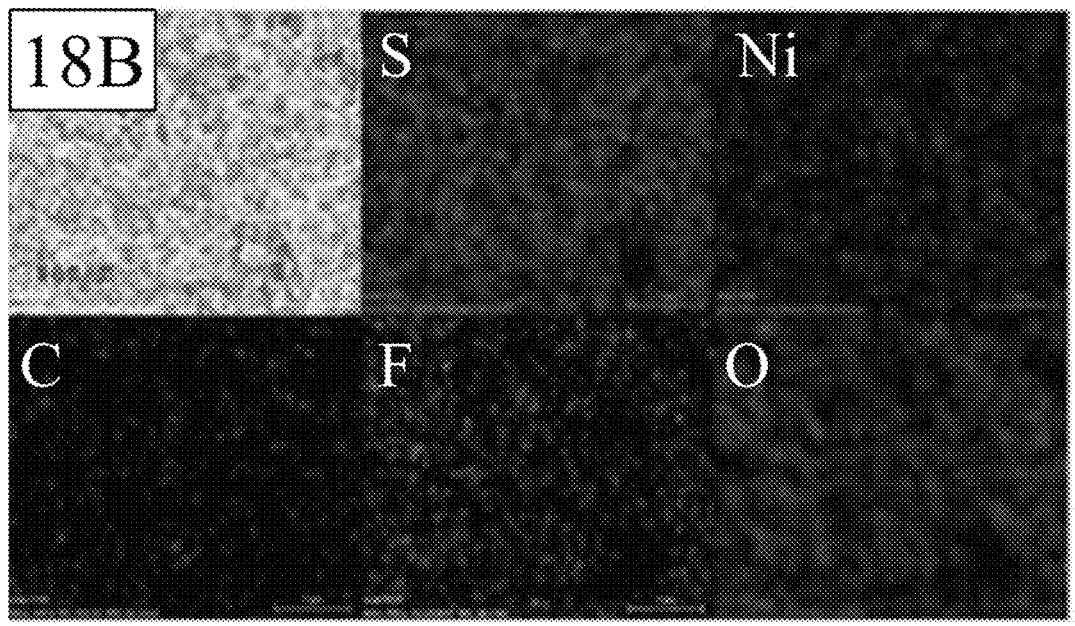
Figure 18C:
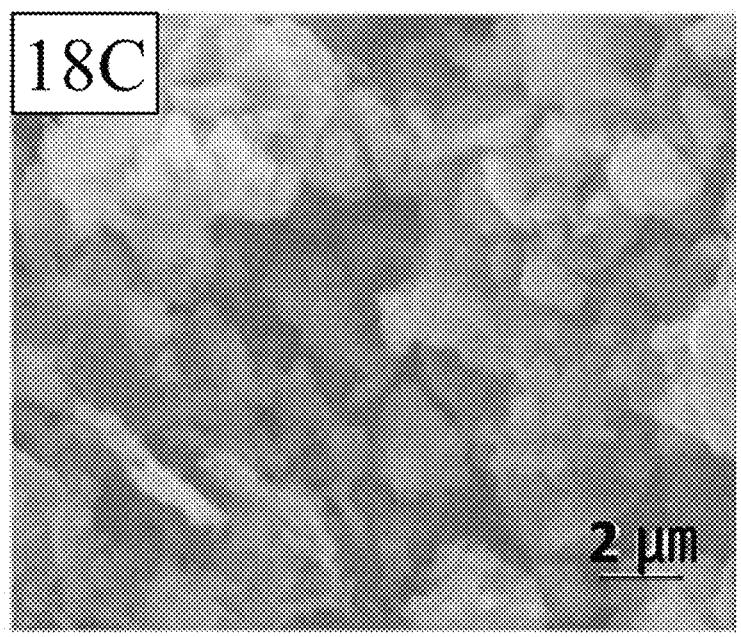
Figure 18D:
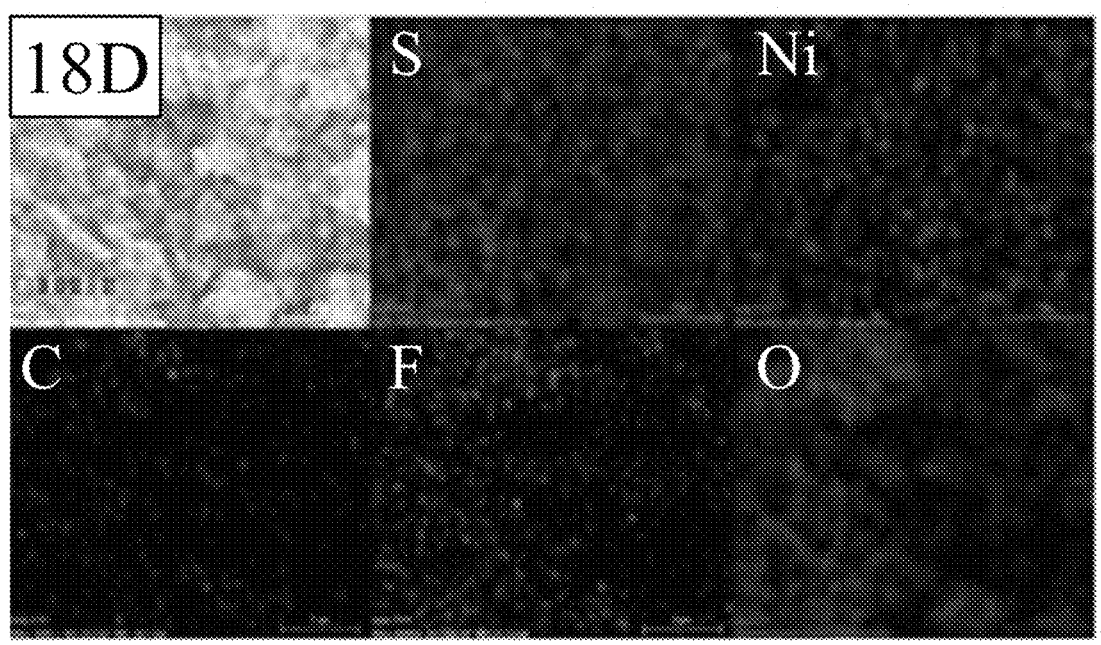
Figure 19A:
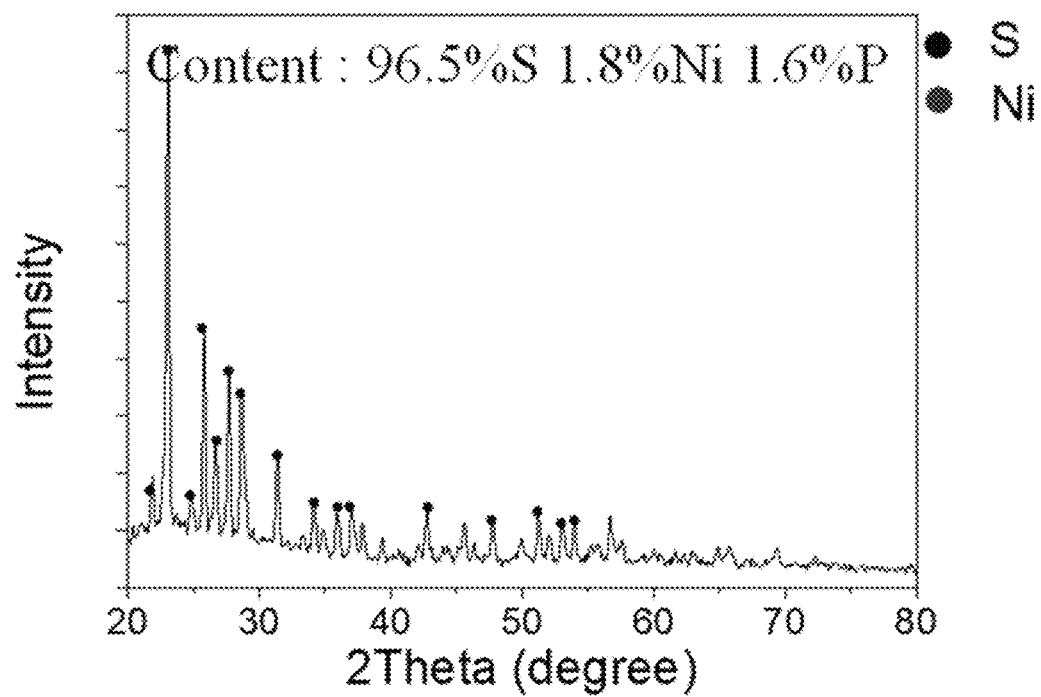
FIG. 19A shows the XRD data and component analysis data of the electroless-nickel-plated sulfur nanocomposite synthesized with a 0.1M $NiCl_2$ plating solution at 70° C.
Figure 19B:
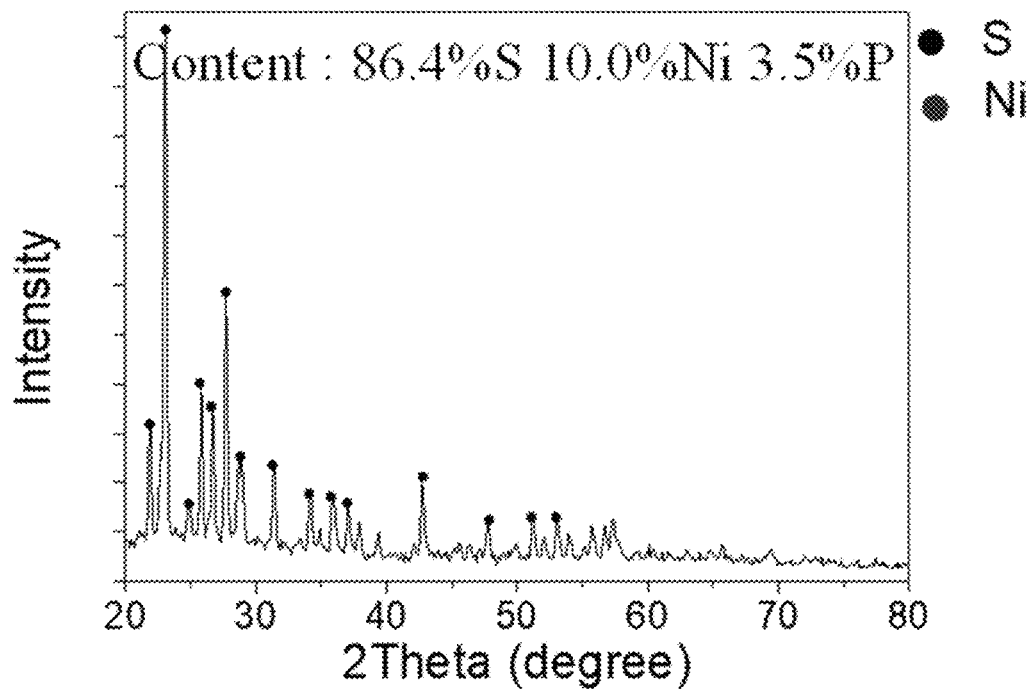
FIG. 19B shows the XRD data and component analysis data of the electroless-nickel-plated sulfur nanocomposite synthesized with a 0.1M $NiCl_2$ plating solution at 80° C.
Figure 19C:
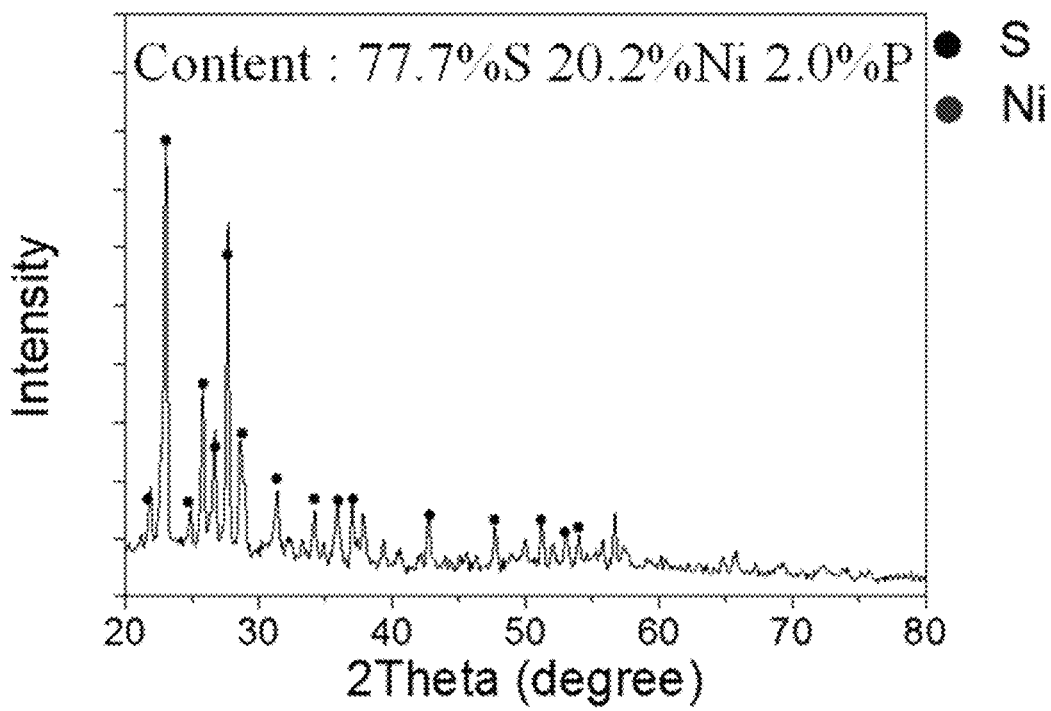
FIG. 19C shows the XRD data and component analysis data of the electroless-nickel-plated sulfur nanocomposite synthesized with a 0.1M $NiCl_2$ plating solution at 90° C.
Figure 19D:
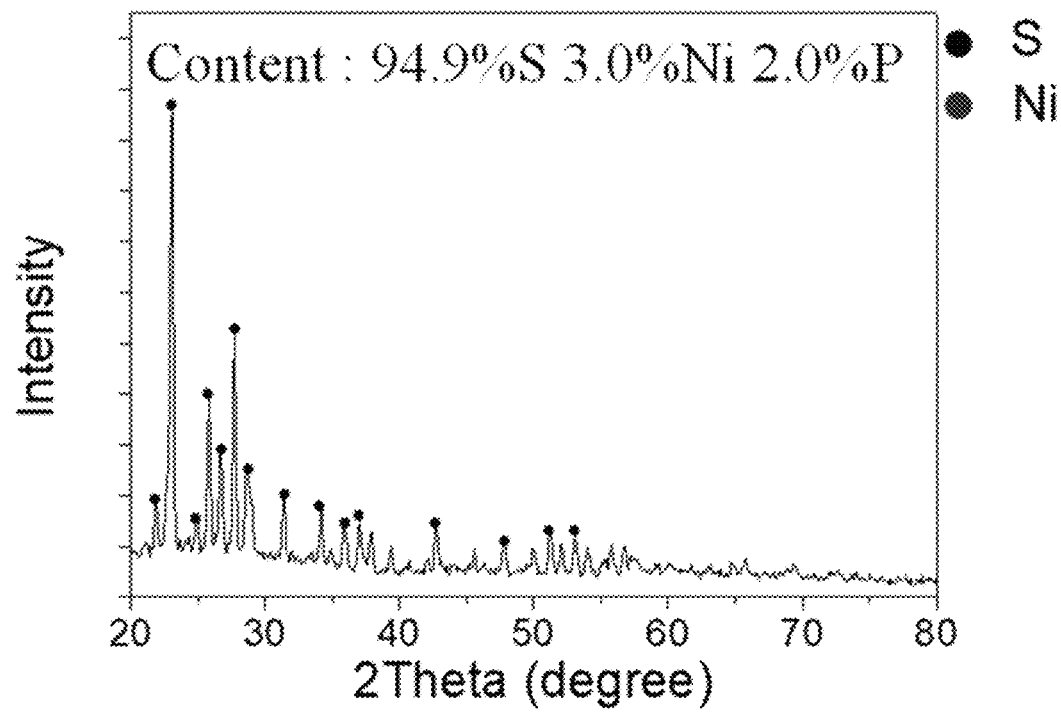
FIG. 19D shows the XRD data and component analysis data of the electroless-nickel-plated sulfur nanocomposite synthesized with a 0.25M $NiCl_2$ plating solution at 70° C.
Figure 19E:
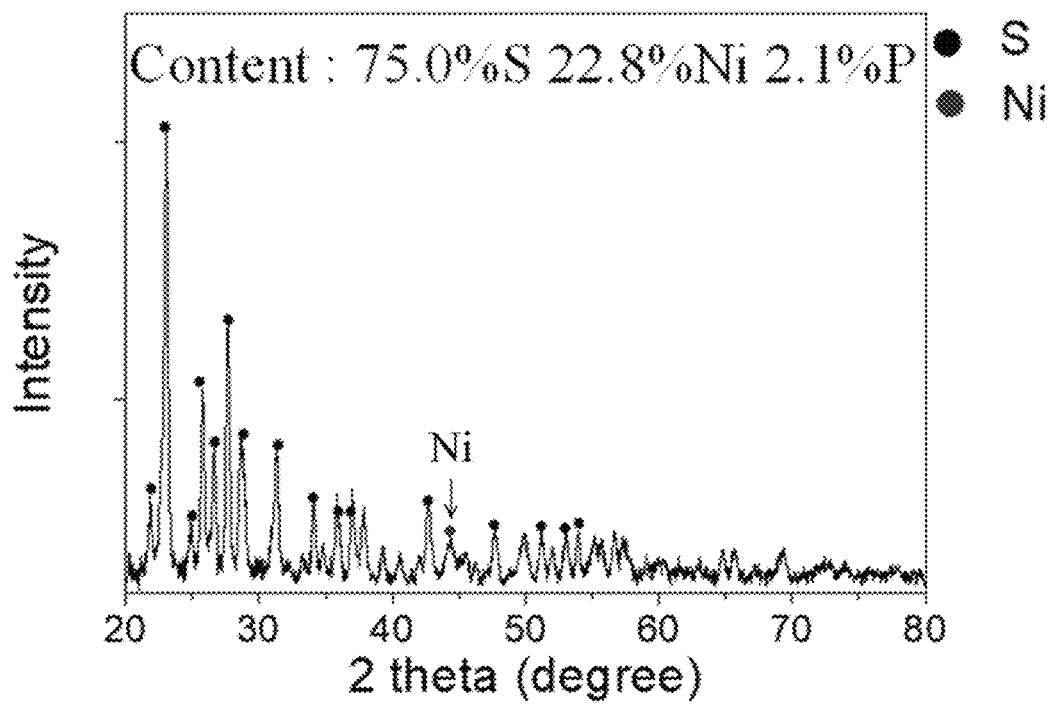
FIG. 19E shows the XRD data and component analysis data of the electroless-nickel-plated sulfur nanocomposite synthesized with a 0.25M $NiCl_2$ plating solution at 80° C.
Figure 19F:
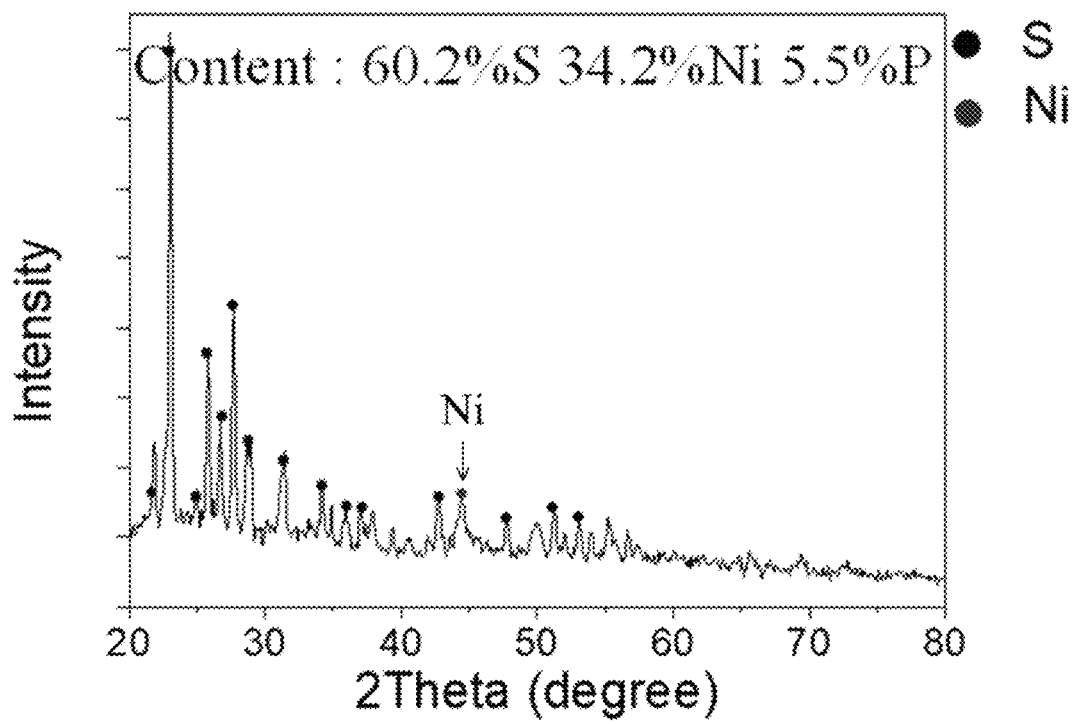
FIG. 19F shows the XRD data and component analysis data of the electroless-nickel-plated sulfur nanocomposite synthesized with a 0.25M $NiCl_2$ plating solution at 90° C.
Figure 20A:
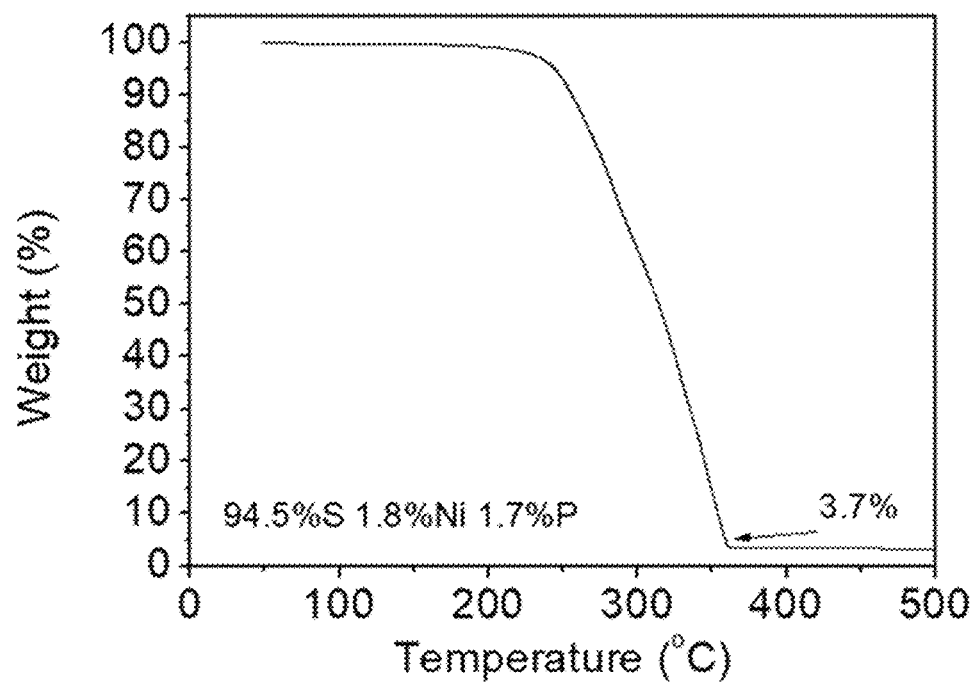
FIG. 20A shows the thermogravimetric analysis data of the electroless-nickel-plated sulfur nanocomposite synthesized with a 0.1M $NiCl_2$ plating solution at 70° C.
Figure 20B:
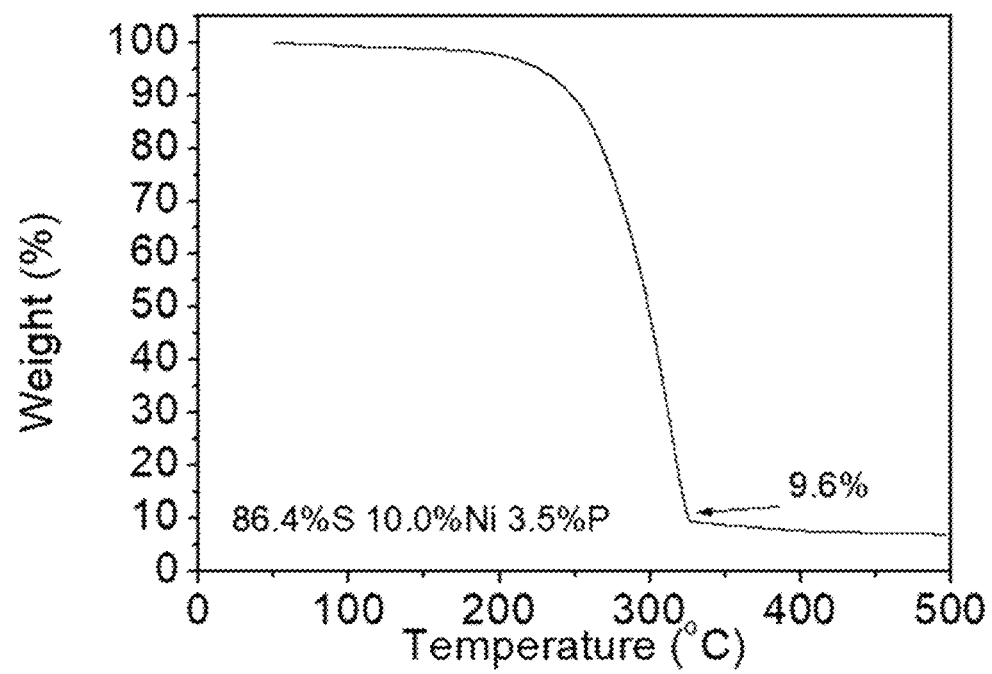
FIG. 20B shows the thermogravimetric analysis data of the electroless-nickel-plated sulfur nanocomposite synthesized with a 0.1M $NiCl_2$ plating solution at 80° C.
Figure 20C:
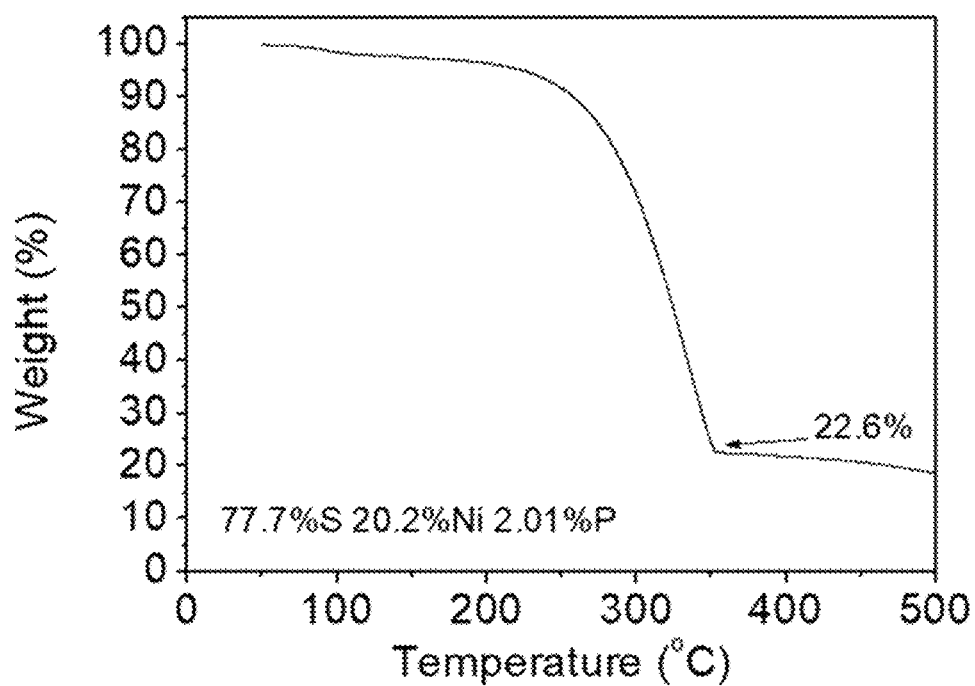
FIG. 20C shows the thermogravimetric analysis data of the electroless-nickel-plated sulfur nanocomposite synthesized with a 0.1M $NiCl_2$ plating solution at 90° C.
Figure 20D:
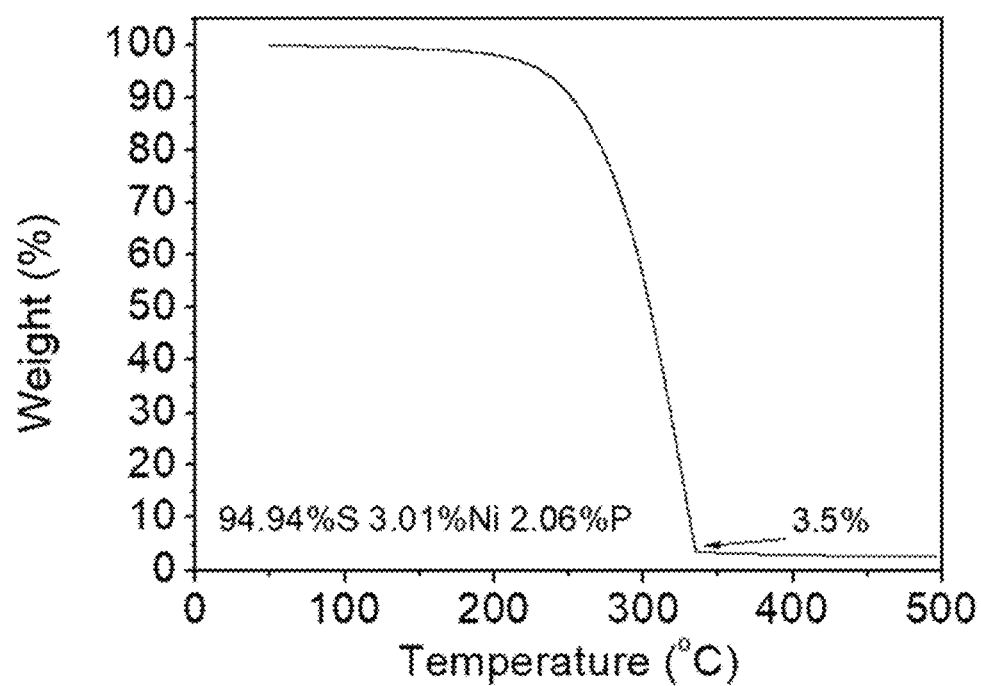
FIG. 20D shows the thermogravimetric analysis data of the electroless-nickel-plated sulfur nanocomposite synthesized with a 0.25M $NiCl_2$ plating solution at 70° C.
Figure 20E:
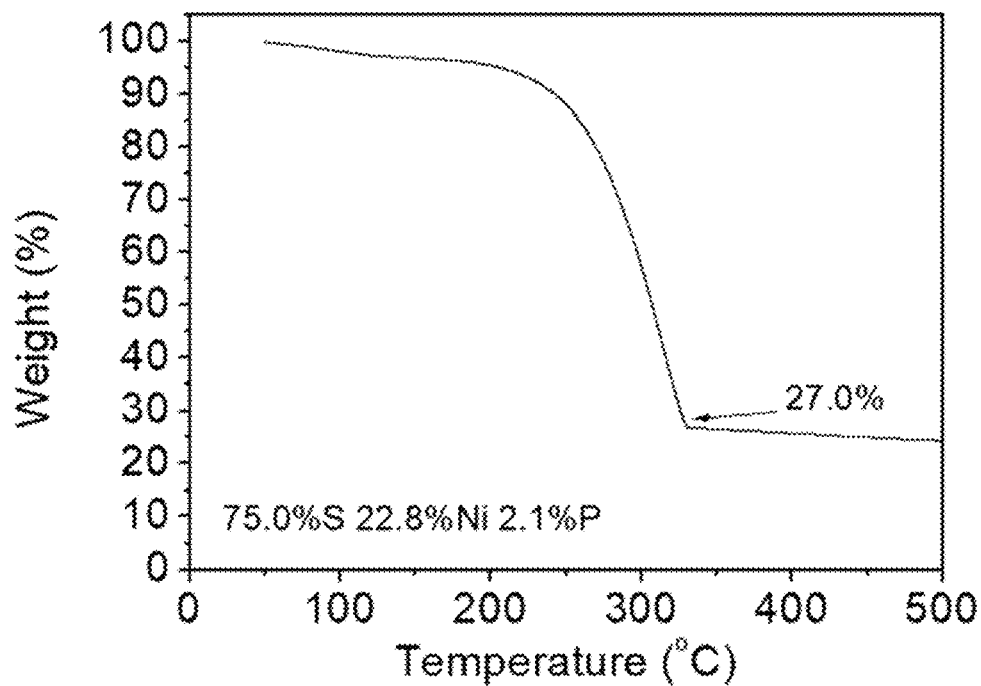
FIG. 20E shows the thermogravimetric analysis data of the electroless-nickel-plated sulfur nanocomposite synthesized with a 0.25M $NiCl_2$ plating solution at 80° C.
Figure 20F:
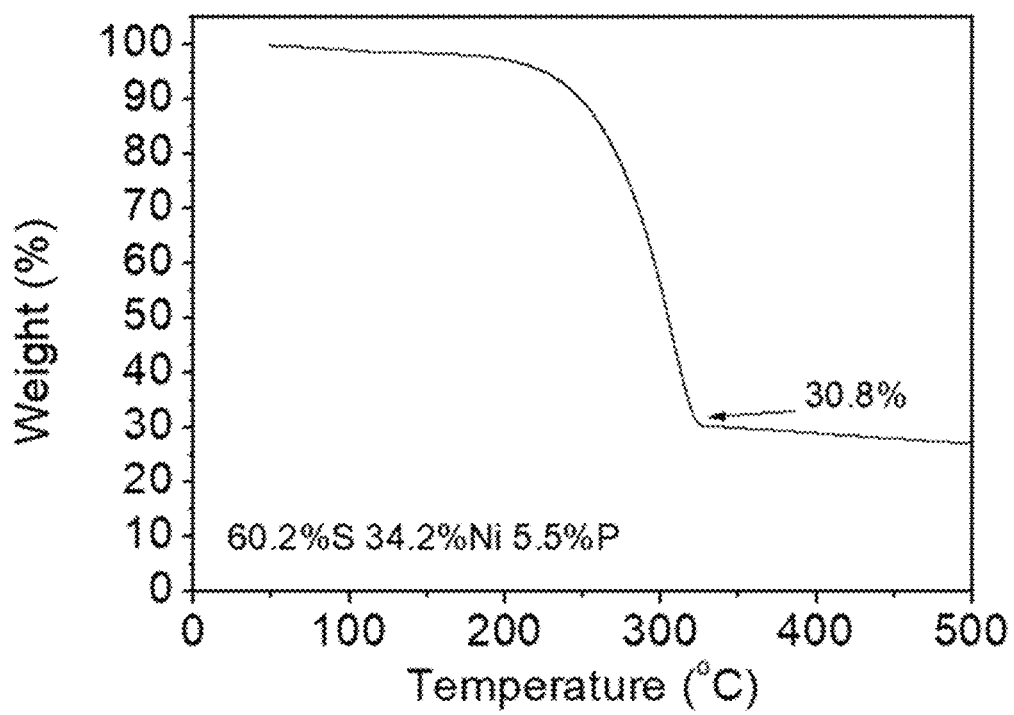
FIG. 20F shows the thermogravimetric analysis data of the electroless-nickel-plated sulfur nanocomposite synthesized with a 0.25M $NiCl_2$ plating solution at 90° C.

In contrast, FIG. 12 shows the performance of the battery which uses the 75 wt % control pure sulfur cathodes in Comparative Examples 1 to 6. The battery in Example 1 and Comparative Examples 1 to 6 have an electrolyte-to-sulfur ratio of 7 µL/mg, and a sulfur loading of 14 mg/cm$^2$. The 75 wt % pure sulfur cathode in Comparative Examples 1 to 6 have a sulfur content of 75 wt %, and the electroless-nickel-plated sulfur cathode in Example 1 has a sulfur content of 74 wt %. As they have almost equal sulfur content, the 75 wt % pure sulfur cathode and the electroless-nickel-plated sulfur cathode are made under the same conditions.

According to FIG. 7A and FIG. 12, the performances of the 75 wt % pure sulfur cathode and the electroless-nickel-plated sulfur cathode are compared as follows:
  a. The electroless-nickel-plated sulfur cathode can reach 200 cycles at the cycling rates of C/20 to C/2, whereas the 75 wt % pure sulfur cathode can only be cycled at the slow rate of C/20 and cannot reach 200 cycles (only 10 to 20 cycles), exhibiting extreme instability;
  b. The electroless-nickel-plated sulfur cathode can reach a high Coulombic efficiency of over 95% at various cycling rates, whereas the 75 wt % pure sulfur cathode shows unstable Coulombic efficiency and difficulty in reaching above 90%;
  c. At the slow cycling rate of C/20, the electroless-nickel-plated sulfur cathode can reach a capacity of 1,008 mA·h/g, whereas the 75 wt % pure sulfur cathode can only reach a capacity of 700 mA·h/g at most.

According to the above, a battery assembled with the 75 wt % pure sulfur cathode of Comparative Examples 1 to 6 cannot be cycled normally and suffers a low discharge capacity, which is resulted from the lack of the nickel coating that could offer a conductive network to improve the electrochemical utilization of the electrodes. Moreover, the lack of the nickel coating also prevents the polysulfide from staying in the cathode and functioning as catholyte to activate the unreacted sulfur, resulting in unstable Coulombic efficiency.

FIGS. 13A, 13B, 13C, 13D, 14A, 14B, 14C, 14D, 15A, 15B, 15C, 15D, 16A, 16B, 16C, 16D, 17A, 17B, 17C, 17D, 18A, 18B, 18C, and 18D are the morphological, microstructural and elemental analyses of the electroless-nickel-plated sulfur cathode of the battery before and after 200 cycles at the cycling rates of C/20 to C/2. As shown in the figures, the electroless-nickel-plated sulfur cathode exhibits almost the same cathode morphology before and after cycling through broad observation at a low magnification and in-depth inspection at high magnification. The almost unchanged microstructures and elemental mapping results also illustrate how the nickel coating facilitates the activation and redox reaction of sulfur as well as the stabilization of polysulfides within the cathode as the catholyte. These results agree with the electrochemical characteristics and battery performance, proving the advantages of the electroless-nickel-plated sulfur nanocomposite in boosting the cathode conductivity, electrocatalytic activity and preventing the formation of inactive deposits on the cycled cathode.

In conclusion, the electroless-nickel-plated sulfur nanocomposite provides a new research direction for developing advanced Li—S batteries with high-performance sulfur cathodes. The electroless-nickel-plated sulfur nanocomposite of the present disclosure is mixed evenly with the electrolyte, does not require addition of conductive carbon or binders, and can exhibit good cathode functionality only using the drop-casting process. Moreover, the nickel coating creates a thin, lightweight nanocoating onto the sulfur particles which decreases insulation, enhances electrochemical reaction kinetics with metal catalysis capability, and facilitates physical and chemical adsorption of liquid polysulfides with metal activity, demonstrating high electrochemical utilization and stable cyclability. As a result, the electroless-nickel-plated sulfur cathode that utilizes the electroless-nickel-plated sulfur nanocomposite attains a high sulfur loading of 14 mg/cm$^2$ and high sulfur content of 74 wt % in a battery of low electrolyte-to-sulfur ratio of 7 μL/mg, which is significantly superior to prior art (low sulfur loading of 2 mg/cm$^2$, low sulfur content of 30 to 60 wt %, and an excessive amount of electrolyte that is over 20 μL/mg). The battery performance of the present disclosure can reach a high charge-storage capacity of 1,008 mA·h/g, high areal capacity of 7 to 14 mA·h/cm$^2$, and a high energy density of 13 to 28 mW·h/cm$^2$, which is superior to the energy density of commercial oxide electrodes (around 10 mW·h/cm$^2$). It also demonstrates long-term cycle stability for 200 cycles while maintaining high capacity at the large range of cycling rates of C/20 to C/2. The battery that utilizes the electroless-nickel-plated sulfur cathode exhibits excellent electrochemical and battery performances: high utilization, high retention of capacity, and reaction kinetics, and outstanding practical cathode property that enables increased sulfur loading and increased content of the active material at a lean-electrolyte condition.

Further description and analysis of the electroless-nickel-plated sulfur nanocomposite as prepared in Examples 2 to 7 are given as follows:

According to FIGS. 19A, 19B, 19C, 19D, 19E, and 19F, the XRD data show that the electroless-nickel-plated sulfur nanocomposite of the present disclosure is mainly pure sulfur powder, and that the component analysis data show that in Examples 2 to 7, the nickel content are 1.8 wt %, 3.0 wt %, 10.0 wt %, 22.8 wt %, 20.2 wt %, 34.2 wt %; the sulfur content are 96.5%, 94.9 wt %, 86.4 wt %, 75.0 wt %, 77.7 wt %, 60.2 wt %; the impurities are 1.6 wt %, 2.0 wt %, 3.5 wt %, 2.1 wt %, 2.0 wt %, 5.5 wt % (all below 5.5 wt %), indicating that the long term (60 minutes) high temperature acidic chemically plating of 70 to 90° C. employed in the present disclosure helps to keep the alloy impurities only under 1 to 5.5 wt %, thus achieving high nickel content.

According to the thermal analysis data of FIGS. 20A, 20B, 20C, 20D, 20E, and 20F, the electroless-nickel-plated sulfur nanocomposite of Examples 2 to 7 have a sulfur content of 60 to 95 wt %, which is identical to the XRD data. The alloy impurities are only under 1 to 5.5 wt %, thus achieving high nickel content.

Figure 21A:
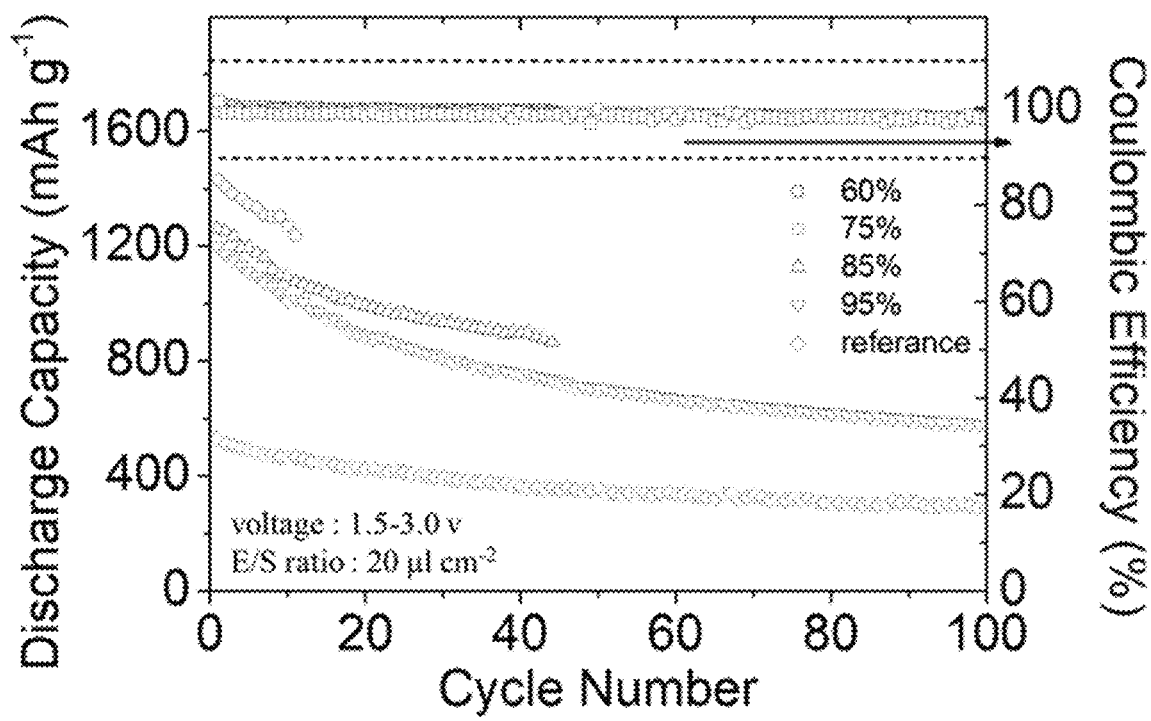
FIG. 21A shows the performance test of a battery with sulfur contents of 60 wt %, 75 wt %, 85 wt %, 95 wt %, and 100 wt % (for reference), and with sulfur loadings of 2 mg/cm$^2$.
Figure 21B:
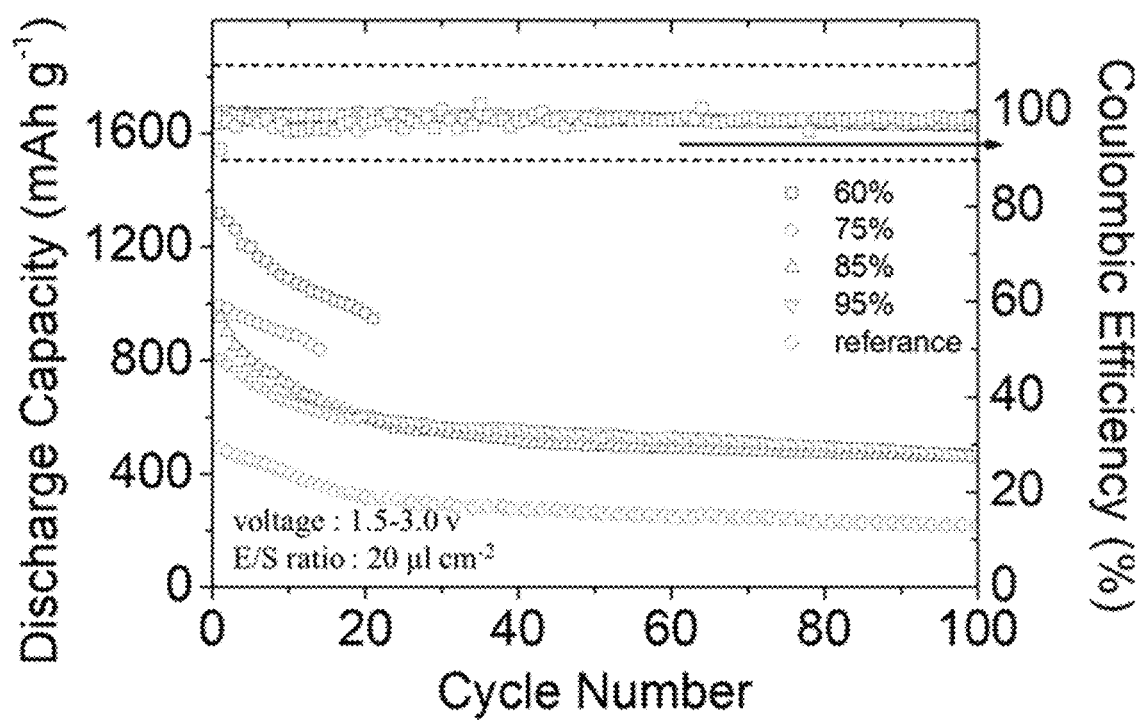
FIG. 21B shows the performance test of a battery with sulfur contents of 60 wt %, 75 wt %, 85 wt %, 95 wt %, and 100 wt % (for reference), and with sulfur loadings of 6 mg/cm$^2$.

Further description and analysis of the battery as prepared in Examples 2 to 13 are given as follows:

As shown in FIG. 21A and FIG. 21B, with different sulfur contents of 60 wt %, 75 wt %, 85 wt %, 95 wt %, and 100% (reference), and with different sulfur loadings of 2 mg/cm$^2$, 6 mg/cm$^2$, the battery can achieve long term cycles.

Further analysis and conclusion of the electroless-nickel-plated sulfur nanocomposite, the electroless-nickel-plated sulfur cathode, and the battery are given as follows:

When applied in a battery cathode, the electroless-nickel-plated sulfur nanocomposite of the present disclosure achieves high nickel content (10 to 40 wt %) while simultaneously retaining high sulfur content (60 to 95 wt %), showing enhanced electrochemical characteristics compared to prior art. It also achieves high capacity of 7 to 14 mA·h/cm$^2$ and high energy density of 13 to 28 mW·h/cm$^2$, which is significantly superior to the 2 to 4 mA·h/cm$^2$ capacity and 10 to 14 mW·h/cm$^2$ energy density of current lithium-ion battery technology.

Measuring Instrument

The Instrument and Measuring Methods of the Present Disclosure are Described in Detail Below:

Morphological, microstructural, and elemental analyses were conducted with a scanning electron microscope (SEM, SU-1510, Hitachi) with an energy dispersive X-ray spectrometer (EDS, XFlash, Bruker) for collecting the elemental mapping signals and analyzing the elemental signals.

The resistivity and sheet resistance of the electrode material is measured with a four point resistivity measurement system (Pro-4, Lucas).

Structure and porosity were analyzed with an automated gas sorption analyzer (AutoSorb iQ, Anton Paar) at 77 K. The resulting nitrogen adsorption-desorption isotherms were calculated with Brunauer-Emmett-Teller for investigating the surface area and Barrett-Joyner-Halenda, Horvath-Kawazoe, density functional theory, and T-plot methods for studying the pore characteristics. Impedance spectroscopy was conducted with a research grade potentiostat/galavanostat (SP-150, Biologic) in a frequency range of 1 MHz to 100 mHz with an AC voltage amplitude of 5 mV.

Cyclic voltammetry and the lithium-ion diffusion analysis were conducted with a research grade potentiostat/galavanostat (SP-150, Biologic) in a scan voltage range of 1.5 to 3.0 V at various scan rates of 0.020, 0.025, 0.030, 0.035, and 0.040 mV/s. Voltage profiles, cycling performance, and polarization were collected with a programmable battery cycler (BCS-800 series, Biologic) in a voltage window of 1.5 to 3.0 V at C/20, C/10, C/5, C/3, and C/2 rates.

What is claimed is:

1. A method for fabrication of an electroless-metal-plated sulfur cathode by drop-casting, comprising the steps of:
   dissolving an electroless-metal-plated sulfur nanocomposite in an electrolyte, and drop-casting the dissolved electroless-metal-plated sulfur nanocomposite on a current collector to form an electroless-metal-plated sulfur cathode which contains sulfur loading;
   wherein the electroless-metal-plated sulfur nanocomposite is fabricated by a method comprising:
   a. a sensitization step, wherein a sensitization solution is prepared by adding $SnCl_2$ to HCl, sulfur powder is added to the sensitization solution and stirred, and the sensitization solution is filtered to collect a sensitized powder;
   b. an activation step, wherein an activation solution is prepared by adding $PdCl_2$ to HCl, the sensitized powder is added to the activation solution and stirred, and the activation solution is filtered to collect a pre-treated powder;
   c. an acidic chemically plating step, wherein a solution 1 containing metal ions is prepared by dissolving sodium acetate and metallic salt in deionized water; a solution 2 is prepared by dissolving $NaH_2PO_2·H_2O$ in deionized water; solution 1 and solution 2 are preheated to the same temperature and mixed to form a mixture solution, the pre-treated powder is added to the mixture solution and stirred until the metal ions are reduced to metal atoms and form a resulting product, then the resulting product is filtered, dried and ground to form an electroless-metal-plated sulfur nanocomposite,
   wherein the sensitization solution with the sulfur powder is stirred for 60 to 180 minutes in the sensitization step, wherein the activation solution with the sensitized powder is stirred for 60 to 180 minutes in the activation step, and wherein the mixture solution with the pre-treated powder is stirred for 60 to 180 minutes in the acidic chemically plating step;

wherein the electroless-metal-plated sulfur cathode does not include a conductive carbon or a binder.

2. The method of claim 1, wherein the metallic salt is at least a substance selected from the group consisting of $AuCl_3$, $AgCl$, $CuCl_2$, $SnCl_4$, $NiCl_2$, $CoCl_2$, and $FeCl_3$.

3. The method of claim 1, wherein the same temperature is 70 to 90° C.

4. The method of claim 1, wherein the electroless-metal-plated sulfur nanocomposite has a sulfur content of 60 to 95 wt %.

5. The method of claim 1, wherein the electroless-metal-plated sulfur nanocomposite has a metal content of 5 to 40 wt %.

6. The method of claim 1, wherein the electrolyte has an electrolyte-to-sulfur ratio that is 7 to 20 μL/mg.

7. The method of claim 1, wherein the sulfur loading is 2 to 14 mg/cm$^2$.

8. The method of claim 1, wherein the sensitization solution with the sulfur powder is stirred for 60 minutes in the sensitization step.

9. A method for fabrication of a battery that utilizes the electroless-metal-plated sulfur cathode fabricated by the method of claim 1.

* * * * *